US012574642B1

(12) United States Patent
Goldenberg et al.

(10) Patent No.: US 12,574,642 B1
(45) Date of Patent: Mar. 10, 2026

(54) COMPACT FOLDED TELE CAMERAS

(71) Applicant: Corephotonics Ltd., Tel Aviv (IL)

(72) Inventors: Ephraim Goldenberg, Tel Aviv (IL); Nadav Goulinski, Tel Aviv (IL); Noy Cohen, Tel Aviv (IL); Ziv Shemesh, Tel Aviv (IL); Itay Manor, Tel Aviv (IL)

(73) Assignee: Corephotonics LTD., Tel Aviv (IL)

( * ) Notice: Subject to any disclaimer, the term of this patent is extended or adjusted under 35 U.S.C. 154(b) by 0 days.

(21) Appl. No.: 18/727,147

(22) PCT Filed: Oct. 19, 2023

(86) PCT No.: PCT/IB2023/060577
§ 371 (c)(1),
(2) Date: Jul. 8, 2024

(87) PCT Pub. No.: WO2024/084436
PCT Pub. Date: Apr. 25, 2024

Related U.S. Application Data

(60) Provisional application No. 63/513,862, filed on Jul. 15, 2023, provisional application No. 63/502,103, (Continued)

(51) Int. Cl.
*G02B 27/64* (2006.01)
*G02B 13/00* (2006.01)
(Continued)

(52) U.S. Cl.
CPC ............. *H04N 23/687* (2023.01); *G03B 3/10* (2013.01); *G03B 5/02* (2013.01); *G03B 17/17* (2013.01);
(Continued)

(58) Field of Classification Search
USPC ......................................................... 396/55
See application file for complete search history.

(56) References Cited

U.S. PATENT DOCUMENTS

| | | | |
|---|---|---|---|
| 2,106,752 | A | 2/1938 | Land |
| 2,354,503 | A | 7/1944 | Arthur |

(Continued)

FOREIGN PATENT DOCUMENTS

| | | | |
|---|---|---|---|
| CN | 101634738 A | 1/2010 | |
| CN | 102147519 A | 8/2011 | |

(Continued)

OTHER PUBLICATIONS

A compact and cost effective design for cell phone zoom lens, Chang et al., Sep. 2007, 8 pages.
(Continued)

*Primary Examiner* — Walter L Lindsay, Jr.
*Assistant Examiner* — Warren K Fenwick
(74) *Attorney, Agent, or Firm* — Reinhold Cohn Group

(57) ABSTRACT

A folded-camera module for a mobile device. The folded-camera module includes a lens having an effective focal length in the range of 8 mm to 50 mm and having a f/# lesser than 3.5. The lens is comprising a first lens group (G1) and a second lens group (G2). The folded-camera module includes an optical path folding element (OPFE). The first lens group is positioned at an object side of the OPFE, and the second lens group is positioned at an image side of the OPFE. The folded-camera module is further configured for spatially adjusting at least one of the first lens group, the second lens group, and the OPFE, so as to compensate for an optical path shift of light entering into the folded camera module due to movements of the camera module, thereby providing optical image stabilization.

51 Claims, 56 Drawing Sheets

Related U.S. Application Data filed on May 14, 2023, provisional application No. 63/495,144, filed on Apr. 10, 2023, provisional application No. 63/491,334, filed on Mar. 21, 2023, provisional application No. 63/482,082, filed on Jan. 30, 2023, provisional application No. 63/478,520, filed on Jan. 5, 2023, provisional application No. 63/477,429, filed on Dec. 28, 2022, provisional application No. 63/386,191, filed on Dec. 6, 2022, provisional application No. 63/427,870, filed on Nov. 24, 2022, provisional application No. 63/383,708, filed on Nov. 15, 2022, provisional application No. 63/417,387, filed on Oct. 19, 2022.

(51) Int. Cl.

| | |
|---|---|
| *G03B 3/10* | (2021.01) |
| *G03B 5/02* | (2021.01) |
| *G03B 17/17* | (2021.01) |
| *H04N 23/54* | (2023.01) |
| *H04N 23/55* | (2023.01) |
| *H04N 23/68* | (2023.01) |
| *G03B 30/00* | (2021.01) |
| *H04N 23/57* | (2023.01) |

(52) U.S. Cl.
CPC ............. *H04N 23/54* (2023.01); *H04N 23/55* (2023.01); *G03B 30/00* (2021.01); *G03B 2205/0015* (2013.01); *G03B 2205/0023* (2013.01); *G03B 2205/0046* (2013.01); *H04N 23/57* (2023.01)

(56) References Cited

U.S. PATENT DOCUMENTS

| | | | |
|---|---|---|---|
| 2,378,170 | A | 6/1945 | Aklin |
| 2,441,093 | A | 5/1948 | Aklin |
| 3,388,956 | A | 6/1968 | Eggert et al. |
| 3,524,700 | A | 8/1970 | Eggert et al. |
| 3,558,218 | A | 1/1971 | Grey |
| 3,864,027 | A | 2/1975 | Harada |
| 3,942,876 | A | 3/1976 | Betensky |
| 4,134,645 | A | 1/1979 | Sugiyama et al. |
| 4,338,001 | A | 7/1982 | Matsui |
| 4,465,345 | A | 8/1984 | Yazawa |
| 4,792,822 | A | 12/1988 | Akiyama et al. |
| 5,000,551 | A | 3/1991 | Shibayama |
| 5,327,291 | A | 7/1994 | Baker et al. |
| 5,331,465 | A | 7/1994 | Miyano |
| 5,969,869 | A | 10/1999 | Hirai et al. |
| 6,014,266 | A | 1/2000 | Obama et al. |
| 6,035,136 | A | 3/2000 | Hayashi et al. |
| 6,147,702 | A | 11/2000 | Smith |
| 6,169,636 | B1 | 1/2001 | Kreitzer |
| 6,654,180 | B2 | 11/2003 | Ori |
| 7,187,504 | B2 | 3/2007 | Horiuchi |
| 7,206,136 | B2 | 4/2007 | Labaziewicz et al. |
| 7,515,351 | B2 | 4/2009 | Chen et al. |
| 7,564,635 | B1 | 7/2009 | Tang |
| 7,643,225 | B1 | 1/2010 | Tsai |
| 7,660,049 | B2 | 2/2010 | Tang |
| 7,684,128 | B2 | 3/2010 | Tang |
| 7,688,523 | B2 | 3/2010 | Sano |
| 7,692,877 | B2 | 4/2010 | Tang et al. |
| 7,697,220 | B2 | 4/2010 | Lyama |
| 7,738,186 | B2 | 6/2010 | Chen et al. |
| 7,777,972 | B1 | 8/2010 | Chen et al. |
| 7,813,057 | B2 | 10/2010 | Lin |
| 7,821,724 | B2 | 10/2010 | Tang et al. |
| 7,826,149 | B2 | 11/2010 | Tang et al. |
| 7,826,151 | B2 | 11/2010 | Tsai |
| 7,869,142 | B2 | 1/2011 | Chen et al. |
| 7,898,747 | B2 | 3/2011 | Tang |
| 7,916,401 | B2 | 3/2011 | Chen et al. |
| 7,918,398 | B2 | 4/2011 | Li et al. |
| 7,957,075 | B2 | 6/2011 | Tang |
| 7,957,076 | B2 | 6/2011 | Tang |
| 7,957,079 | B2 | 6/2011 | Tang |
| 7,961,406 | B2 | 6/2011 | Tang et al. |
| 8,000,031 | B1 | 8/2011 | Tsai |
| 8,004,777 | B2 | 8/2011 | Sano et al. |
| 8,077,400 | B2 | 12/2011 | Tang |
| 8,149,523 | B2 | 4/2012 | Ozaki |
| 8,218,253 | B2 | 7/2012 | Tang |
| 8,228,622 | B2 | 7/2012 | Tang |
| 8,233,224 | B2 | 7/2012 | Chen |
| 8,253,843 | B2 | 8/2012 | Lin |
| 8,279,537 | B2 | 10/2012 | Sato |
| 8,363,337 | B2 | 1/2013 | Tang et al. |
| 8,395,851 | B2 | 3/2013 | Tang et al. |
| 8,400,717 | B2 | 3/2013 | Chen et al. |
| 8,451,549 | B2 | 5/2013 | Yamanaka et al. |
| 8,503,107 | B2 | 8/2013 | Chen et al. |
| 8,514,502 | B2 | 8/2013 | Chen |
| 8,570,668 | B2 | 10/2013 | Takakubo et al. |
| 8,718,458 | B2 | 5/2014 | Okuda |
| 8,780,465 | B2 | 7/2014 | Chae |
| 8,810,923 | B2 | 8/2014 | Shinohara |
| 8,854,745 | B1 | 10/2014 | Chen |
| 8,958,164 | B2 | 2/2015 | Kwon et al. |
| 9,185,291 | B1 | 11/2015 | Shabtay |
| 9,229,194 | B2 | 1/2016 | Yoneyama et al. |
| 9,235,036 | B2 | 1/2016 | Kato et al. |
| 9,279,957 | B2 | 3/2016 | Kanda et al. |
| 9,438,792 | B2 | 9/2016 | Nakada et al. |
| 9,488,802 | B2 | 11/2016 | Chen et al. |
| 9,568,712 | B2 | 2/2017 | Dror et al. |
| 9,678,310 | B2 | 6/2017 | Iwasaki et al. |
| 9,817,213 | B2 | 11/2017 | Mercado |
| 9,869,846 | B1 | 1/2018 | Bone et al. |
| 10,070,060 | B2 * | 9/2018 | Goldenberg ........... G03B 13/36 |
| 10,284,780 | B2 * | 5/2019 | Goldenberg ........... G03B 17/17 |
| 10,498,961 | B2 * | 12/2019 | Goldenberg ............. G03B 5/00 |
| 10,613,303 | B2 * | 4/2020 | Goldenberg ............. G02B 7/09 |
| 10,656,396 | B1 * | 5/2020 | Goldenberg ........... H04N 23/57 |
| 10,670,879 | B2 * | 6/2020 | Goldenberg ............. G02B 7/04 |
| 10,678,029 | B1 * | 6/2020 | Goldenberg ............. G02B 7/09 |
| 10,962,746 | B2 * | 3/2021 | Goldenberg ....... H04N 23/6812 |
| 12,019,363 | B2 * | 6/2024 | Goldenberg ............. G02B 9/64 |
| 2002/0118471 | A1 | 8/2002 | Imoto |
| 2003/0048542 | A1 | 3/2003 | Enomoto |
| 2005/0041300 | A1 | 2/2005 | Oshima et al. |
| 2005/0062346 | A1 | 3/2005 | Sasaki |
| 2005/0128604 | A1 | 6/2005 | Kuba |
| 2005/0141103 | A1 | 6/2005 | Nishina |
| 2005/0168840 | A1 | 8/2005 | Kobayashi et al. |
| 2005/0270667 | A1 | 12/2005 | Gurevich et al. |
| 2006/0092524 | A1 | 5/2006 | Konno |
| 2006/0238902 | A1 | 10/2006 | Nakashima et al. |
| 2006/0275025 | A1 | 12/2006 | Labaziewicz et al. |
| 2007/0114990 | A1 | 5/2007 | Godkin |
| 2007/0229983 | A1 | 10/2007 | Saori |
| 2007/0247726 | A1 | 10/2007 | Sudoh |
| 2007/0253689 | A1 | 11/2007 | Nagai et al. |
| 2008/0056698 | A1 | 3/2008 | Lee et al. |
| 2008/0094730 | A1 | 4/2008 | Toma et al. |
| 2008/0094738 | A1 | 4/2008 | Lee |
| 2008/0273250 | A1 | 11/2008 | Nishio |
| 2008/0291531 | A1 | 11/2008 | Heimer |
| 2008/0304161 | A1 | 12/2008 | Souma |
| 2009/0002839 | A1 | 1/2009 | Sato |
| 2009/0067063 | A1 | 3/2009 | Asami et al. |
| 2009/0122423 | A1 | 5/2009 | Park et al. |
| 2009/0135245 | A1 | 5/2009 | Luo et al. |
| 2009/0141365 | A1 | 6/2009 | Jannard et al. |
| 2009/0147368 | A1 | 6/2009 | Oh et al. |
| 2009/0225438 | A1 | 9/2009 | Kubota |
| 2009/0279191 | A1 | 11/2009 | Yu |
| 2009/0303620 | A1 | 12/2009 | Abe et al. |
| 2010/0026878 | A1 | 2/2010 | Seo |
| 2010/0033844 | A1 | 2/2010 | Katano |
| 2010/0060995 | A1 | 3/2010 | Yumiki et al. |

(56) References Cited

U.S. PATENT DOCUMENTS

| | | |
|---|---|---|
| 2010/0165476 A1 | 7/2010 | Eguchi |
| 2010/0214664 A1 | 8/2010 | Chia |
| 2010/0277813 A1 | 11/2010 | Ito |
| 2011/0001838 A1 | 1/2011 | Lee |
| 2011/0032409 A1 | 2/2011 | Rossi et al. |
| 2011/0080655 A1 | 4/2011 | Mori |
| 2011/0102667 A1 | 5/2011 | Chua et al. |
| 2011/0102911 A1 | 5/2011 | Iwasaki |
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0188121 A1 | 8/2011 | Goring et al. |
| 2011/0249347 A1 | 10/2011 | Kubota |
| 2012/0062783 A1 | 3/2012 | Tang et al. |
| 2012/0069455 A1 | 3/2012 | Lin et al. |
| 2012/0092777 A1 | 4/2012 | Tochigi et al. |
| 2012/0105708 A1 | 5/2012 | Hagiwara |
| 2012/0147489 A1 | 6/2012 | Matsuoka |
| 2012/0154929 A1 | 6/2012 | Tsai et al. |
| 2012/0194923 A1 | 8/2012 | Um |
| 2012/0229920 A1 | 9/2012 | Otsu et al. |
| 2012/0262806 A1 | 10/2012 | Lin et al. |
| 2013/0002933 A1 | 1/2013 | Topliss et al. |
| 2013/0057971 A1 | 3/2013 | Zhao et al. |
| 2013/0088788 A1 | 4/2013 | You |
| 2013/0176479 A1 | 7/2013 | Wada |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0063616 A1 | 3/2014 | Okano et al. |
| 2014/0092487 A1 | 4/2014 | Chen et al. |
| 2014/0139719 A1 | 5/2014 | Fukaya |
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0160438 A1 | 6/2015 | Okuda |
| 2015/0168667 A1 | 6/2015 | Kudoh |
| 2015/0177496 A1 | 6/2015 | Marks et al. |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0007008 A1 | 1/2016 | Molgaard et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Romeo, I |
| 2016/0105616 A1 | 4/2016 | Shabtay et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Kim et al. |
| 2016/0353008 A1 | 12/2016 | Osborne |
| 2017/0023778 A1 | 1/2017 | Inoue |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0310952 A1 | 10/2017 | Adomat et al. |
| 2017/0329108 A1 | 11/2017 | Hashimoto |
| 2017/0337703 A1 | 11/2017 | Wu et al. |
| 2017/0359566 A1 | 12/2017 | Goma et al. |
| 2018/0024319 A1 | 1/2018 | Lai et al. |
| 2018/0048825 A1 | 2/2018 | Wang |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0049687 A1 | 2/2019 | Bachar et al. |
| 2019/0075284 A1 | 3/2019 | Ono |
| 2019/0086638 A1 | 3/2019 | Lee |
| 2019/0094500 A1 | 3/2019 | Tseng et al. |
| 2019/0107651 A1 | 4/2019 | Sade |
| 2019/0121216 A1 | 4/2019 | Shabtay et al. |
| 2019/0155002 A1 | 5/2019 | Shabtay et al. |
| 2019/0170965 A1 | 6/2019 | Shabtay |
| 2019/0187443 A1 | 6/2019 | Jia et al. |
| 2019/0187486 A1 | 6/2019 | Goldenberg et al. |
| 2019/0196148 A1 | 6/2019 | Yao et al. |
| 2019/0212632 A1 | 7/2019 | Miller et al. |
| 2019/0215440 A1 | 7/2019 | Rivard et al. |
| 2019/0222758 A1 | 7/2019 | Goldenberg et al. |
| 2019/0235202 A1 | 8/2019 | Smyth et al. |
| 2019/0353874 A1 | 11/2019 | Yeh et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0241233 A1 | 7/2020 | Shabtay et al. |
| 2020/0333691 A1 | 10/2020 | Shabtay et al. |
| 2020/0400926 A1 | 12/2020 | Bachar |
| 2021/0048628 A1 | 2/2021 | Shabtay et al. |
| 2021/0048649 A1 | 2/2021 | Goldenberg et al. |
| 2021/0165192 A1 | 6/2021 | Goldenberg et al. |
| 2021/0263276 A1 | 8/2021 | Huang et al. |
| 2021/0364746 A1 | 11/2021 | Chen |
| 2021/0377450 A1 | 12/2021 | Shabtay et al. |
| 2021/0396974 A1 | 12/2021 | Kuo |
| 2022/0046151 A1 | 2/2022 | Shabtay et al. |
| 2022/0066168 A1 | 3/2022 | Shi |
| 2022/0113511 A1 | 4/2022 | Chen |
| 2022/0206264 A1 | 6/2022 | Rudnick et al. |
| 2022/0232167 A1 | 7/2022 | Shabtay et al. |

FOREIGN PATENT DOCUMENTS

| | | |
|---|---|---|
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| CN | 114253050 A | 3/2022 |
| JP | S54157620 A | 12/1979 |
| JP | S59121015 A | 7/1984 |

(56) References Cited

FOREIGN PATENT DOCUMENTS

| | | | |
|---|---|---|---|
| JP | 6165212 | A | 4/1986 |
| JP | S6370211 | A | 3/1988 |
| JP | H0233117 | A | 2/1990 |
| JP | 406059195 | A | 3/1994 |
| JP | H07325246 | A | 12/1995 |
| JP | H07333505 | A | 12/1995 |
| JP | H09211326 | A | 8/1997 |
| JP | H11223771 | A | 8/1999 |
| JP | 2000131610 | A | 5/2000 |
| JP | 2000292848 | A | 10/2000 |
| JP | 3210242 | B2 | 9/2001 |
| JP | 2004334185 | A | 11/2004 |
| JP | 2006195139 | A | 7/2006 |
| JP | 2007133096 | A | 5/2007 |
| JP | 2007164065 | A | 6/2007 |
| JP | 2007219199 | A | 8/2007 |
| JP | 2007306282 | A | 11/2007 |
| JP | 2008111876 | A | 5/2008 |
| JP | 2008191423 | A | 8/2008 |
| JP | 2010032936 | A | 2/2010 |
| JP | 2010164841 | A | 7/2010 |
| JP | 2011145315 | A | 7/2011 |
| JP | 2011151448 | A | 8/2011 |
| JP | 2012203234 | A | 10/2012 |
| JP | 2012230323 | A | 11/2012 |
| JP | 2013003317 | A | 1/2013 |
| JP | 2013003754 | A | 1/2013 |
| JP | 2013101213 | A | 5/2013 |
| JP | 2013105049 | A | 5/2013 |
| JP | 2013106289 | A | 5/2013 |
| JP | 2013148823 | A | 8/2013 |
| JP | 2014142542 | A | 8/2014 |
| JP | 2017116679 | A | 6/2017 |
| JP | 2018059969 | A | 4/2018 |
| JP | 2019113878 | A | 7/2019 |
| KR | 20080088477 | A | 10/2008 |
| KR | 20090019525 | A | 2/2009 |
| KR | 20090131805 | A | 12/2009 |
| KR | 20110058094 | A | 6/2011 |
| KR | 20110115391 | A | 10/2011 |
| KR | 20120068177 | A | 6/2012 |
| KR | 20140135909 | A | 5/2013 |
| KR | 20140023552 | A | 2/2014 |
| KR | 20160000759 | A | 1/2016 |
| KR | 101632168 | B1 | 6/2016 |
| KR | 20160115359 | A | 10/2016 |
| TW | M602642 | U | 10/2020 |
| TW | I756044 | B | 2/2022 |
| WO | 2013058111 | A1 | 4/2013 |
| WO | 2013063097 | A1 | 5/2013 |
| WO | 2018130898 | A1 | 7/2018 |
| WO | WO-2022269486 | A1 * | 12/2022 | ............ G03B 17/17 |
| WO | WO-2023079403 | A1 * | 5/2023 | ............ H04N 23/55 |
| WO | WO-2023180871 | A1 * | 9/2023 | ............ G03B 5/04 |
| WO | WO-2024171004 | A1 * | 8/2024 | ............ G03B 17/17 |

OTHER PUBLICATIONS

Consumer Electronic Optics: How small a lens can be? The case of panomorph lenses, Thibault et al., Sep. 2014, 7 pages.

Optical design of camera optics for mobile phones, Steinich et al., 2012, pp. 51-58 (8 pages).

The Optics of Miniature Digital Camera Modules, Bareau et al., 2006, 11 pages.

Modeling and measuring liquid crystal tunable lenses, Peter P. Clark, 2014, 7 pages.

Mobile Platform Optical Design, Peter P. Clark, 2014, 7 pages.

Boye et al., "Ultrathin Optics for Low-Profile Innocuous Imager", Sandia Report, 2009, pp. 56-56.

"Cheat sheet: how to understand f-stops", Internet article, Digital Camera World, 2017.

ISR in related PCT application PCT/IB2023/060577, dated Apr. 3, 2024.

WO in related PCT application PCT/IB2023/060577, dated Apr. 3, 2024.

* cited by examiner

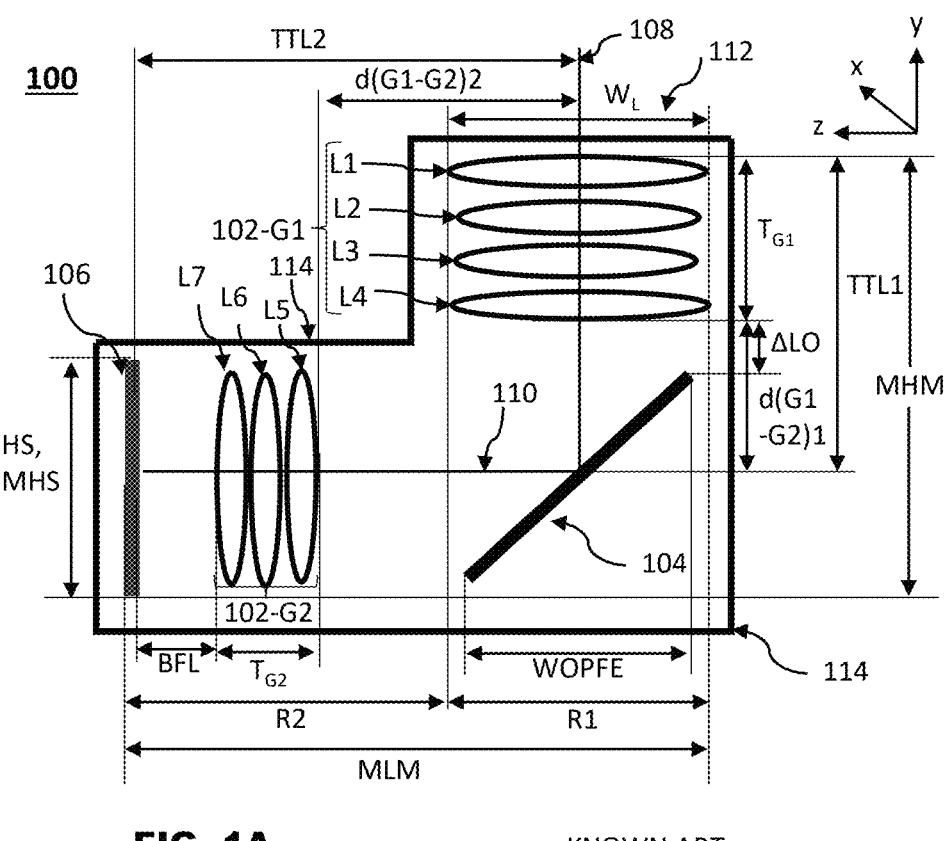
FIG. 1A          KNOWN ART
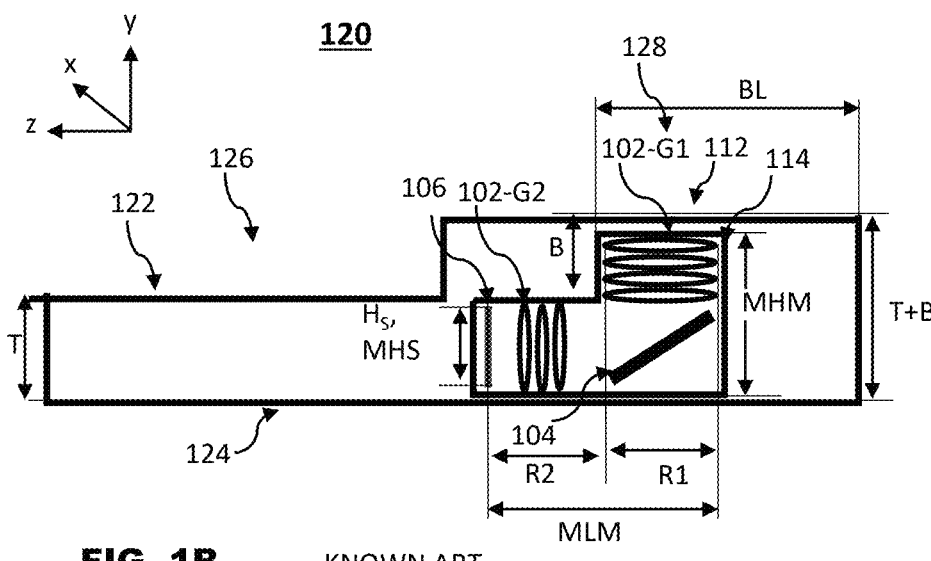
FIG. 1B       KNOWN ART

KNOWN ART

2400

2500

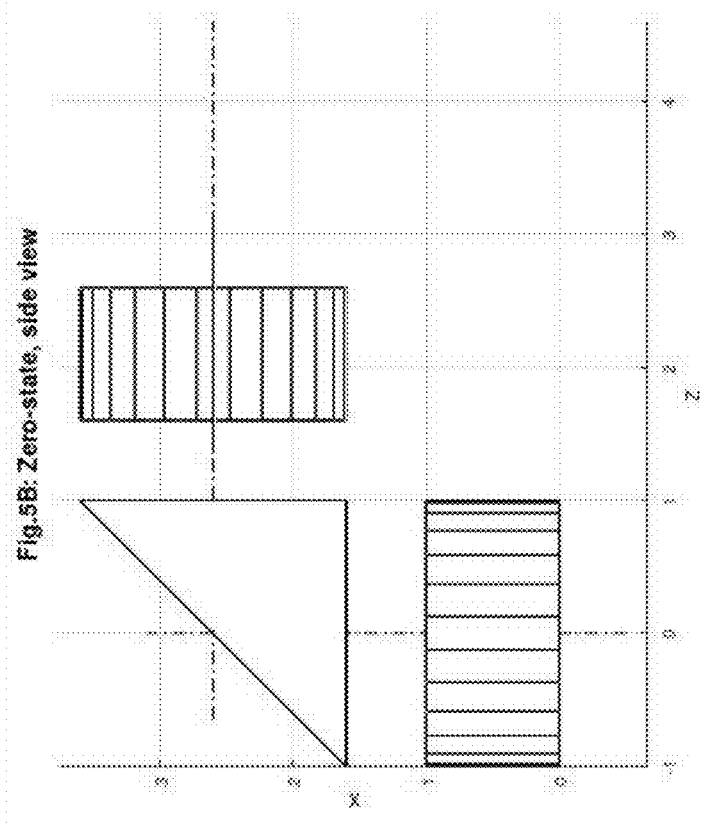
Fig.5B: Zero-state, side view
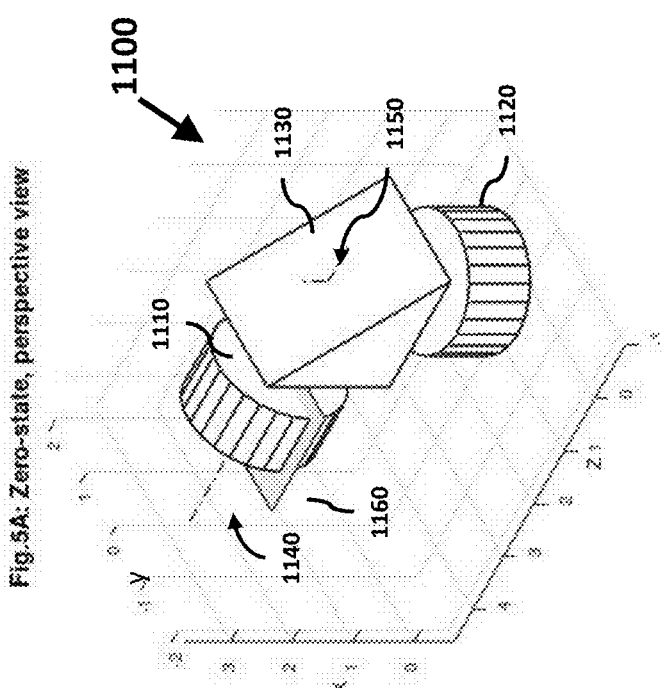
Fig.5A: Zero-state, perspective view

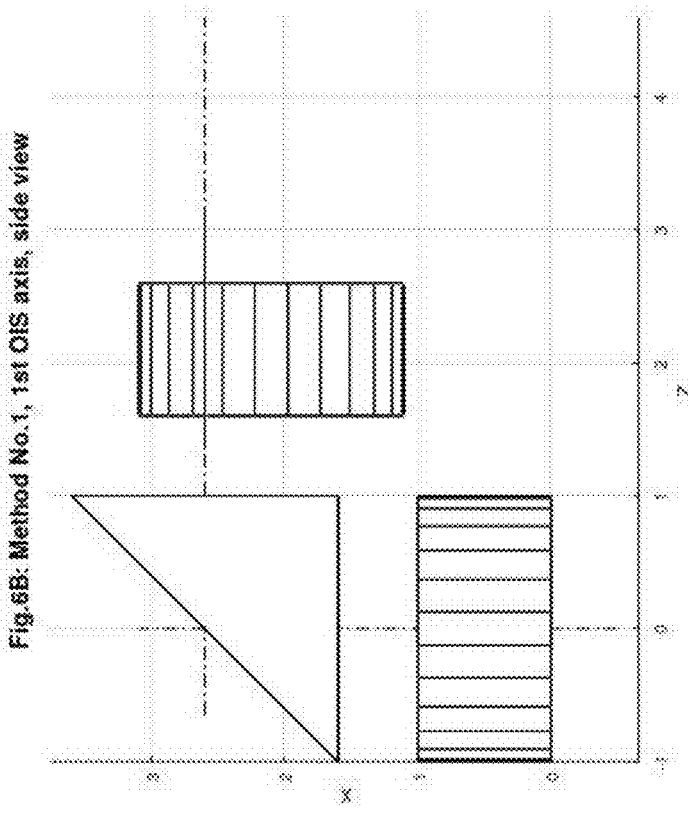
Fig.6B: Method No.1, 1st OIS axis, side view
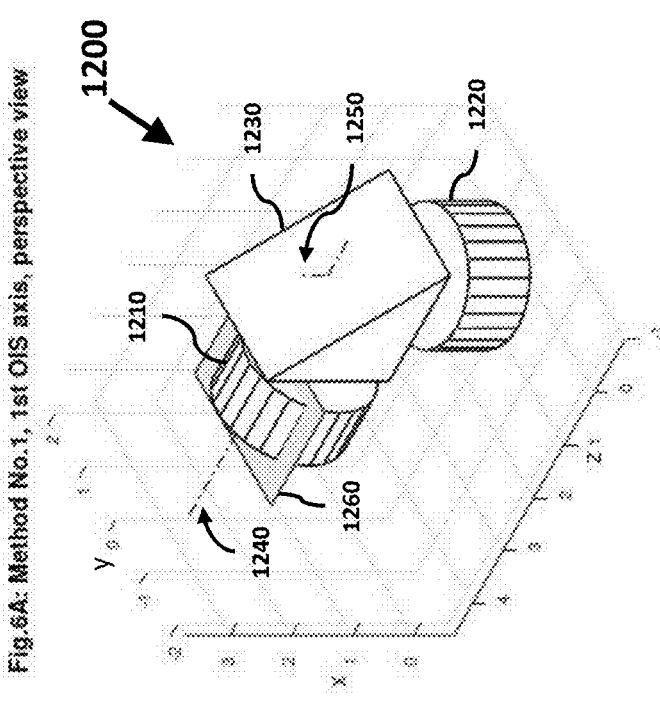
Fig.6A: Method No.1, 1st OIS axis, perspective view

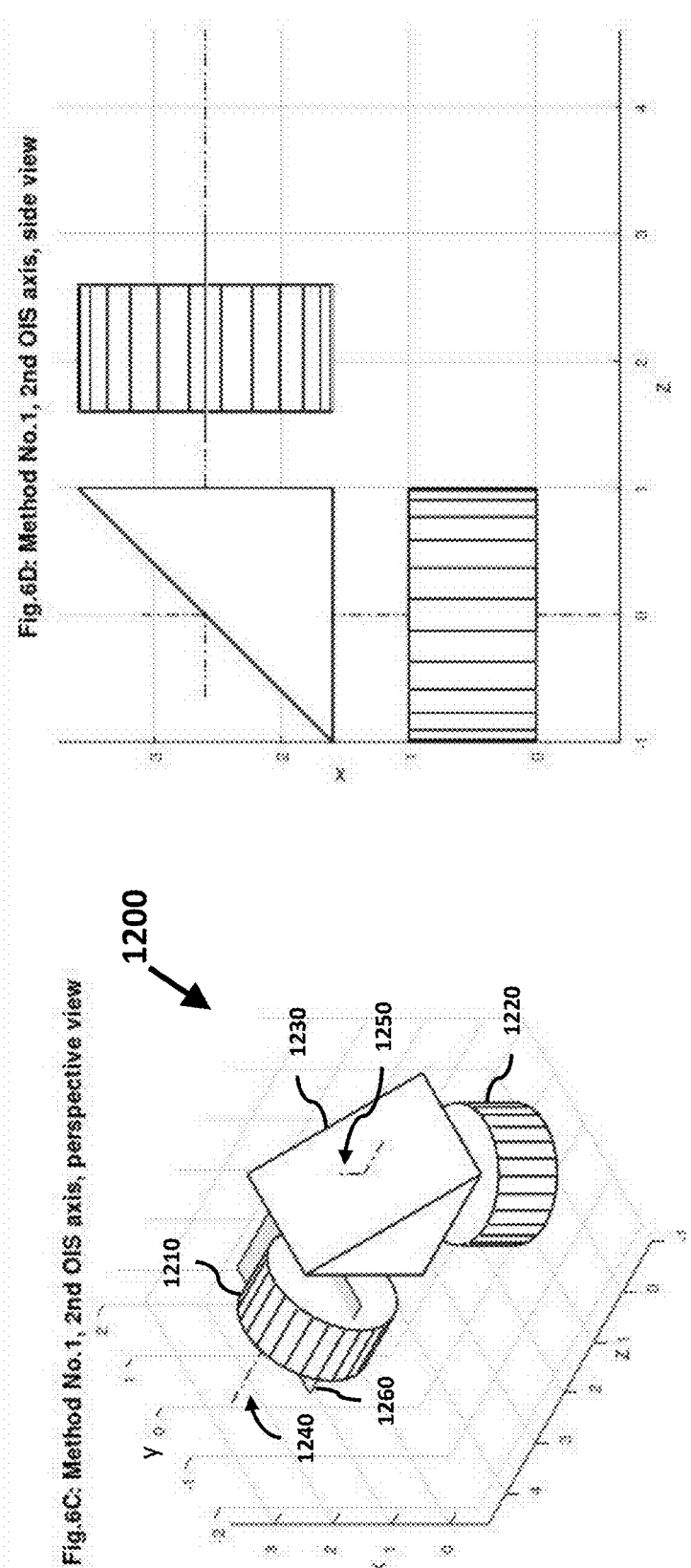
Fig.6D: Method No.1, 2nd OIS axis, side view
Fig.6C: Method No.1, 2nd OIS axis, perspective view

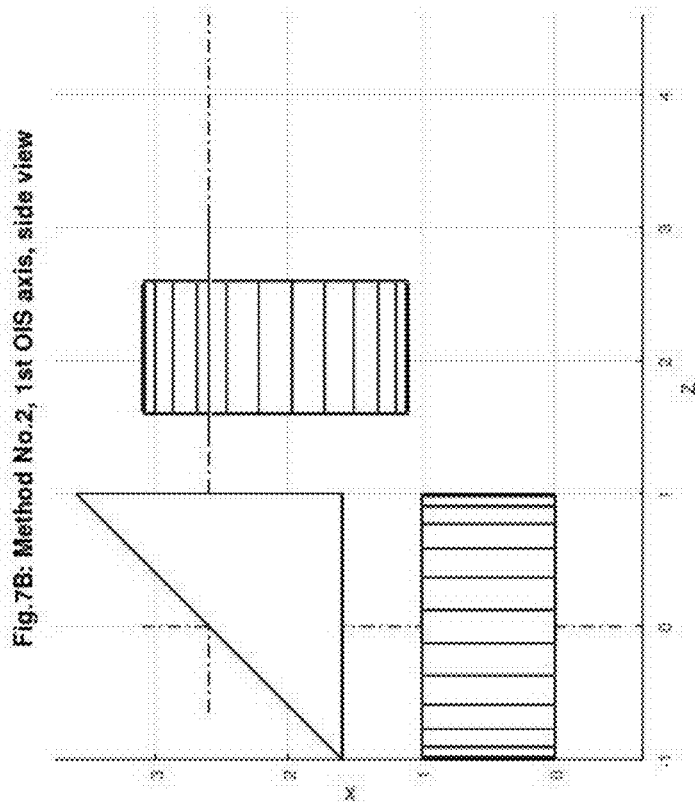
Fig.7B: Method No.2, 1st OIS axis, side view
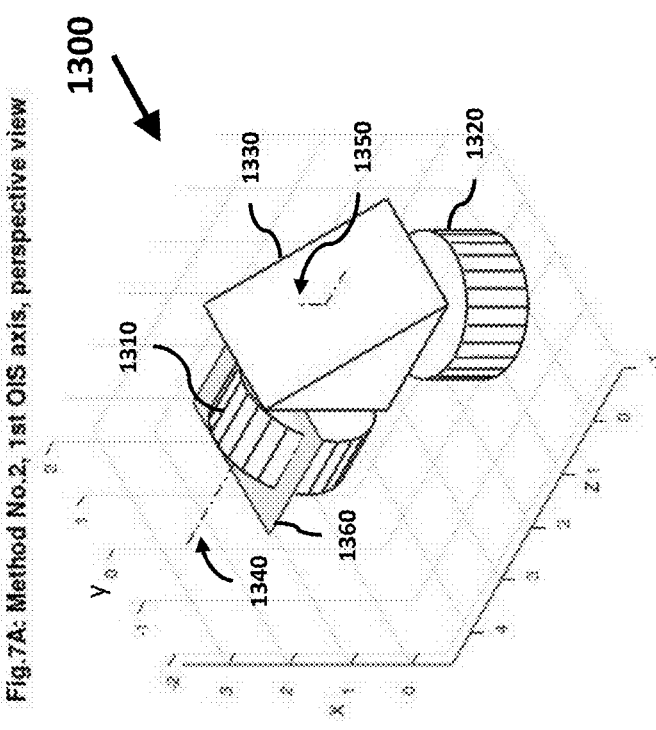
Fig.7A: Method No.2, 1st OIS axis, perspective view

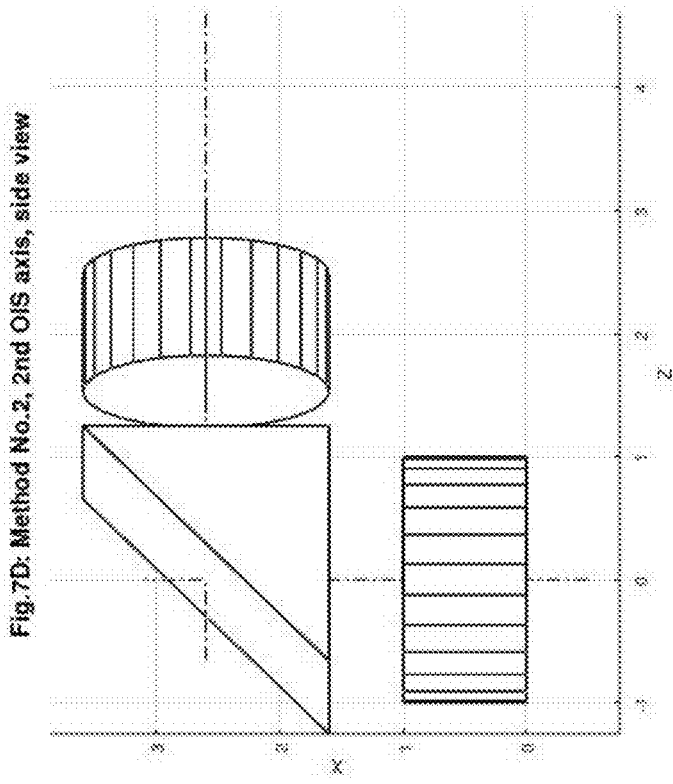
Fig.7D: Method No.2, 2nd OIS axis, side view
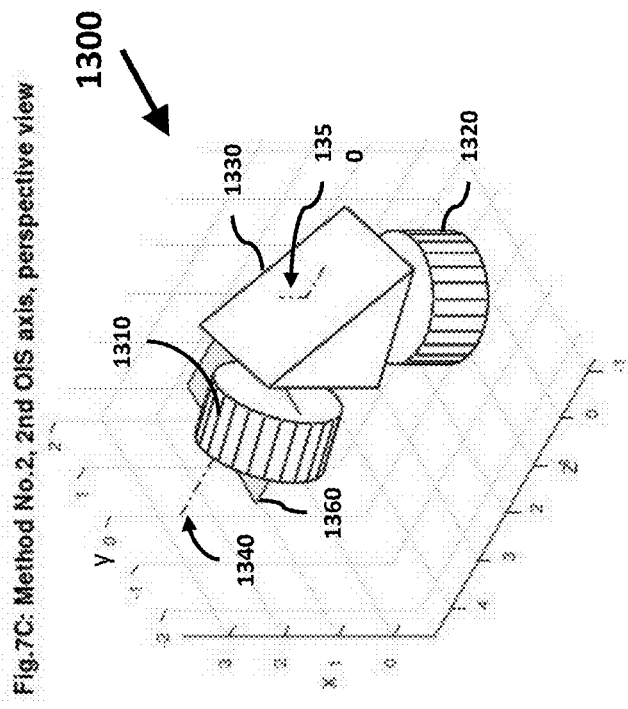
Fig.7C: Method No.2, 2nd OIS axis, perspective view

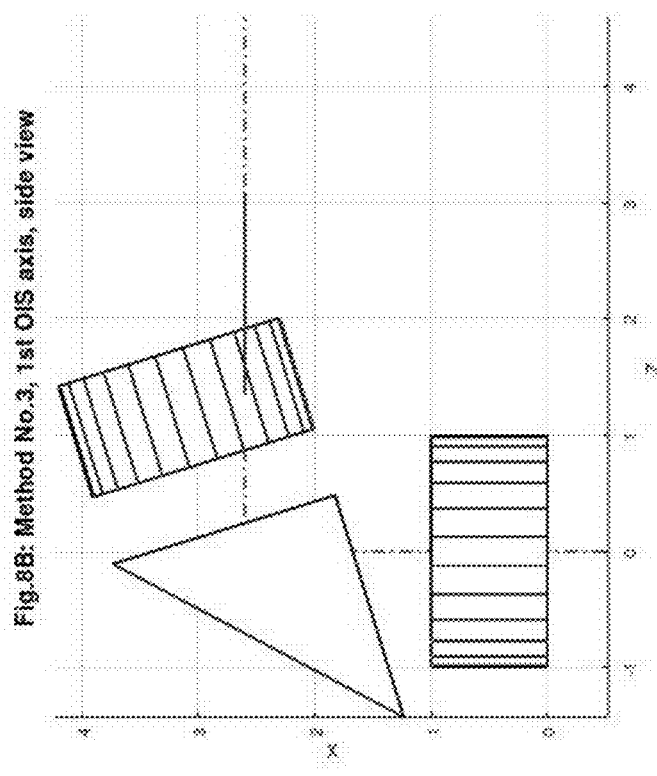
Fig.8B: Method No.3, 1st OIS axis, side view
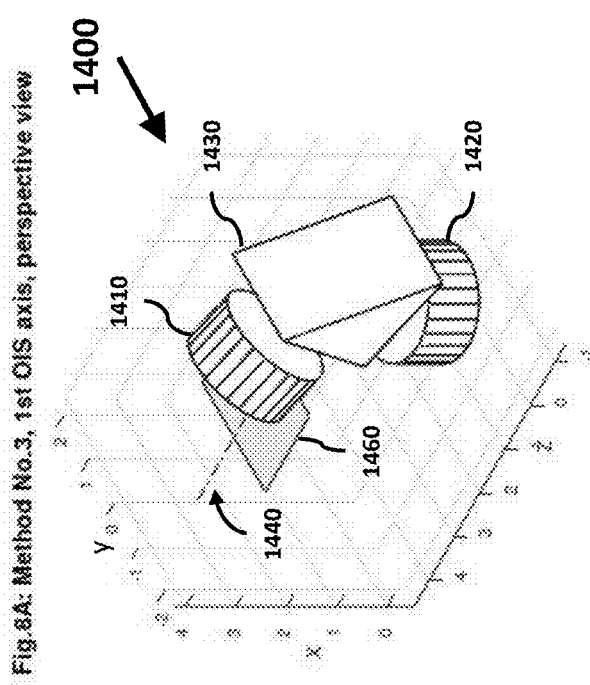
Fig.8A: Method No.3, 1st OIS axis, perspective view
1400
1430
1420
1410
1460
1440

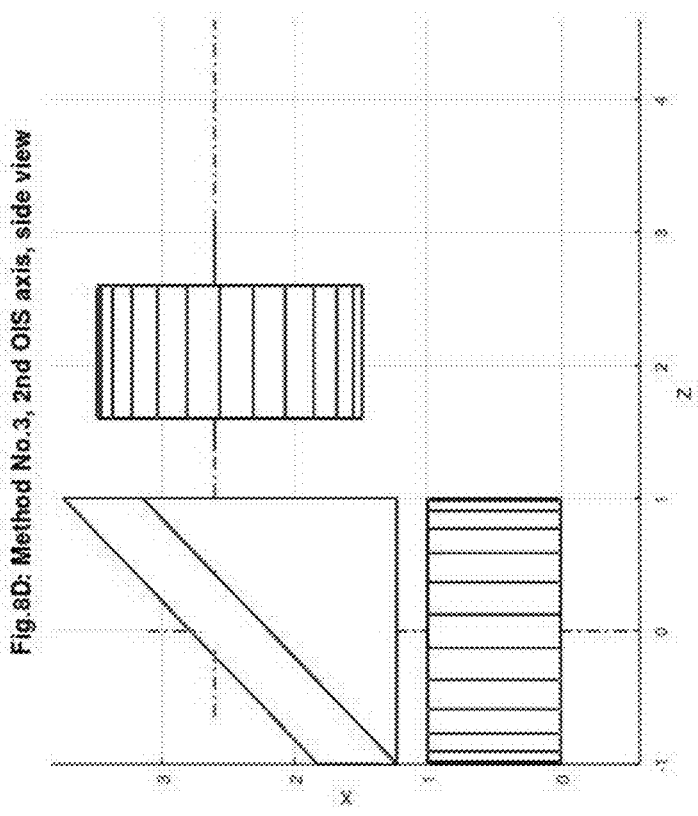
Fig.8D: Method No.3, 2nd OIS axis, side view
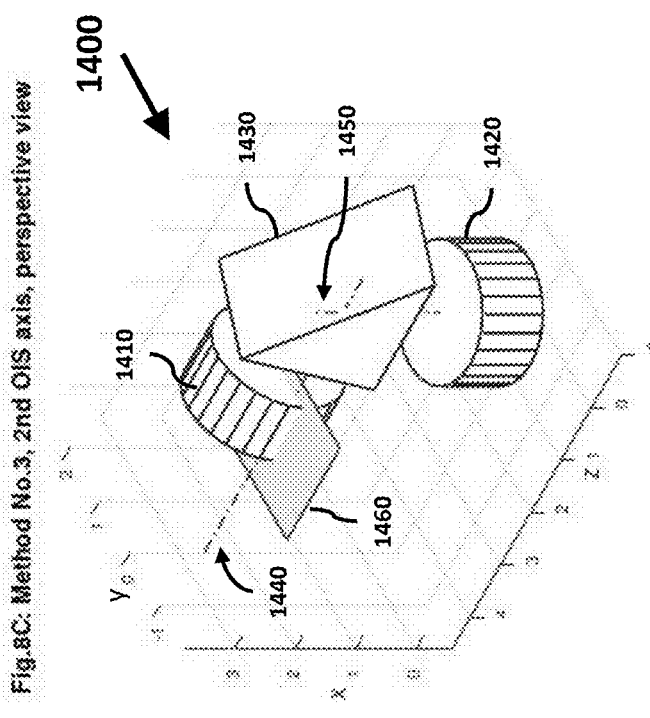
Fig.8C: Method No.3, 2nd OIS axis, perspective view

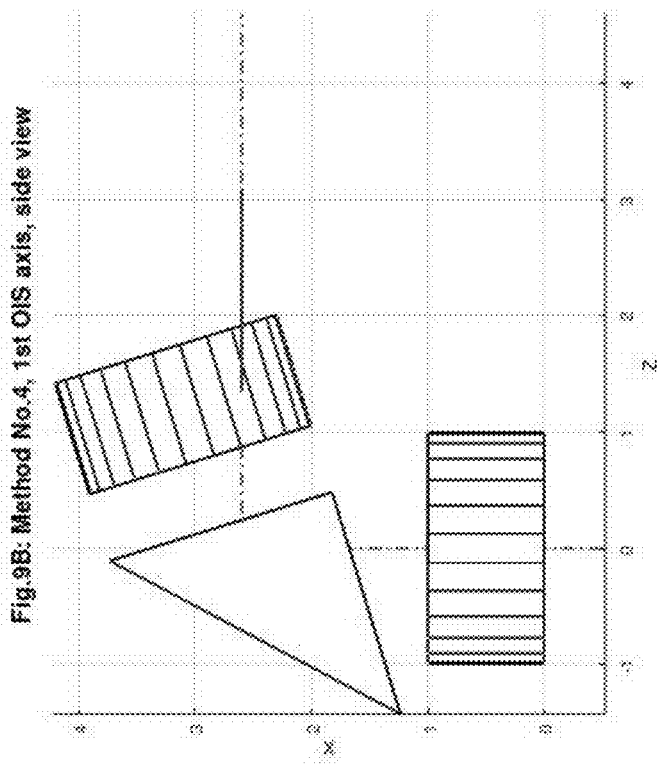
Fig.9B: Method No.4, 1st OIS axis, side view
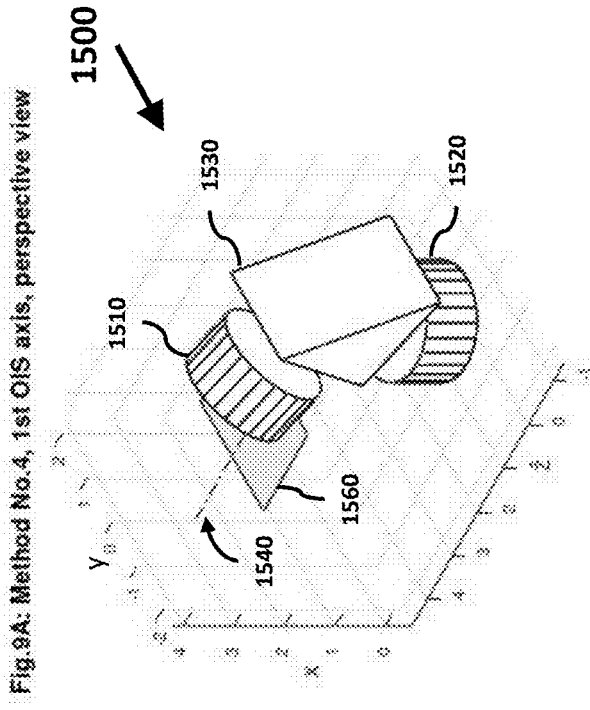
Fig.9A: Method No.4, 1st OIS axis, perspective view
1500

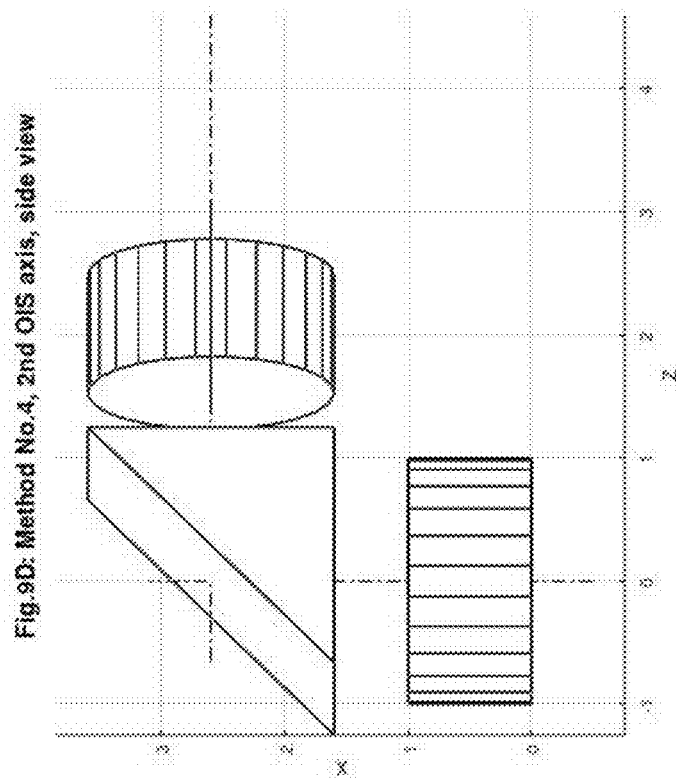
Fig.9D: Method No.4, 2nd OIS axis, side view
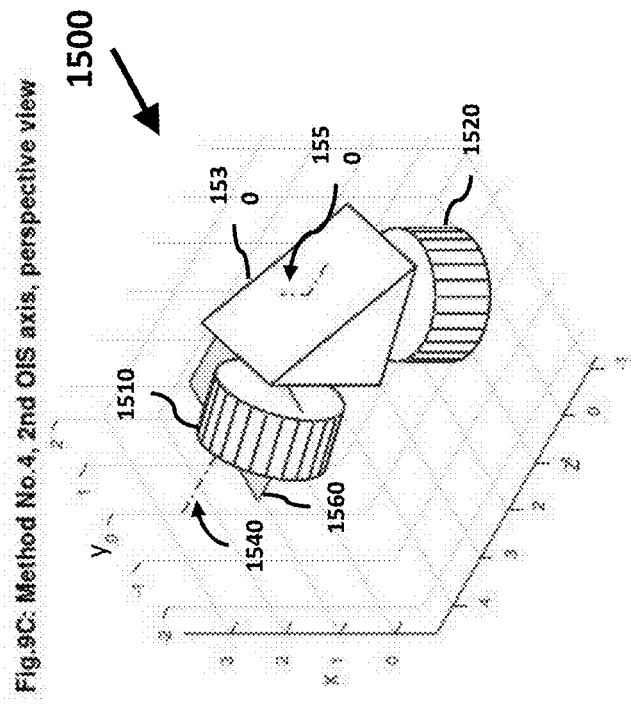
Fig.9C: Method No.4, 2nd OIS axis, perspective view

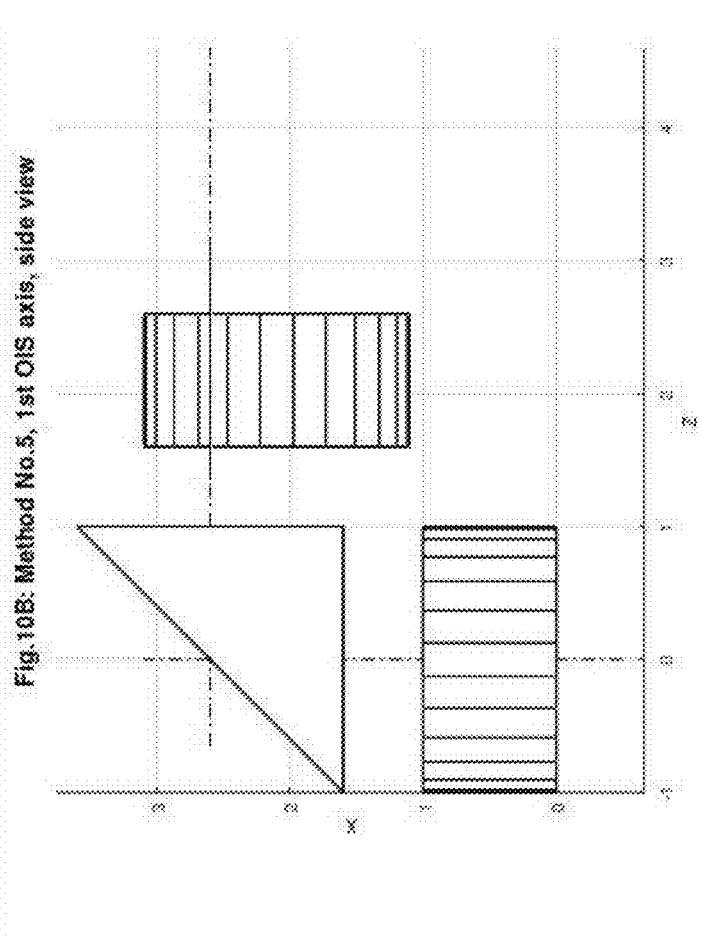
Fig. 10B: Method No.5, 1st OIS axis, side view
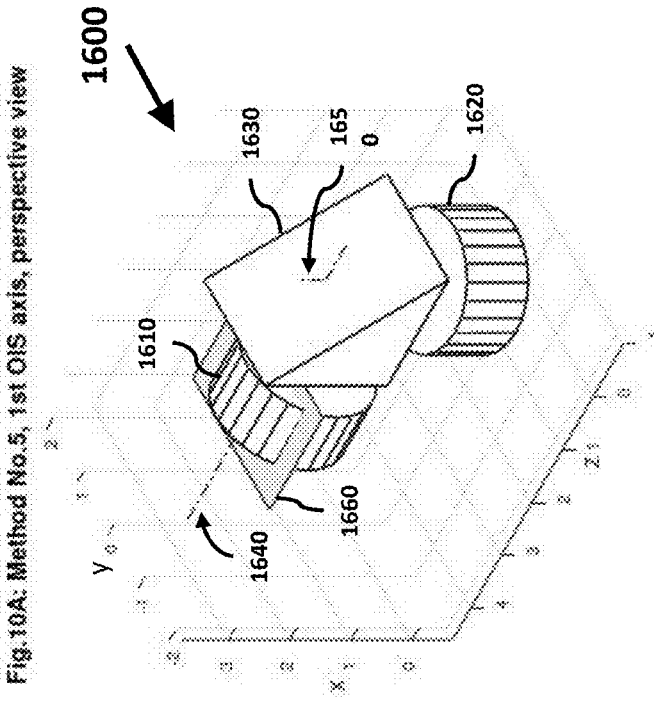
Fig. 10A: Method No.5, 1st OIS axis, perspective view

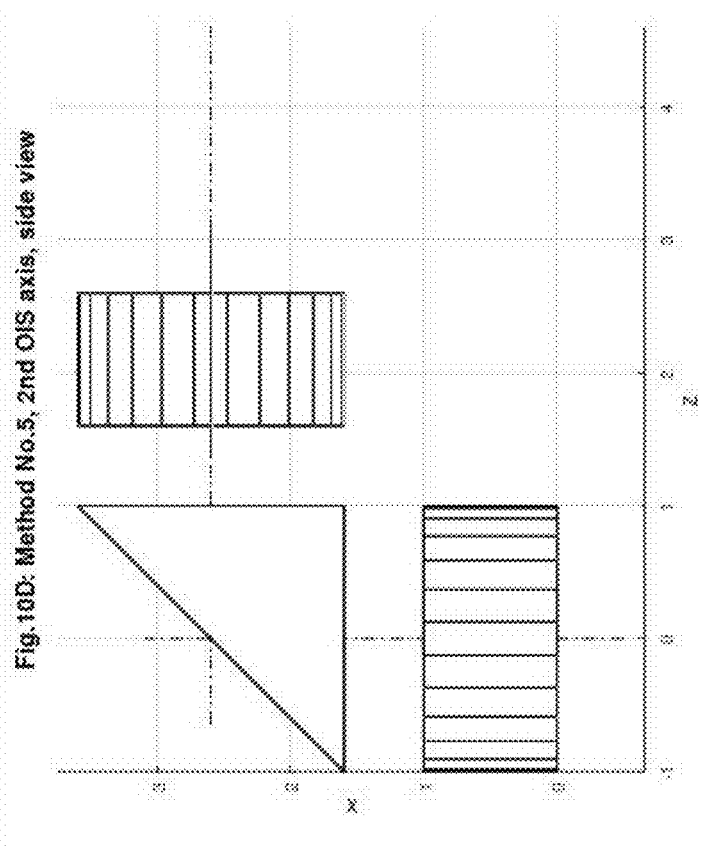
Fig.10D: Method No.5, 2nd OIS axis, side view
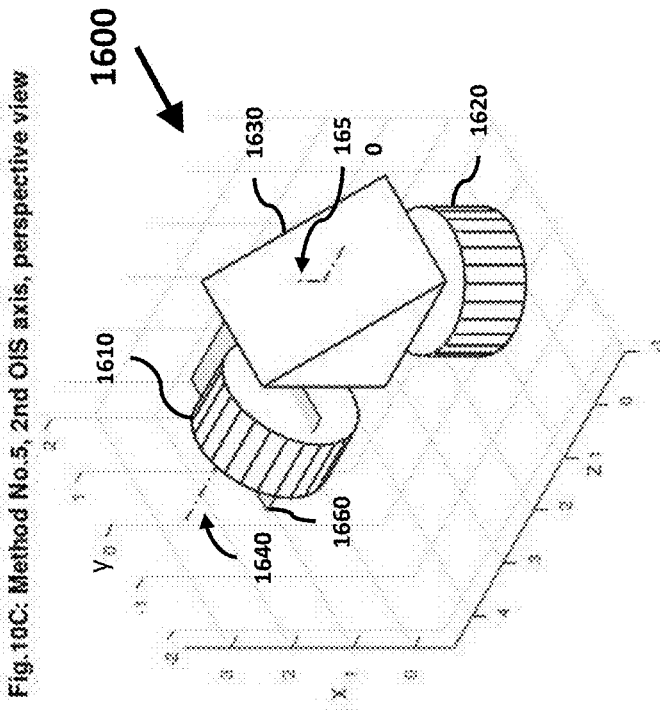
Fig.10C: Method No.5, 2nd OIS axis, perspective view

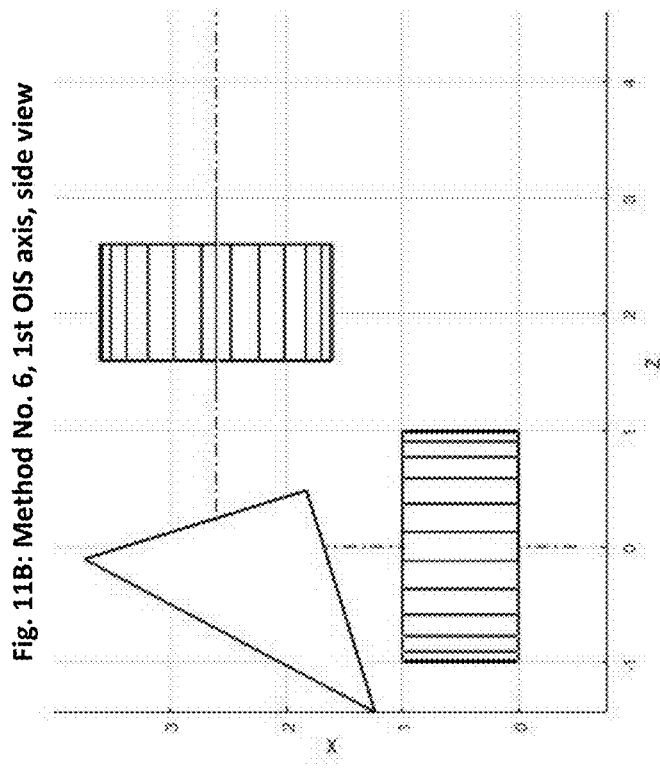
Fig. 11B: Method No. 6, 1st OIS axis, side view
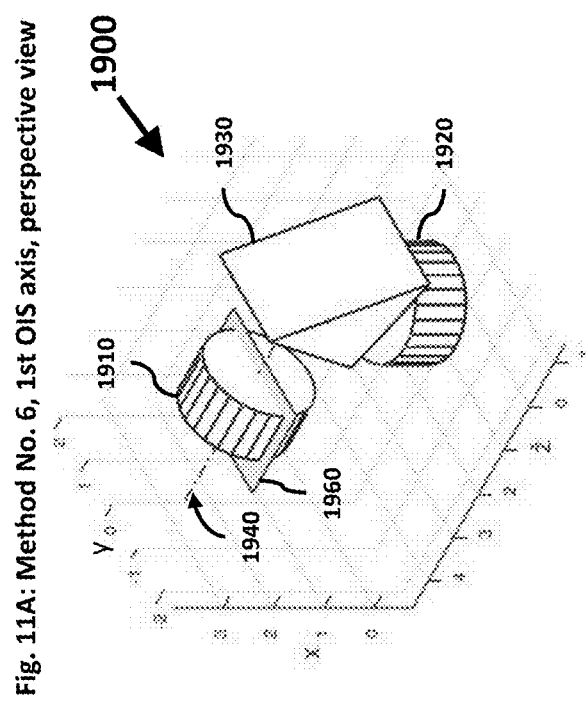
Fig. 11A: Method No. 6, 1st OIS axis, perspective view

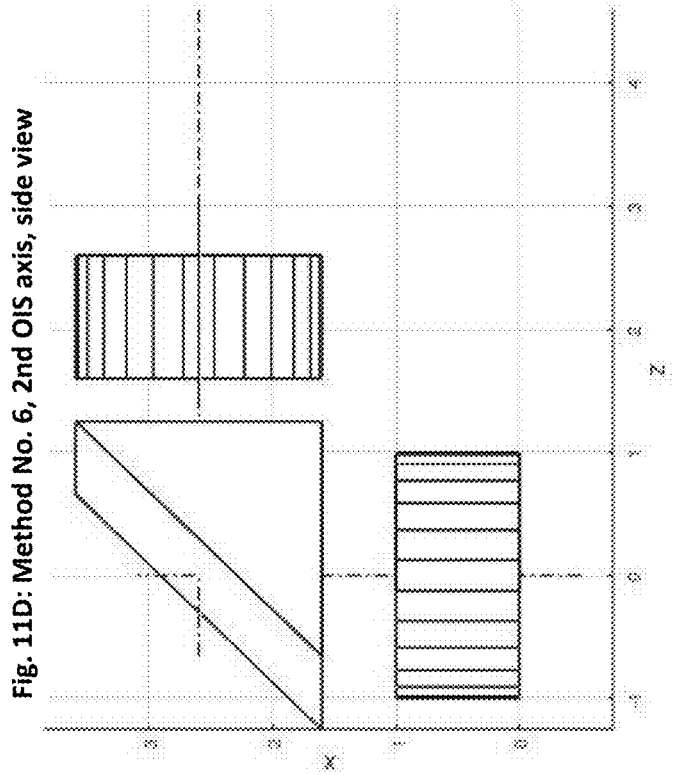
Fig. 11D: Method No. 6, 2nd OIS axis, side view
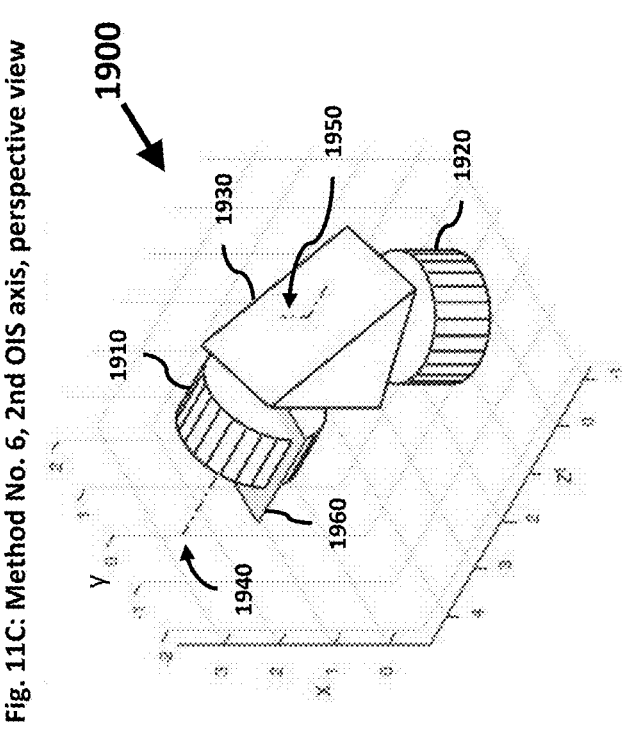
Fig. 11C: Method No. 6, 2nd OIS axis, perspective view

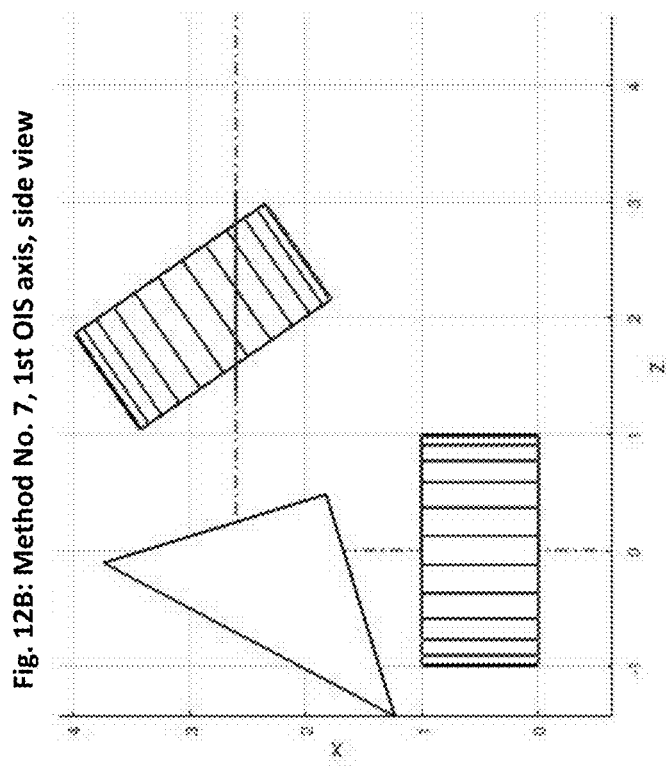
Fig. 12B: Method No. 7, 1st OIS axis, side view
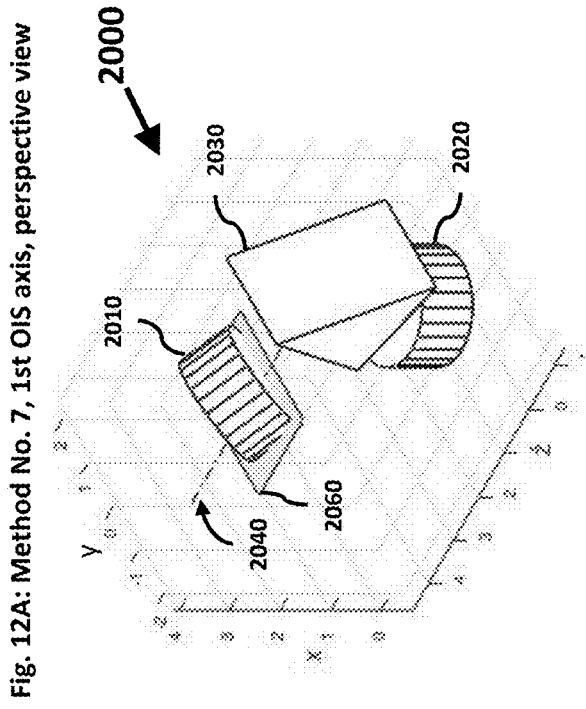
Fig. 12A: Method No. 7, 1st OIS axis, perspective view

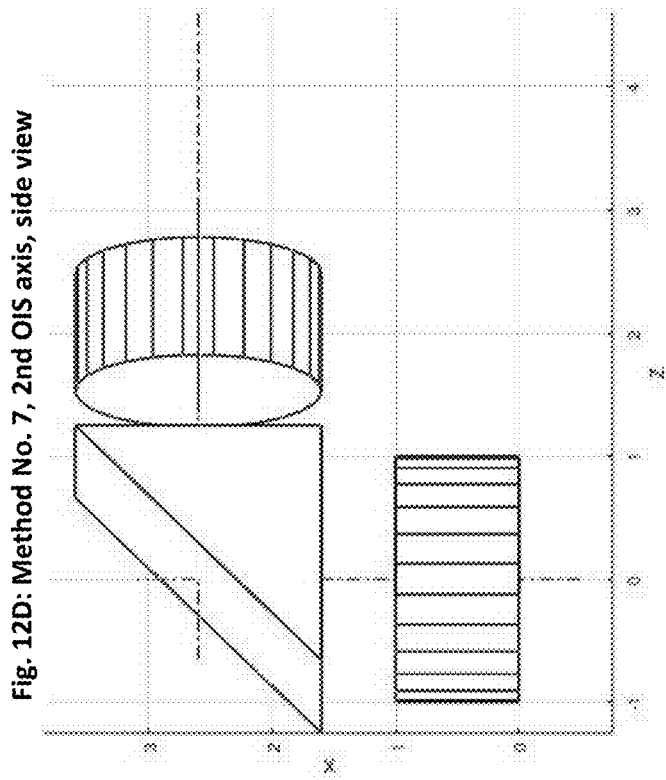
Fig. 12D: Method No. 7, 2nd OIS axis, side view
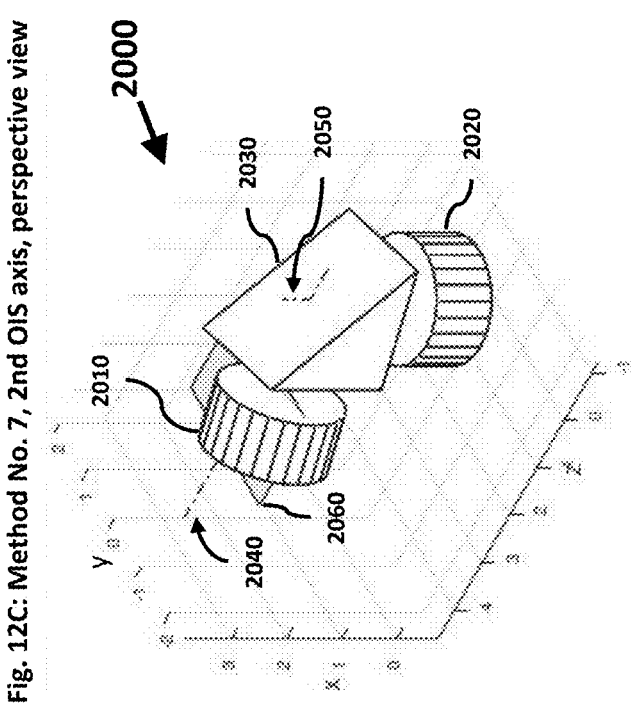
Fig. 12C: Method No. 7, 2nd OIS axis, perspective view

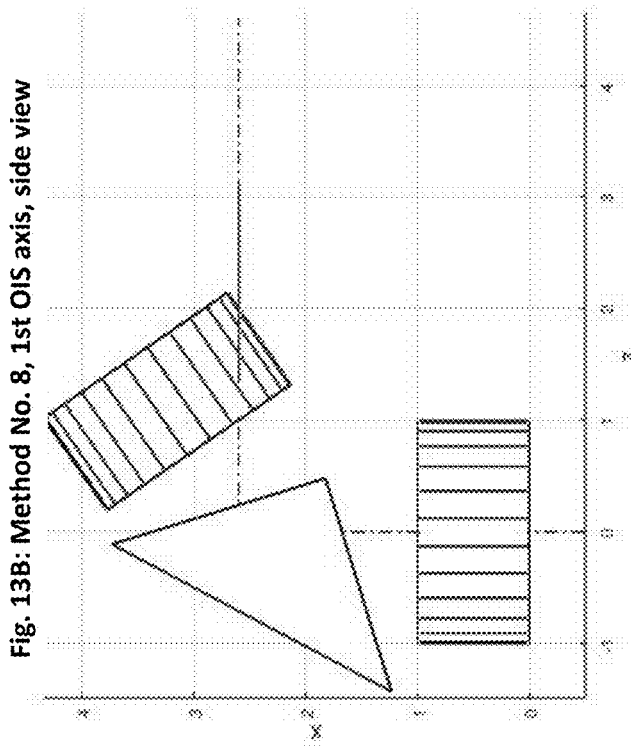
Fig. 13B: Method No. 8, 1st OIS axis, side view
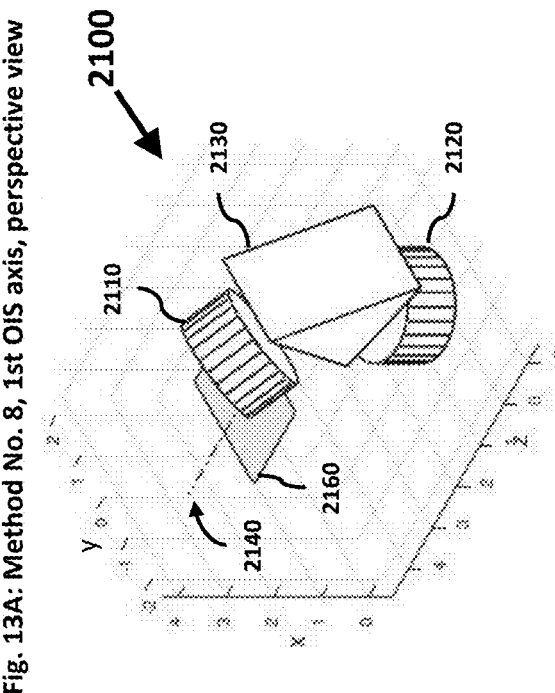
Fig. 13A: Method No. 8, 1st OIS axis, perspective view

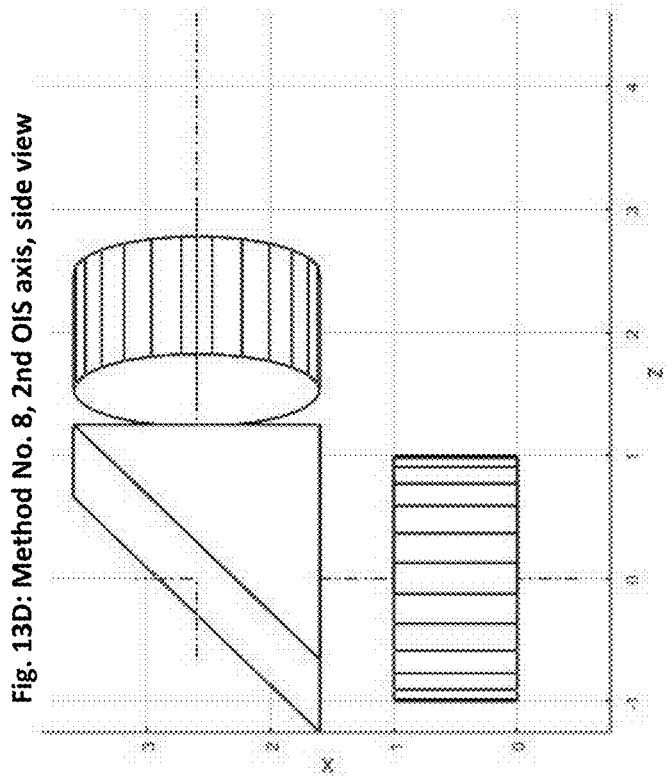
Fig. 13D: Method No. 8, 2nd OIS axis, side view
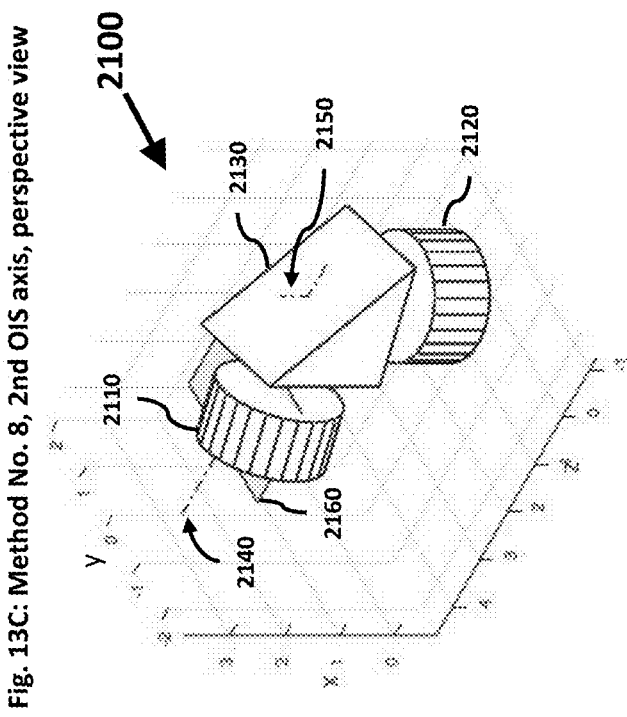
Fig. 13C: Method No. 8, 2nd OIS axis, perspective view

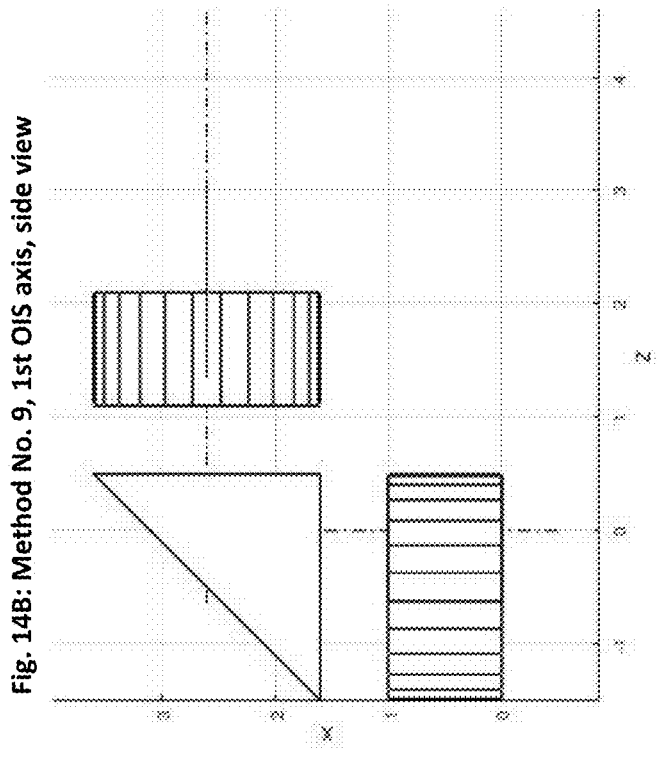
Fig. 14B: Method No. 9, 1st OIS axis, side view
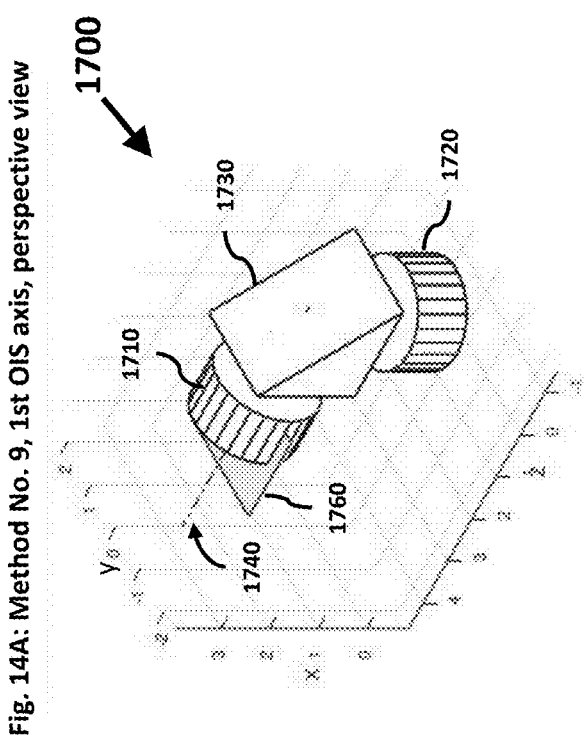
Fig. 14A: Method No. 9, 1st OIS axis, perspective view

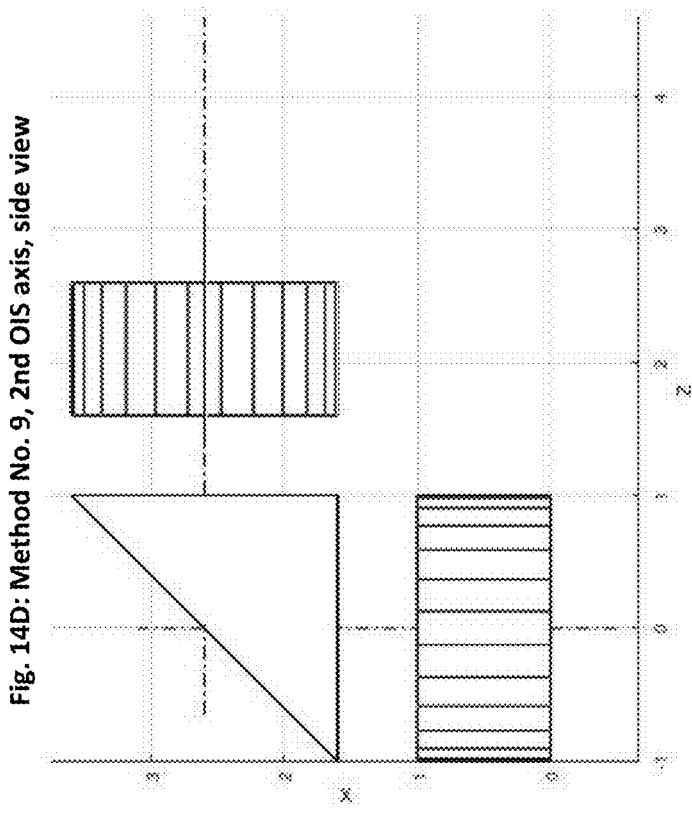
Fig. 14D: Method No. 9, 2nd OIS axis, side view
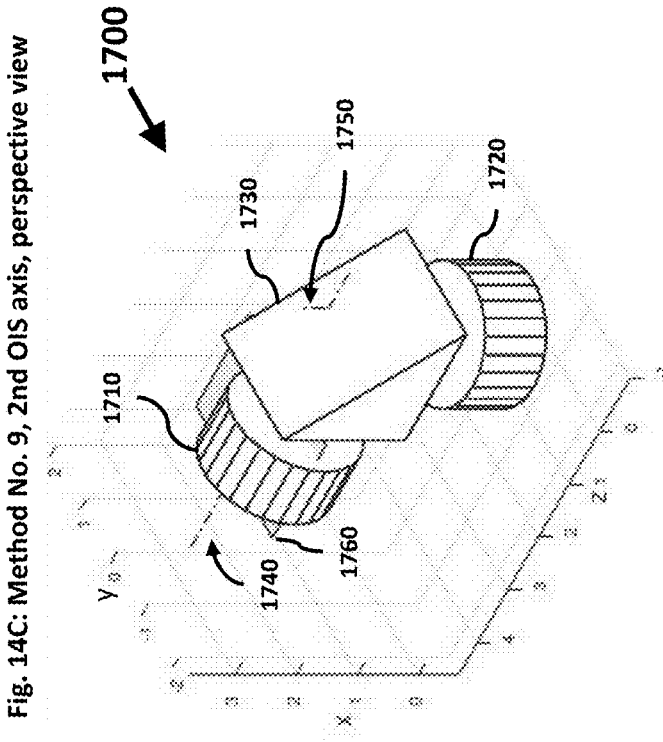
Fig. 14C: Method No. 9, 2nd OIS axis, perspective view
1700
1730
1750
1720
1710
1740
1760

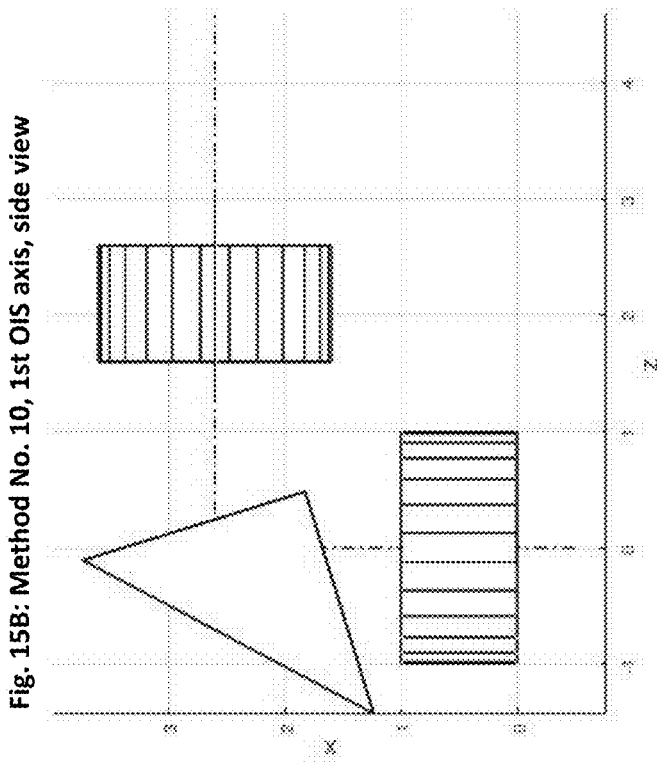
Fig. 15B: Method No. 10, 1st OIS axis, side view
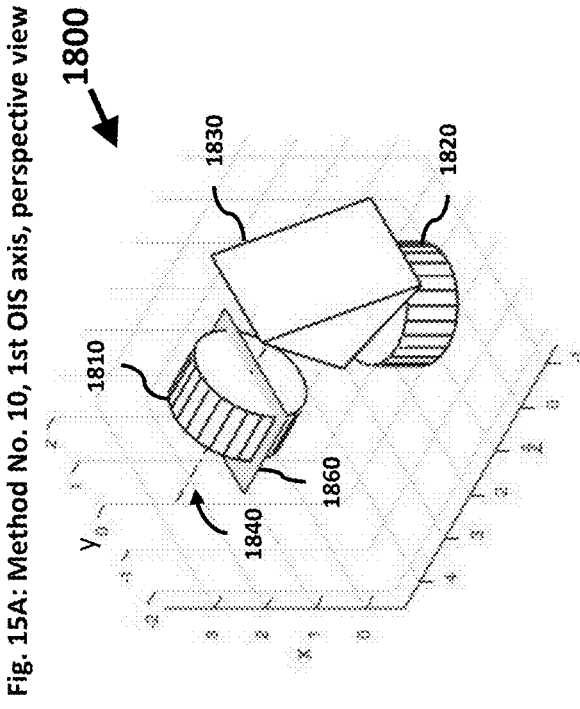
Fig. 15A: Method No. 10, 1st OIS axis, perspective view

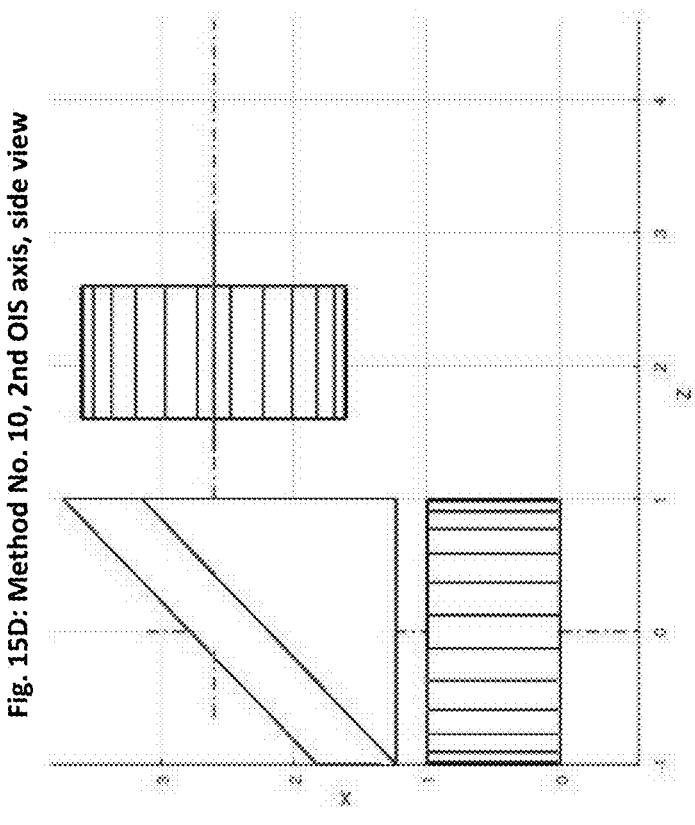
Fig. 15D: Method No. 10, 2nd OIS axis, side view
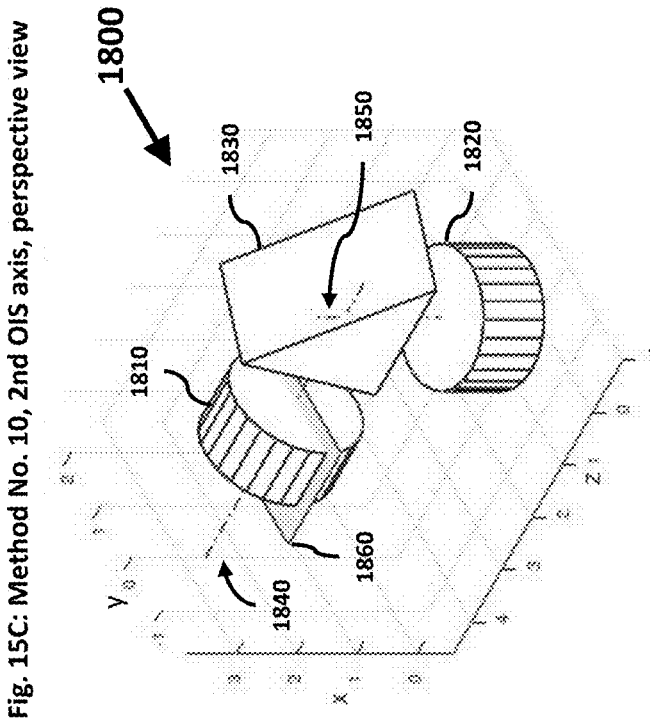
Fig. 15C: Method No. 10, 2nd OIS axis, perspective view

KNOWN ART

Fig. 24E
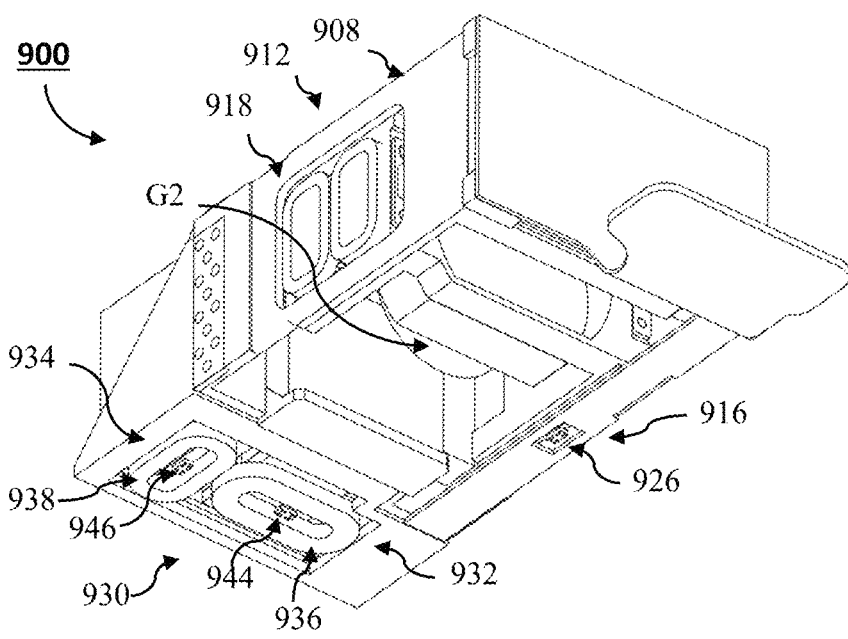
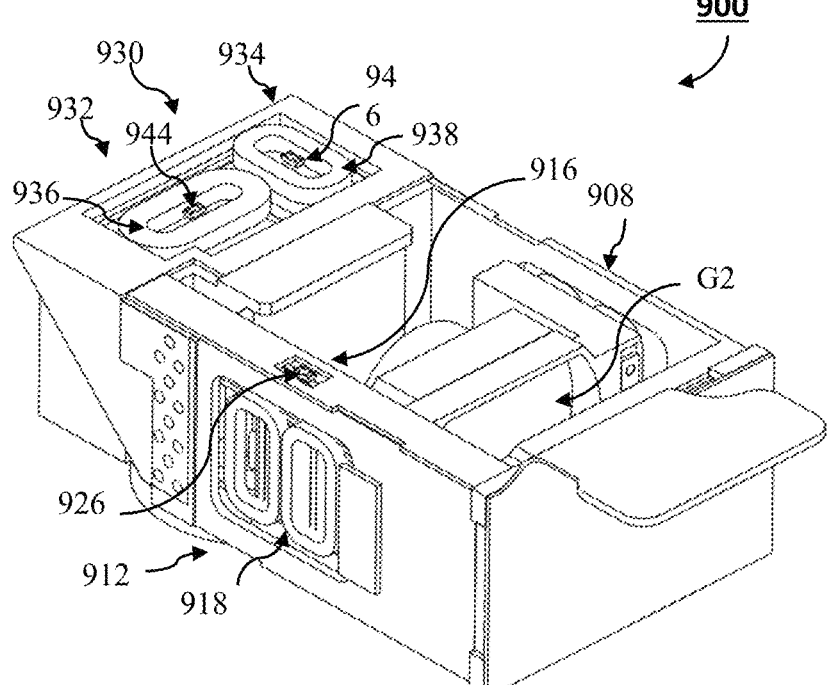
Fig. 24F

1000

1005-1

1002

1006

1000

1002

1006

COMPACT FOLDED TELE CAMERAS

CROSS REFERENCE TO RELATED APPLICATIONS

This is a 371 application from international patent application PCT/IB2023/060577 filed Oct. 19, 2023, which is related to and claims priority from U.S. Provisional Patent Applications No. 63/417,387 filed Oct. 19, 2022, 63/383, 708 filed Nov. 15, 2022, 63/427,870 filed Nov. 24, 2022, 63/386,191 filed Dec. 6, 2022, 63/477,429 filed Dec. 28, 2022, 63/478,520 filed Jan. 5, 2023, 63/482,082 filed Jan. 30, 2023, 63/491,334 filed Mar. 21, 2023, 63/495,144 filed Apr. 10, 2023, 63/502,103 filed May 14, 2023 and 63/513, 862 filed Jul. 15, 2023, all of which are incorporated herein by reference in their entirety.

TECHNOLOGICAL FIELD

The presently disclosed subject matter generally relates to the field of digital cameras. More particularly, the presently disclosed subject matter relates to the field of folded tele camera modules for mobile devices such as smartphones and the like.

BACKGROUND

Multi-aperture cameras (or "multi-cameras", of which a "dual-cameras" having two cameras is an example) are today's standard for portable electronic mobile devices ("mobile devices", e.g. smartphones, tablets, etc.). A multi-camera setup usually comprises a wide field-of-view (or "angle") FOVW camera ("Wide" camera or "W" camera), and at least one additional camera, e.g., with a narrower (than FOVW) FOV (Telephoto or "Tele" camera with FOVT), or with an ultra-wide field of view FOVUW (wider than FOVW, "UW" camera).

FIG. 1A schematically illustrates an embodiment of a known folded Tele camera 100. Camera 100 comprises a lens 102, an optical path folding element (OPFE) 104, e.g., a prism or a mirror, and an image sensor 106 having a sensor height $H_S$ (measured along OP1). OPFE 104 folds a first optical path ("OP1") 108 to a second optical path (OP2) 110. Lens 102 includes a plurality of N lens elements (here: N=7) numbered $L_1$-$L_7$, which is divided into two lens groups, a first group 102-G1 ("G1") that includes $L_1$-$L_4$ and has a thickness $T_{G1}$, is located at an object side of the OPFE and has a lens optical axis which is parallel to OP1, and a second lens group 102-G2 ("G2") that includes $L_5$-$L_7$ and has a thickness $T_{G2}$, is located at an image side of the OPFE and has a lens optical axis which is parallel to OP2, i.e. normal to image sensor 106. Lens elements included in G1 and G2 respectively do not move relative to each other, but they move together as one unit with respect to other components included in camera 100. In some examples, all lens elements of G1 and G2 respectively may be included in, and fixedly coupled to, a single lens barrel. An optical element (not shown) such as an IR filter may be located between 102-G2 and image sensor 106. Lens 102 has a lens width WI. (measured along OP2). A distance between 102-G1 and OPFE 104 is ΔLO. A width of OPFE 104 (measured along OP2) is $W_{OPFE}$. OPFE 104 may be oriented at an angle of 45 degrees with respect to OP1 and OP2, so that for a height $H_{OPFE}$ of OPFE 104 yields $H_{OPFE}=W_{OPFE}$. A distance d(G1–G2) between G1 and G2 is given by d(G1–G2)=d (G1–G2)$_1$+d(G1–G2)$_2$, wherein d(G1–G2)$_1$ is oriented along OP1 108 and d(G1–G2)$_2$ is oriented along OP2 110.

A TTL of camera 100 is divided into TTL$_1$ and TTL$_2$. TTL$_1$ is parallel to OP1 108, TTL$_2$ is parallel to OP2 110 and TTL=TTL$_1$+TTL$_2$. BFL is not divided into two perpendicular components. An aperture of camera 100 is numbered 112.

A theoretical limit for a length of a camera module ("minimum module length" or "MLM") and a first height of a camera module ("minimum module height" or "MHM") and a second height of a camera module ("minimum shoulder height" or "MHS"), wherein MHM>MHS, including camera 100 is shown. MLM, MHM and MHS are defined by the smallest dimensions of the components included in camera 100. Hereinafter "MH" denotes "camera module height", or simpler just "module height", and "SH" denotes "camera shoulder height", or simpler just "shoulder height". The camera module includes a housing 114.

FIG. 1B shows schematically a mobile device 120 (e.g. a smartphone) including known folded Tele camera 100. Aperture 112 of camera 100 is located at rear surface 122, a front surface 124 may e.g., include a screen (not shown). Mobile device 120 has a regular region 126 of thickness ("T") and a camera bump region 128 that is elevated by a height B over regular region 126. Bump region 128 has a bump length ("BL") and a bump thickness that equals T+B. R1 of camera 100 may be integrated into bump region 128, and R2 may be integrated into regular region 126, as shown. For industrial design reasons, a small camera bump (i.e., a short BL) is desired. Camera 100 is integrated in the bump region only partially, what allows a relatively short BL. In general, and particularly for slim mobile devices, it is beneficial to minimize MHM and MHS. Especially, minimizing MHM is of interest, as it allows minimizing B. For compact camera, also minimizing MLM is beneficial. Especially, minimizing R1 is of interest, as it allows minimizing BL.

FIG. 1C illustrates a known dual-camera 150, that comprises a folded zoom Tele camera 160 together with a W camera 180. Folded Tele camera 160 comprises an OPFE 162, e.g., a prism or mirror, a lens 170 with a plurality of lens elements (not visible in this representation) and an image sensor 166. OPFE folds an optical path from an OP1 172 to a OP2 174. W camera 180 comprises a lens 184 with an optical axis 186 and an image sensor 188.

General Description

A technical difficulty arising with camera 100 is that performing optical image stabilization (OIS) and focusing is relatively complex in terms of actuation and/or increases MHM. This amongst others as of the division of lens 102 into two groups.

It would be beneficial to have a folded Tele camera with a divided lens for achieving relatively low f number (f/#) that still allows to perform OIS and focusing with (1) simple actuation and (2) without increasing MHM and/or MHS.

Generally, according to the presently disclosed subject matter, there is provided a folded-camera module for a mobile device. The folded-camera module includes a lens. The lens is having an effective focal length (EFL) in the range of 8 mm<EFL<50 mm and having a f/# lesser than 3.5. The lens is comprises a first lens group (G1) defining a first optical axis (OA1), and a second lens group (G2) defining a second optical axis (OA2). The folded-camera module includes an optical path folding element (OPFE), configured to fold said first optical axis onto said second optical axis. The first lens group is positioned at an object side of the OPFE, and the second lens group is positioned at an image side of the OPFE. The folded-camera module further comprises an image sensor, positioned at the image side of the second lens group. The folded-camera module is configured for obtaining data indicative of a movement of the folded camera module (e.g. a rotational movement). The folded-camera module is further configured for spatially adjusting at least one of the optical elements, that is, at least one of the first lens group, the second lens group, and the OPFE. The spatial adjustment of said optical element(s) is performed so as to compensate for an optical path shift of light entering into the folded camera module due to said movement. Compensating an optical path shift thereby provides OIS, in a first OIS direction (of a sensor plane in which said image sensor extends, also referred to as "direction of the image sensor") and in a second (transverse) OIS direction (of said image sensor).

In some embodiments, the spatial adjustment of optical elements may be performed so that two or more optical elements are adjusted together. In the present disclosure, two or more optical elements which are adjusted "together" may move like a single, rigid body comprising said two or more optical elements. In other words, the adjusted optical elements may move as if they were mechanically coupled so as to form a single rigid body. In some embodiments, said optical elements may be mechanically coupled or controlled electronically so as to move as a rigid body.

In the following, the term "OIS group" is used to refer to optical elements of the folded camera module. being spatially adjusted in coordination for performing OIS in at least one the two OIS directions. As will be described hereinbelow, the present disclosure discloses performing OIS by moving various OIS groups. In some embodiments, the folded-camera module may perform OIS in at least one of the two OIS directions by spatially adjusting an OIS group including the first lens group and the OPFE. In other embodiments, the OIS group may include the first lens group, the second lens group, and the OPFE.

According to a first aspect, the presently disclosed subject matter provides a folded-camera module configured for spatially adjusting the first lens group for compensating an optical path shift of light entering into the folded camera module due to said movement. Spatially adjusting the first lens group includes linearly moving the first lens group along a first axis parallel to the second optical axis, so as. Spatially adjusting the first lens group further includes linearly moving said first lens group along a second axis perpendicular to the first optical axis and perpendicular to the second optical axis, so as to provide OIS in the second OIS direction.

According to an embodiment, folded-camera module provided is further configured for spatially adjusting the OPFE in order to compensate the optical path shift of light entering into the folded camera module due to said movement. The OPFE and said first lens group along said second axis are moved so as to provide OIS in the second OIS direction of said sensor. Optionally, the first lens group and the OPFE are configured to be spatially adjusted together.

According to a second aspect of the presently disclosed subject matter, the folded-camera module provided is configured for spatially adjusting the first lens group and the OPFE. Spatially adjusting the first lens group and the OPFE includes linearly moving the first lens group along a first axis parallel to the second optical axis, so as to provide OIS in the first OIS direction. Spatially adjusting the first lens group and the OPFE includes rotating the first lens group and the OPFE about a second axis parallel to the second optical axis, so as to provide OIS in the second OIS direction. Optionally, the first lens group and the OPFE are configured to be rotated together about the second axis.

According to a third aspect of the presently disclosed subject matter, the folded-camera module provided is configured for spatially adjusting the first lens group and the OPFE. Spatially adjusting the first lens group and the OPFE includes rotating (optionally together) the first lens group and the OPFE about a first axis perpendicular to the first optical axis and perpendicular to the second optical axis, so as to provide OIS in the first OIS direction. Spatially adjusting the first lens group includes rotating (optionally together) the first lens group and the OPFE along/about a second axis parallel to the second optical axis, so as to provide OIS in the second OIS direction.

According to a fourth aspect of the presently disclosed subject matter, the folded-camera module provided is configured for spatially adjusting the first lens group and the OPFE. Spatially adjusting the first lens group and the OPFE includes rotating (optionally together) the first lens group and the OPFE about a first axis perpendicular to the first optical axis and perpendicular to the second optical axis, so as to provide OIS in the first OIS direction. Spatially adjusting the first lens group includes rotating (optionally together) the first lens group and the OPFE along/about a second axis parallel to the first optical axis, so as to provide OIS in the second OIS direction.

According to a fifth aspect of the presently disclosed subject matter, the folded-camera module provided is configured for spatially adjusting the OPFE. Spatially adjusting the OPFE includes rotating the OPFE about a first axis perpendicular to the first optical axis and perpendicular to the second optical axis, so as to provide OIS in the first OIS direction. Spatially adjusting the OPFE includes rotating the OPFE about a second axis parallel to the second optical axis, so as to provide OIS in the second OIS direction.

According to a sixth aspect of the presently disclosed subject matter, the folded-camera module is configured for spatially adjusting the first lens group and the OPFE. In order to provide OIS in the first OIS direction, spatially adjusting the first lens group and the OPFE includes individually rotating the OPFE about a first axis perpendicular to the first optical axis and perpendicular to the second optical axis, and rotating the first lens group about a second axis perpendicular to the first optical axis and perpendicular to the second optical axis. The first axis and the second axis are distinct. The rotation around the first axis is performed so as to rotate by a first angle. The rotation around the second axis is performed so as to rotate by a second angle in order to provide OIS in the second OIS direction, spatially adjusting the first lens group and the OPFE includes rotating together the first lens group and the OPFE about a third axis parallel to the second optical axis.

According to a seventh aspect of the presently disclosed subject matter, the folded-camera module provided is configured for spatially adjusting the first lens group and the OPFE. In order to provide OIS in the first OIS direction, the folded camera module is configured so that spatially adjusting the first lens group and the OPFE includes rotating (optionally together) the first lens group and the OPFE about a first axis perpendicular to the first optical axis and perpendicular to the second optical axis and additionally rotating the first lens group about a second axis perpendicular to the first optical axis and perpendicular to the second optical axis. The first axis and the second axis are distinct. The rotation around the first axis is performed so as to rotate by a first angle. The rotation around the second axis is performed so as to rotate by a second angle. The resulting movement of the first lens group is a combined rotation. For example, the OPFE and first lens group may be configured to be rotatable around the first axis (e.g. by being mounted on a platform pivoting around the first axis) and the first lens group may be configured to be rotatable around the second axis relative to the platform. In order to provide OIS in the second OIS direction, the folded camera module is configured so that spatially adjusting the first lens group and the OPFE includes rotating together the first lens group and the OPFE about a third axis parallel to the second optical axis.

According to embodiments of the sixth and seventh aspects, the second angle is twice the first angle.

According to embodiments of the sixth and seventh aspects, the OIS includes selecting any of the first axis and the second axis.

According to an eighth aspect of the presently disclosed subject matter, the folded-camera module provided is configured for spatially adjusting the first lens group and the second lens group. Spatially adjusting the first lens group and the second lens group includes linearly moving said first lens group along a first axis parallel to the second optical axis so as to provide OIS in the first OIS direction. Spatially adjusting the first lens group and the second lens group includes linearly moving together said first lens group and said second lens group along a second axis perpendicular to the first optical axis and perpendicular to the second optical axis so as to provide OIS in the second OIS direction.

According to an ninth aspect of the presently disclosed subject matter, the folded-camera module provided includes a third lens group (G3). The third lens group is positioned at an image side of second lens group. In other words, the third lens group is positioned between the image side of the second lens group and the image sensor. An optical axis of the third lens group is shared with the second optical axis. In other words, the optical axis of the third lens group coincides with the second optical axis. The folded-camera module provided is configured for spatially adjusting the first lens group, the second lens group, and the OPFE. Spatially adjusting the first lens group, the second lens group, and the OPFE includes rotating together said first lens group, said OPFE and said second lens group about a first axis perpendicular to the first optical axis and perpendicular to the second optical axis, so as to provide OIS in the first OIS direction. Spatially adjusting the first lens group, the second lens group, and the OPFE includes rotating together said first lens group, said OPFE and said second lens group about a second axis parallel to the second optical axis, so as to provide OIS in the second OIS direction.

According to a tenth aspect of the presently disclosed subject matter, the folded-camera module provided is configured for spatially adjusting the first lens group, the second lens group, and the OPFE. Spatially adjusting the first lens group, the second lens group, and the OPFE includes linearly moving (optionally together) the first lens group, the second lens group, and the OPFE along a first axis parallel to the first optical axis, so as to provide OIS in the first OIS direction. Spatially adjusting the first lens group, the second lens group, and the OPFE includes linearly moving (optionally together) the first lens group, the second lens group, and the OPFE along a second axis perpendicular to the first optical axis and perpendicular to the second optical axis, so as to provide OIS in the second OIS direction.

According to an eleventh aspect of the presently disclosed subject matter, the folded-camera module provided is configured for spatially adjusting the OPFE. Spatially adjusting the OPFE includes rotating the OPFE about a first axis perpendicular to the first optical axis and perpendicular to the second optical axis, so as to provide OIS in the first OIS direction. Spatially adjusting the OPFE includes rotating the OPFE about a second axis parallel to the first optical axis, so as to provide OIS in the second OIS direction.

A folded-camera module for a mobile device, according to any of the first to eleventh aspects of the presently disclosed subject matter, can optionally comprise one or more of features (i) to (xviii) below, in any technically possible combination or permutation:

- i. configured for performing auto focus (AF) by moving the second lens group along an axis parallel to the second optical axis.
- ii. comprising 6 lens elements or 7 lens elements.
- iii. the f/# is less than 3.25. Preferably, the f/# is less than 3, more preferably less than 2.9, and even more preferably, less than 2.8.
- iv. a movement of the first lens group ($\Delta_{G1}$) is greater than a shift of an image formed at the image sensor ($\Delta_{Sensor}$) along the first OIS direction.
- v. a movement of the first lens group ($\Delta_{G1}$) is greater than a shift of an image formed at the image sensor ($\Delta_{Sensor}$) along the second OIS direction.
- vi. the first lens group includes 2 or 3 lens elements and the second lens group includes 3 or 4 elements.
- vii. a folding angle is smaller than 90°.
- viii. the OPFE is an obtuse-triangular prism.
- ix. the prism comprises a top surface and two side surfaces. An angle α formed between the top surface and a first of the two side surfaces is greater than 90°. An angle β formed between the two side surfaces being greater than 45°. An angle γ formed between the top surface and a second of the two side surfaces being smaller than 45°.
- x. α is in the range of 90°-100°, β is in the range of 45°-55°, and γ is in the range of 35°-45°.
- xi. α is in the range of 90°-95°, β is in the range of 45°-50°, and γ is in the range of 40°-45°.
- xii. the image sensor is perpendicular to the second optical path.
- xiii. a minimum object-lens distance ($u_{min}$) the camera can focus to is less than 25 cm.
- xiv. a magnitude of an effective focal length of the second lens group is at least three-fold greater than a magnitude of an effective focal length of the first lens group.
- xv. an effective focal length of the first lens group is less than 0.8 times the effective focal length.
- xvi. a total track length (TTL) is less than 1.1 times the effective focal length.
- xvii. a minimum module length (MLM) is less than the effective focal length.
- xviii. a minimum module length (MLM) is less than 0.9 times a total track length (TTL).

The present disclosure also provides a portable device embedding the folded-camera module according to any of the previous aspects.

According to some embodiments, the folded-camera module is configured as a zoom camera.

According to some embodiments, the folded-camera module is configured as a telephoto camera.

According to some embodiments, the folded-camera module is included in a camera assembly comprising at least two cameras.

It is notable that the folded-camera module according to the first to tenth aspects can have a third lens group similarly to the eleventh aspect. The third lens group can, for example, be used for implementing an autofocus function. In some embodiments that include a third lens group, the first lens group, the second lens group, and the OPFE are together configured as a beam contractor.

In this application, the following symbols, terms and abbreviations may be understood according to the below explanations:

The term "total track length" (TTL) may refer to the maximal distance, measured along an axis parallel to the optical axis of a lens, between a point of the front surface S1 of a first lens element $L_1$ and an image sensor, when the system is focused to an infinity object distance.

The term "back focal length" (BFL) may refer to the minimal distance, measured along an axis parallel to the optical axis of a lens, between a point of the rear surface S2N of the last lens element LN and an image sensor, when the system is focused to an infinity object distance.

The term "effective focal length" (EFL) in a lens (assembly of lens elements L1 to LN), may refer to the distance between a rear principal point P' and a rear focal point F' of the lens.

The term f-number (f/#) may refer to the ratio of the EFL to an entrance pupil diameter (or simply aperture diameter "DA").

The terms "optical lens system" and "lens system" may be interchangeable.

In the present disclosure, the camera module is folded by an OPFE, which defines a first lens group positioned on the object side relative to the OPFE and a second lens group positioned on the image side relative to the OPFE. The first lens group (for example, 102-G1 in FIGS. 1-2) may be referred to as G1. The second lens group of a camera module (for example, 102-G2 in FIGS. 1-2) may be referred to as G2.

$L_1$ may refer to the lens element closest to the object side. In other words, $L_1$ may refer to the first lens element that any light-ray, emitted from an object, may impinge upon.

$L_N$ may refer to the lens element closest to the image side, i.e., the side where the image sensor may be located. In other words, $L_N$ may refer to the last lens element that any light-ray, emitted from an object, may impinge upon.

Each lens element may have two surfaces, a "front surface" and a "rear surface". The term "front surface" of a lens element may refer to a surface of a lens element located closer to the entrance of the camera (camera object side). The term "rear surface" may refer to the surface of a lens element located closer to the image sensor (camera image side).

A front surface of a lens element $L_i$ may be indexed by $S_{2i-1}$, and the respective rear surface $S_{2i}$. Alternatively, lens surfaces may be indexed by "$S_k$", with k running from 1 to 2N. The front surface and the rear surface can be in some cases aspherical.

In the present application, tables and corresponding figures detail lens-element parameters of different lens elements, for different exemplary embodiments. The following definitions and parameters may be used throughout the different exemplary embodiments: The surfaces may be classified according to the following types:

a) Plano: flat surfaces, no curvature b) Q type 1 (QT1), where the following first surface sag formula may be used:

$$z(r) = \frac{cr^2}{1 + \sqrt{1 - (1+k)c^2 r^2}} + D_{con}(u) \quad \text{(Eq. 1)}$$

$$D_{con}(u) = u^4 \sum_{n=0}^{k} A_n Q_n^{con}(u^2)$$

$$u = \frac{r}{r_{norm}}, x = u^2$$

$$Q_0^{con}(x) = 1 \quad Q_1^{con} = -(5-6x) \quad Q_2^{con} = 15 - 14x(3-2x)$$

$$Q_3^{con} = -\{35 - 12x[14 - x(21 - 10x)]\}$$

$$Q_4^{con} = 70 - 3x\{168 - 5x[84 - 11x(8-3x)]\}$$

$$Q_5^{con} = -[126 - x(1260 - 11x\{420 - x[720 - 13x(45 - 14x)]\})]$$

$$Q_6^{con} = 210 + 11x\{-252 + x[1260 + 13x(-240 + 7x\{45 - 30x + 8x^2\})]\}$$

$$Q_7^{con} =$$
$$-330 + 5544x - 36036x^2 + 120120x^3 - 225225x^4 + 240240x^5 - 13636x^6 + 31824x^7$$

For the sake of simplicity, the same terms of the first lens group (or G1) and the second lens group (or G2) are used in the various embodiments to refer to the lens group before (on the object side) and after (on the image side) the OPFE.

The term OA1 may refer to the optical axis of the first lens group.

The term OA2 may refer to the optical axis of the second lens group.

The term OP1 may refer to an axis parallel to OA1. OP1 can coincide with OA1, but may not necessarily coincide with OA1.

The term OP2 may refer to an axis parallel to OA2. OP2 can coincide with OA2, but may not necessarily coincide with OA2.

A lens may include a plurality of N lens elements, that may be indexed by $L_i$, where "i" is an integer between 1 and N.

or alternatively, the following second surface sag formula (Even-Asphere (ASP)) may be used:

$$z(r) = \frac{cr^2}{1 + \sqrt{1 - (1+k)c^2 r^2}} + \alpha_1 r^2 + \quad \text{(Eq. 2)}$$
$$\alpha_2 r^4 + \alpha_3 r^6 + \alpha_4 r^8 + \alpha_5 r^{10} + \alpha_6 r^{12} + \alpha_7 r^{14} + \alpha_8 r^{16}$$

where $\{z, r\}$ may denote the standard cylindrical polar coordinates, c may denote the paraxial curvature of the surface, k may denote the conic parameter, $r_{norm}$ may denote one half of the surface's clear aperture, and $A_n$ may denote the polynomial coefficients of the first surface sag formula. The coefficients $A_n$ are shown in lens data tables. The direction of a Z axis may be positive towards the image.

Values for a clear-aperture, a term known in the art, may be denoted "CA", and may be given as a clear aperture radius, i.e., as CA/2.

A reference wavelength may be 555.0 nm.

Values representing length may be provided in millimetres, except for refraction index ("Index") and Abbe #, which are unit-less.

Each lens element $L_i$ may have a respective focal length $f_i$.

An FOV may be given as a half FOV (HFOV). The Tables may provide the clear aperture radius of an OPFE (for example, in FIGS. 18A-18C, prism 304). The CA radius may represent a circular optical active area of an OPFE.

For OPFE's that may be implemented by Prisms, rectangular apertures half-widths may be 3.0×2.91 mm, 2.9×4.11 mm, 3.0×2.81 mm for the entrance, reflection and exit surfaces respectively. Thicknesses of prism surfaces may be measured along OP1 and OP2, respectively. For example, in FIGS. 18A-18C, OP1 310 and OP2 312, respectively.

For estimating theoretical limits for minimum dimensions of a camera module that includes optical lens systems described herein, referring to FIGS. 1A-1C as an example, the following parameters and interdependencies are introduced:

MLM and "module length" ("ML")—Minimum module length ("MLM") is the theoretical limit for a length of a camera module that includes all components of camera 100. $MLM=max(Z_{Lens}, Z_{OPFE})-Z_{Sensor}$, $max(Z_{Lens}, Z_{OPFE})$ being the maximum z-value of lens 102-G1 ($Z_{Lens}$) or OPFE 104 ($Z_{OPFE}$) and $Z_{Sensor}$ being the minimum z-value of image sensor 106. In some embodiments and as shown in FIG. 1A, $Z_{Lens}>Z_{OPFE}$, so that $MLM=Z_{Lens}-Z_{Sensor}$.

For achieving a realistic estimation for a camera module length ("ML"), one may add for example a length of 3.5 mm to MLM, i.e., ML=MLM+3.5 mm. The additional length accounts for a lens stroke that may be required for OIS as well as for image sensor packaging, housing, etc.

R1—A first region ("R1") of MLM, associated with a first minimum module height MHM. $R1=max(W_L, W_{OPFE})$. In some embodiments and as shown in FIG. 1A, WL>$W_{OPFE}$, SO that R1 is determined solely by 102-G1 and R1=WL.

R2—A second region ("R2") of MLM that is associated with a second minimum module height MHS, wherein MHS<MHM. R2=MLM−R1.

In general, and for a given MLM, from an industrial design point of view it may be beneficial to maximize R2 (minimize R1).

MHM and "Module height" ("MH")—$MHM=H_{OPFE}+\Delta LO+T_{G1}$.

For achieving a realistic estimation for a camera module height, we calculate MH by adding an additional height of 1.5 mm to MHM, i.e., MH=MHM+1.5 mm. The additional length accounts for housing, lens cover etc.

In other examples, e.g., with an image sensor 106 occupying a lower y-value than OPFE 104, MHM may be $MHM>H_{OPFE}+\Delta LO+LT$. In these examples, MHM is given by the difference between the lowest y-values occupied by image sensor 106 and the highest y-value occupied by 102-G1.

MHS and "Shoulder height" ("SH")—A second minimum module height ("MHS") is the theoretical limit for a height of a camera module that includes all components of camera 100 in a second region ("R2"). $MHS=min (H_S, H_{OPFE})$. Image sensor 106 may have a width: height ratio of 4:3, so that a sensor diagonal (SD) may be given by $SD=5/3·H_S$.

In some embodiments, for example, as shown in FIG. 1A, MHS may be determined solely by image sensor 106, i.e., $MHS=H_S$.

For achieving a realistic estimation for a real camera module height, shoulder height SH is calculated by adding an additional height of, for example, 1.5 mm to MHS, i.e., SH=MHS+1.5 mm. The additional height accounts for contacting sensor 106 as well as for housing.

$B_{Min}$—A theoretical minimum for a height B of a camera bump such as 128. $B_{Min}=MHM-T$.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A-1B illustrate a known folded Tele camera, and a mobile device including a known folded Tele camera.

FIG. 5A-5B schematically illustrate optical elements of a folded camera module positioned in a zero-state, in perspective and side views.

FIG. 6A-6D schematically illustrate optical elements of a folded camera module implementing an OIS method according to a first method disclosed herein, in perspective and side views.

FIG. 7A-7D schematically illustrate optical elements of a folded camera module implementing an OIS method according to a second method disclosed herein, in perspective and side views.

FIG. 8A-8D schematically illustrate optical elements of a folded camera module implementing an OIS method according to a third method disclosed herein, in perspective and side views.

FIG. 9A-9D schematically illustrate optical elements of a folded camera module implementing an OIS method according to a fourth method disclosed herein, in perspective and side views.

FIG. 10A-10D schematically illustrate optical elements of a folded camera module implementing an OIS method according to a fifth method disclosed herein, in perspective and side views.

FIG. 11A-11D schematically illustrate optical elements of a folded camera module implementing an OIS method according to an sixth method disclosed herein, in perspective and side views.

FIG. 12A-12D schematically illustrate optical elements of a folded camera module implementing an OIS method according to a seventh method disclosed herein, in perspective and side views.

FIG. 13A-13D schematically illustrate optical elements of a folded camera module implementing an OIS method according to a eighth method disclosed herein, in perspective and side views.

FIG. 14A-14D schematically illustrate optical elements of a folded camera module implementing an OIS method according to a ninth method disclosed herein, in perspective and side views.

FIG. 15A-15D schematically illustrate optical elements of a folded camera module implementing an OIS method according to a tenth method disclosed herein, in perspective and side views.

FIG. 23C illustrates the optical lens system of FIG. 23A when performing OIS in a first OIS direction.

FIG. 24A-24F illustrate a camera module disclosed herein for performing OIS as disclosed herein in different perspective views and side views.

DETAILED DESCRIPTION OF EMBODIMENTS

In the following detailed description, numerous specific details are set forth in order to provide a thorough understanding. However, it will be understood by those skilled in the art that the presently disclosed subject matter may be practiced without these specific details. In other instances, well-known methods and features have not been described in detail so as not to obscure the presently disclosed subject matter.

Figure 1C:
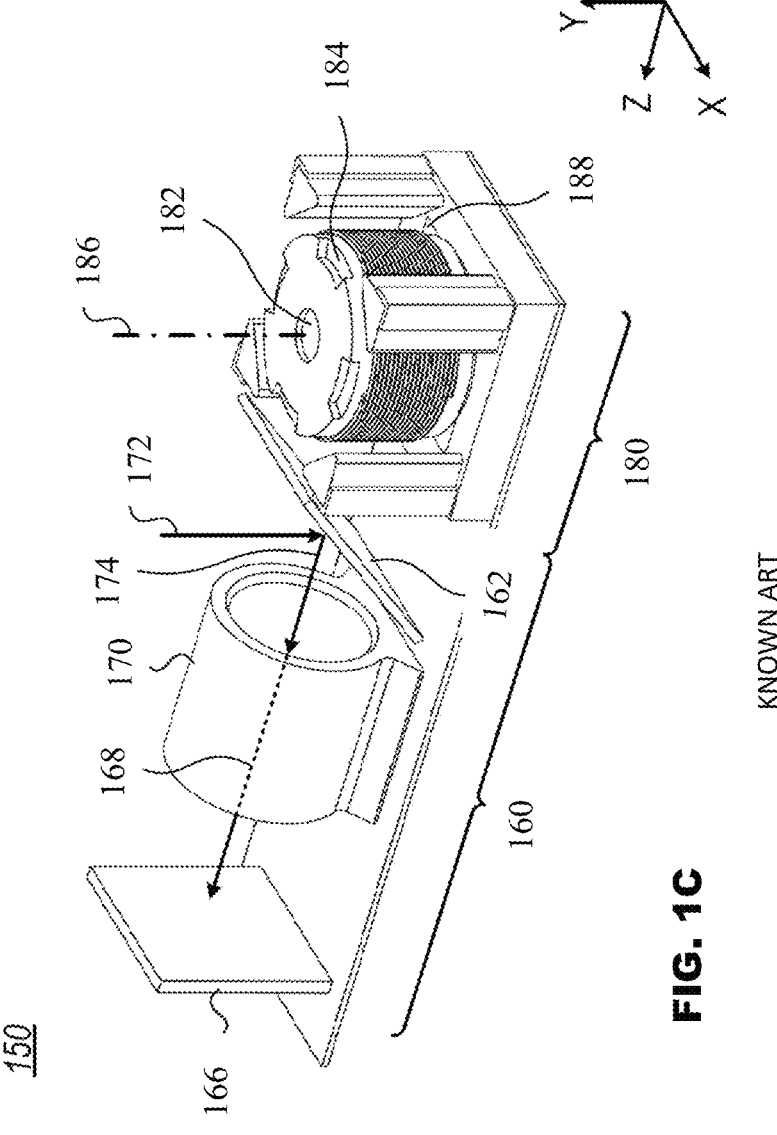
FIG. 1C illustrates a known dual camera.
Figure 2A:
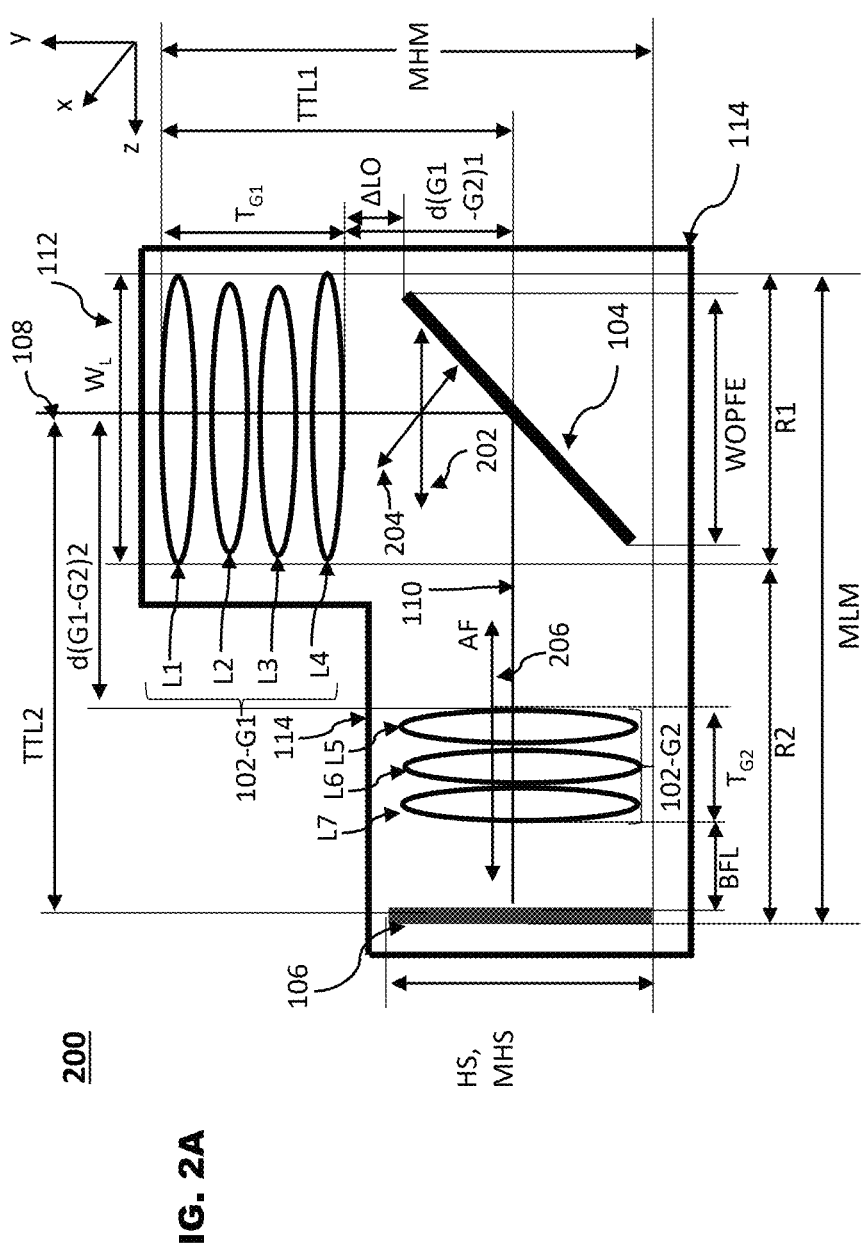
FIG. 2A-2B schematically illustrate a folded Tele camera according to embodiments of the present disclosure.

FIG. 2A schematically illustrates an embodiment of a folded Tele camera disclosed herein and numbered 200. Camera 200 is similar to camera 100, in the sense that all components and dimensions of camera 100 may also be present in camera 200. However, and opposite to known folded camera 100, camera 200 is capable of performing OIS and focusing, as disclosed herein. The OIS and focusing are performed in a relatively simple manner in terms of actuation and, especially, without significantly increasing MHM and MHS.

For focusing or autofocusing ("AF"), 102-G2 is moved parallel to OP2 (i.e., along the z-axis shown), as indicated by arrow 206. It is noted that the movement of 102-G2 is relative to all other components of camera 200, such as OPFE 104, image sensor 106 and 102-G1. As visible and beneficially, no movement along OP1 may be required for focusing. As mentioned, this is an advantage.

Figure 2B:
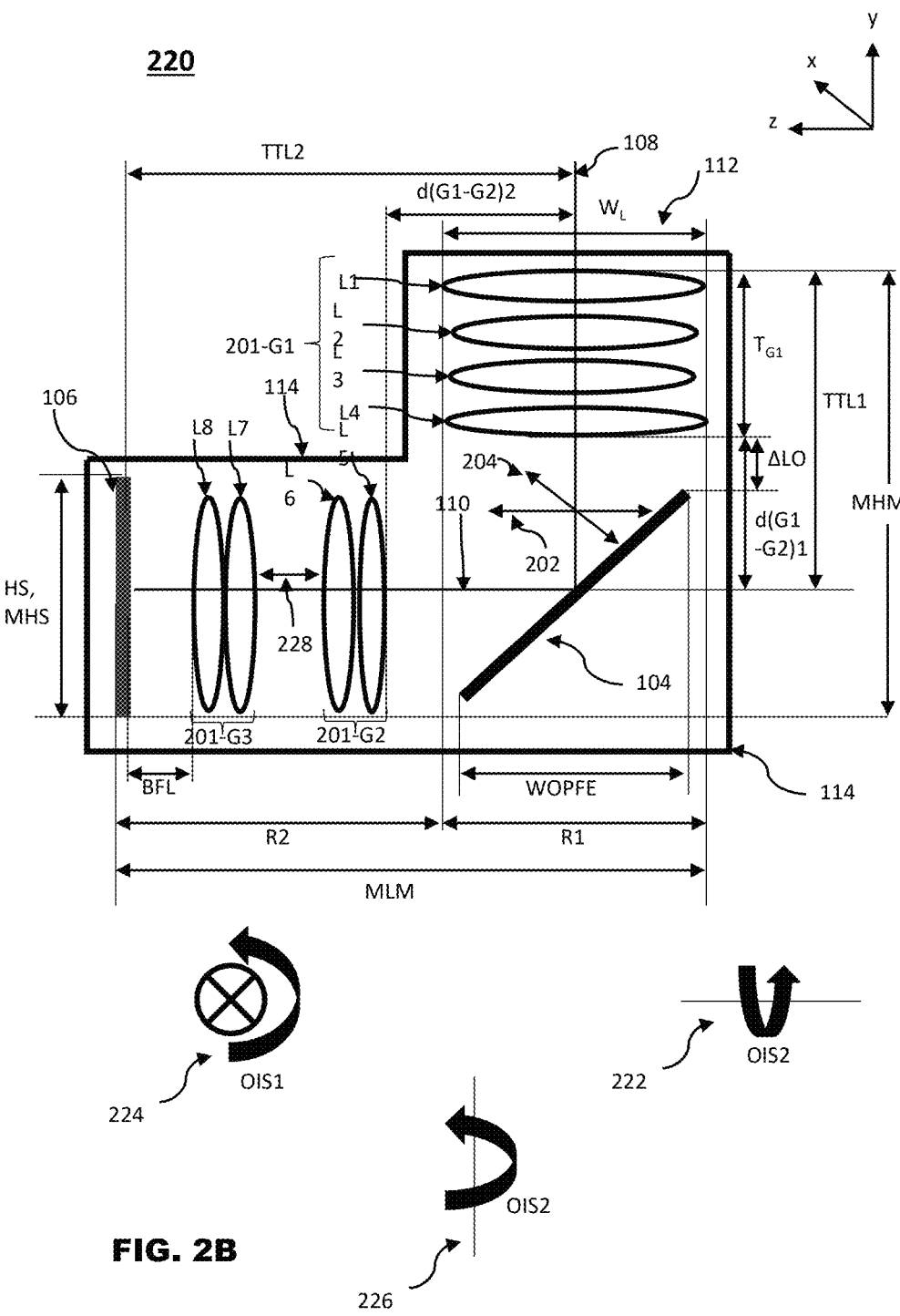

FIG. 2B schematically illustrates another embodiment of a folded Tele camera disclosed herein and numbered 220. Camera 220 is identical with camera 200, in the sense that all components and dimensions of camera 200 may also be present in camera 220. However, camera 220 includes a lens 201, which is different from lens 102. Lens 201 includes a plurality of N lens elements (here N=8) numbered $L_1$-$L_8$, which is divided into three lens groups: a first lens group 201-G1 ("G1") that includes $L_1$-$L_3$ and has a thickness Toi and is located at an object side of the OPFE and has a lens optical axis parallel to OP1; a second lens group 201-G2 ("G2") that includes $L_5$-$L_6$ is located at an image side of the OPFE and has a lens optical axis parallel to OP2; and a third lens group 201-G3 ("G3") that includes $L_7$-$L_8$ and is located at an image side of the OPFE and has a lens optical axis parallel to OP2. Lens elements included in G1, G2 and G3 respectively do not move relative to each other, but they move together as one unit with respect to other components included in camera 220. Camera 220 is capable of focusing in a relatively simple manner in terms of actuation and, especially, without significantly increasing MHM and MHS.

For focusing camera 220, 201-G2 and 201-G3 may be axially moved with respect to each other and with respect to all other components of camera 220 along OP2 110, the axial movement indicated by arrow 228. In the following, this focusing movement of 201-G2 and 201-G3 may be referred to as an independent movement of each 201-G2 and 201-G3, i.e., "201-G2 and 201-G3 are moved independently for focus".

In some embodiments, camera 220 may be capable of continuously changing its EFL, i.e., it may be capable of continuously changing its zoom factor. For changing an EFL of camera 220, 201-G2 and 201-G3 may be axially moved with respect to each other along second OP2 110, the axial movement being indicated by arrow 226. In the following, this zooming movement of 201-G2 and 201-G3 may be referred to as "201-G2 and 201-G3 are moved independently".

Figure 3:
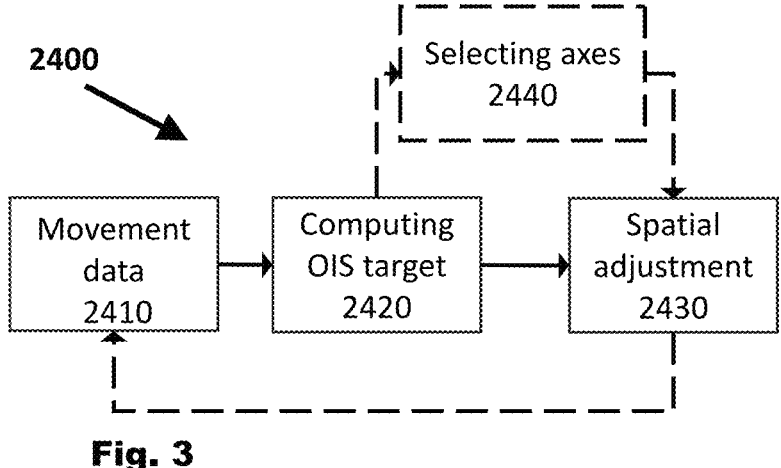
FIG. 3 shows a flowchart illustrating a broad aspect of OIS methods according to embodiments of the present disclosure.

FIG. 3 shows a flowchart illustrating a broad aspect of an OIS method 2400 implemented in a folded camera module according to embodiments of the present disclosure. The folded camera module may include one or more optical elements that are spatially adjustable for performing OIS in at least one the two OIS directions (also referred to as "OIS group").

In a step 2410, the method 2400 may include obtaining data indicative of a movement (e.g. a rotational movement) of the folded camera module. For example, step 2410 may include measuring a movement of elements of the camera module. The step of measuring a movement of the camera module 2410 (or of elements of the camera module) may include measuring an acceleration (linear and/or angular) of the camera module, may include measuring a velocity (linear and/or angular) of the camera module, and/or may include measuring a position of the camera module. The position, velocity, or acceleration may be relative to a fiducial reference point, e.g., a position considered as a 'zero-position' or as an initial position and/or orientation of the camera module. In some embodiments, some measurements may be replaced by computations, e.g., a measured acceleration may be integrated in order to compute a corresponding velocity, and may be integrated twice in order to compute a corresponding position.

The method 2400 may further include a step of computing an OIS target 2420. The OIS target may include a spatial adjustment to be applied to the OIS group in order to compensate for an optical shift of light entering into the folded camera module due to said movement. The step of computing an OIS target 2420 may include computing a desired displacement of any of the elements of the camera module (and in particular of the optical elements of the OIS group). In some embodiments, computing an OIS target may additionally or alternatively include computing a desired velocity (linear and/or angular) of any of the elements of the camera module, and may include computing a desired acceleration (linear and/or angular) of any of the elements of the camera module. The desired displacement, velocity, or acceleration may be relative to an image sensor of the camera module, or may be relative to a fiducial reference point, e.g., a position considered as a 'zero-position' or as an initial position of the camera module.

The method 2400 may further include a step of spatially adjusting (i.e. displacing/moving) elements of OIS group of the camera module 2430. Elements of the camera module may be displaced in order to fulfill the OIS target, thereby stabilizing an image on the image sensor. Elements of the camera module may be displaced linearly and/or rotationally. For example, a center of mass of one element may be linearly displaced (i.e. translated) and additionally the same element may be rotated about an axis intersecting its center of mass. It is to be noted that rotational movements may be composite, consisting of several rotations combined and may not be limited to rotations about an axis that crosses a center of mass or surface of the element.

In some embodiments involving rotational adjustments of one or more optical elements of the OIS group, the method 2400 may include a further step of selecting one or more axes of displacement 2440. The folded camera module may be configured such that said one or more optical elements are movable in more than one degree of freedom (e.g., a rotational degree of freedom as required for performing OIS and one or more axial degree of freedom so as to enable varying the rotational axis). For example, the one or more optical elements of the OIS group may be mounted on an axially movable platform and may be rotatable around the rotational axis relative to said platform. For example, the platform may be actuatable in said one or more axial directions using a Voice Coil Motor including ball bearings and/or flexures. The method 2400 may include selecting a desired rotation axis of the one or more elements of the OIS group based on performance criteria such as adjustment time and/or accuracy. The further displacing step may include moving said one or more elements of the OIS group axially so that the rotation axis of said OIS group matches the desired rotation axis.

In another embodiment, the one or more optical elements may be mechanically coupled to two actuators, and may be mechanically coupled to a sliding pivot point (e.g., a bearing ball positioned in a groove). Each actuator may be configured to apply a corresponding force on the one or more optical elements, where the forces may be applied to corresponding points of the one or more optical elements, and in opposing directions. The exact axis may depend on a relation of magnitudes of the forces. For example, the magnitudes of the forces may be equal, and the axis of rotation may be positioned in a middle point between the corresponding points. The magnitudes of the forces may be unequal, and the axis of rotation may be positioned in a point between the corresponding points, the point being a weighted average of the magnitudes of the forces. This principle can be extended to embodiments where the one or more optical elements may be mechanically coupled to three or more actuators.

In some embodiments, the method 2400 may be performed repeatedly (represented by a dashed arrow). Repeating the steps of the method may be required in order to adapt to varying movements of the camera module, e.g., if the camera module is being moved/tilted in a direction that varies in time. The step of computing an OIS target 2420 may be repeated prior to the step of displacing elements of the camera module 2430 is completed, depending on the time required for each of the steps. In some embodiments, the steps of measuring a movement of elements of the camera module 2410, displacing elements of the camera module 2430 and of computing an OIS target 2420 may be performed in parallel as continuous processes.

In some embodiments, in the step of spatially adjusting elements 2430, some elements of the camera module may be kept static. For example, any element that do not participate in performing OIS may be kept static.

Figure 4:
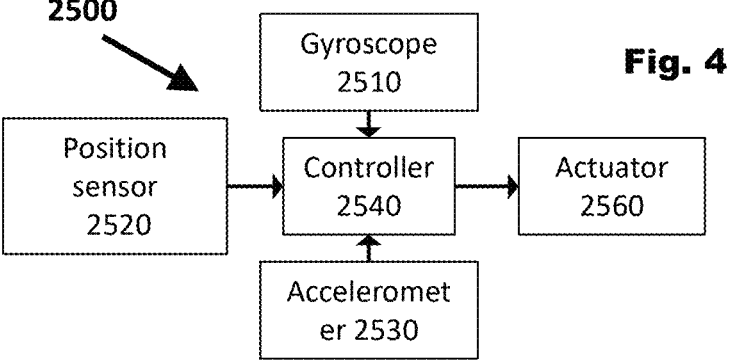
FIG. 4 shows a flowchart illustrating a broad aspect of control systems according to embodiments of the present disclosure.

FIG. 4 shows a flowchart illustrating a broad aspect of a control system 2500, configured for implementing OIS methods in camera modules, according to embodiments of the present disclosure, i.e., configured for implementing OIS method(s) illustrated in FIG. 3.

The control system 2500 may have motion sensors, where examples include, but not limited to, a gyroscope 2510, a position sensor 2520 (e.g., a Hall-effect sensor), and an accelerometer 2530 (e.g., an accelerometer based on a piezoelectric crystal). In some embodiments, the motion sensors may be included in an inertial measurement unit (IMU).

Signals from the motion sensors may be received by a controller 2540. The controller 2540 may compute a target movement, i.e., desired displacements, velocities, and/or accelerations, of one or more elements of the camera module.

The controller 2540 may provide instructions to at least one actuator 2560. The at least one actuator 2560 may be mechanically coupled to at least one corresponding element of the camera module, and may be configured to cause the displacement of the at least one corresponding element upon receiving an instruction from the controller 2540, thereby achieving the target movement. Examples for actuators may include voice coil motors (VCMs) and shape-memory-effect wires. In some embodiments, more than one actuator may correspond a single element of the camera module. In some embodiments, one actuator may correspond more than one element of the camera module.

In some embodiments, the sensors may be in direct communication with the controller 2540. For example, if the control system 2500 is included as an integral part of the camera module. This may have the advantage of a quick response of the control system 2500, enabling cancellation of stabilization of an image on the image sensor even where high-amplitude, high-frequency movements of the camera module may be present (e.g., in extreme-sports environments).

In some embodiments, the sensors may be in an indirect communication with the controller 2540. That is, the controller 2450 may receive signals from the sensors through an interface, such as an operating-system or a dedicated controller, that provides interface to the motion sensors. For example, in smartphones, motion sensors may be controlled by the operating system, that is tasked with providing their signals as a facility for a plurality of applications.

OIS methods disclosed herein include OIS methods that may be referred to as "method 1" . . . "method 10", described herein below.

Generally, the folded camera module may be configured to implemented one of the OIS methods "method 1" to "method 10". Further, the OIS methods disclosed herein provide movements of optical elements for controllably performing OIS according to a first OIS direction of the image sensor and/or according to a second OIS direction of the image sensor. That is, one set of displacements (as described hereinabove in relation to FIG. 3) may correct (lateral) shifts of an image in an image plane (i.e. as received by the image sensor) in one direction (e.g., up/down), and a second set of displacements may correct shifts of an image in a second (transverse) direction (e.g., left/right).

FIGS. 5A-5B schematically illustrate different elements of a camera module 1100, when not performing OIS. In other words, FIGS. 5A-5B schematically illustrate elements of a camera module 1100 in a 'zero-state'. Camera module 1100 may comprise a first lens group 1110, comprise a second lens group 1120, and comprise a prism as an OPFE 1130. FIGS. 5A-5B contain a first reference line 1140 indicating the optical axis of the first lens group 1110 (indicating OA1), a second reference line 1150 indicating the optical axis second lens group 1120 (indicating OA2), and a reference plane 1160. The reference plane 1160 is parallel to the x-y plane, passing through the center of the first lens group 1110 (bisecting it to two equal halves), and slightly wider than the diameter of the first lens group 1110. The reference lines 1150 1160 are in a dot-dash format. FIG. 5A is a perspective-view, where FIG. 5β is a side-view.

FIGS. 6A through 15D schematically illustrate displacements of elements of camera modules, when performing OIS methods "method 1" to "method 10". FIGS. 6A through 15D have the following structure. Each set of figures A to D schematically illustrate one OIS method (e.g., FIGS. 6A-6D schematically illustrate one method). The A and B figures illustrate displacements corresponding to OIS in a first direction. The C and D figures illustrate displacements corresponding to OIS in a second direction. The A and C figures are perspective-view of the elements of the camera module, whereas the B and D figures are side-view of the elements of the camera module.

FIGS. 6A through 15D contain reference lines and reference planes like those shown in FIGS. 5A-5B. These reference lines/planes are for illustrative purpose and facilitate perceiving the displacements of the elements of the camera modules. The reference lines/planes are positioned according to a zero-state of the camera modules. That is, in all of FIGS. 6A through 15D, the reference lines may indicate the optical axes of the lens groups, as would be in their zero state. The reference planes are parallel to the x-y plane, and pass through the center of the first lens group as would be in its zero state. In other words, the reference lines and planes in FIGS. 6A through 15D are positioned as if the camera modules were not implementing any OIS method.

FIGS. 6A-6D schematically illustrate displacements of different elements of a camera module 1200, implementing OIS method 1. Camera module 1200 may comprise a first lens group 1210, may comprise a second lens group 1220, and may comprise a prism as an OPFE 1230. The displacements may be visualized by a first reference line 1240, a second reference line 1250, and a reference plane 1260.

For performing OIS according to the first method ("OIS method 1") disclosed herein in a first OIS direction ("OIS1"), the first lens group 1210 may be linearly moved parallel to OA2 (i.e., along the z-axis). For performing OIS according to the first method in a second OIS direction ("OIS2"), the first lens group 1210 may be linearly moved perpendicular to both OA1 and OA2 (i.e., along the x-axis). The first OIS method may be referred to as "lens-shift OIS". It is noted that the movement of the first lens group 1210 may be relative to all other components of camera 1200, such as the OPFE 1230, an image sensor (not shown), and especially the second lens group 1220.

As visible, and beneficially, no movement along OA1 may be required for performing OIS according to a first method as disclosed herein. This may provide an advantage, since movement along OA1 would increase the MHM.

FIGS. 7A-7D schematically illustrate displacements of different elements of a camera module 1300, implementing OIS method 2. Camera module 1300 may comprise a first lens group 1310, may comprise a second lens group 1320, and may comprise a prism as an OPFE 1330. The displacements may be visualized by a first reference line 1340, a second reference line 1350, and a reference plane 1360.

For performing OIS according to the second method disclosed herein in OIS1 direction, the first lens group 1310 may be linearly moved parallel to OA2 (i.e., along the z-axis shown). For performing OIS according to the second method in a OIS2 direction, the first lens group 1310 and the OPFE 1330 together may be rotated around an axis parallel to OA2.

FIGS. 8A-8D schematically illustrate displacements of different elements of a camera module 1400, implementing OIS method 3. Camera module 1400 may comprise a first lens group 1410, may comprise a second lens group 1420, and may comprise a prism as an OPFE 1430. The displacements may be visualized by a first reference line 1440, a second reference line 1450 (not shown in FIG. 8A), and a reference plane 1460.

For performing OIS according to the third method disclosed herein in OIS1 direction, the first lens group 1410 and the OPFE 1430 together may be rotated around an axis perpendicular to both OA1 and OA2. This movement is a rotational movement. For performing OIS according to the third method in a OIS2 direction, the first lens group 1410 and the OPFE 1430 together may be rotated around an axis parallel to OA1.

FIGS. 9A-9D schematically illustrate displacements of different elements of a camera module 1500, implementing OIS method 4. Camera module 1500 may comprise a first lens group 1510, may comprise a second lens group 1520, and may comprise a prism as an OPFE 1530. The displacements may be visualized by a first reference line 1540, a second reference line 1550 (not shown in FIG. 9A), and a reference plane 1560.

For performing OIS method 4 in direction OIS1, the first lens group 1510 and the OPFE 1530 together may be rotated around an axis perpendicular to both OA1 and OA2. For OIS method 4 in direction OIS2, the first lens group 1510 and the OPFE 1530 together may be rotated around an axis parallel to OA2. OIS method 4 can be seen as a combination of OIS method 3 for OIS1 and of OIS method 2 for OIS2.

FIGS. 10A-10D schematically illustrate displacements of different elements of a camera module 1600, implementing OIS method 5. Camera module 1600 may comprise a first lens group 1610, may comprise a second lens group 1620, and may comprise a prism as an OPFE 1630. The displacements may be visualized by a first reference line 1640, a second reference line 1650, and a reference plane 1660.

For performing OIS method 5 in direction OIS1, the first lens group 1610 may be linearly moved along an axis parallel to OA2. For OIS method 5 in direction OIS2, the first lens group 1610 and the OPFE 1630 together may be linearly moved along an axis perpendicular to both OA1 and OA2.

Briefly referring back to FIGS. 2A-2B, in yet other OIS methods, that may be referred to as "prism OIS", only OPFE 104 may be moved with respect to all other components in camera 200 or camera 220 such as 201-G1, image sensor 106 and to 201-G2 (and, for camera 220, also relative to 201-G3). For performing prism OIS, only a relatively small movement of OPFE 104 along OP1 may be required, which may be beneficial for slim MHM. OIS method 6 and OIS method 10 are methods for prism OIS.

FIGS. 11A-11D schematically illustrate displacements of different elements of a camera module 1900, implementing OIS method 6. Camera module 1900 may comprise a first lens group 1910, may comprise a second lens group 1920, and may comprise a prism as an OPFE 1930. The displacements may be visualized by a first reference line 1940, a second reference line 1950 (not shown in FIG. 13A), and a reference plane 1960.

For OIS method 6 in OIS1, the OPFE 1930 may be rotated along an axis perpendicular to both OA1 and OA2. For OIS method 6 in OIS2, the OPFE 1930 may be rotated along an axis parallel to OA2.

FIGS. 12A-12D schematically illustrate displacements of different elements of a camera module 2000, implementing OIS method 7. Camera module 2000 may comprise a first lens group 2010, may comprise a second lens group 2020, and may comprise a prism as an OPFE 2030. The displacements may be visualized by a first reference line 2040, a second reference line 2050 (not shown in FIG. 14A), and a reference plane 2060.

For performing OIS method 7 in direction OIS1, the first lens group 2010 and the OPFE 2030 each may be rotated around an axis perpendicular to both OA1 and OA2. The axis of rotation of the first lens group 2010 and the axis of rotation of the OPFE 2030 may be distinct. In other words, the first lens group 2010 may be rotated around a first axis, the OPFE 2030 may be rotated around a second axis, and the first axis may be different than the second axis. The first lens group 2010 and the OPFE 2030 may be rotated simultaneously, or in other words, jointly. The first lens group 2010 and the OPFE 2030 may be rotated by different angles. In some embodiments, the angle of rotation of the first lens group 2010 may be twice the angle of rotation of the OPFE 2030.

For OIS method 7 in direction OIS2, the first lens group 2010 and the OPFE 2030 together may be rotated around a third axis parallel to OA2. In some embodiments, the method may include choosing the exact rotation axes for the first axis and/or the second axis.

FIGS. 13A-13D schematically illustrate displacements of different elements of a camera module 2100, implementing OIS method 8. Camera module 2100 may comprise a first lens group 2110, may comprise a second lens group 2120, and may comprise a prism as an OPFE 2130. The displacements may be visualized by a first reference line 2140, a second reference line 2150 (not visible in FIG. 15A), and a reference plane 2160.

For performing OIS method 8 in direction OIS1, the first lens group 2110 and the OPFE 2130 together may be rotated around a first axis perpendicular to both OA1 and OA2, by a first angle. The first lens group 2110 may be further rotated alone around a second axis perpendicular to both OA1 and OA2, by a second angle. The second axis may be distinct from the first axis. The rotation around the first axis and the rotation around the second axis may be performed simultaneously, or in other words, jointly. In some embodiments, the first angle may be twice the second angle. The movement of the first lens group 2110 for the OIS1 direction may be described metaphorically as a planet orbiting a star, and concurrently revolving around its axis.

For OIS method 8 in direction OIS2, the first lens group 2110 and the OPFE 2130 together may be rotated around a third axis parallel to OA2. In some embodiments, the method may include choosing the exact rotation axes for the first axis and/or the second axis.

A difference between OIS method 7 and OIS method 8 may be noted. While in both methods the first lens group and the OPFE may be rotated according to two axes, in order to perform OIS in the first OIS direction, they may be rotated in a different manner. In OIS method 10, the first lens group and the OPFE may be rotated together about the first axis, while in OIS method 9 they may not be rotated together. In other words, in OIS method 9 the second axis may be static, while in OIS method 10 the second axis can move.

FIGS. 14A-14D schematically illustrate displacements of different elements of a camera module 1700, implementing OIS method 9. Camera module 1700 may comprise a first lens group 1710, may comprise a second lens group 1720, and may comprise a prism as an OPFE 1730. The displacements may be visualized by a first reference line 1740, a second reference line 1750 (not shown in FIG. 11A), and a reference plane 1760.

For performing OIS method 9 in direction OIS1, the first lens group 1710, OPFE 1730 and the second lens group 1720 together may be linearly moved along an axis parallel to OA1. For OIS method 9 in direction OIS2, the first lens group 1710, the OPFE 1730 and the second lens group 1720 together may be linearly moved along an axis perpendicular to both OA1 and OA2.

FIGS. 15A-15D schematically illustrate displacements of different elements of a camera module 1800, implementing OIS method 10. Camera module 1800 may comprise a first lens group 1810, may comprise a second lens group 1820, and may comprise a prism as an OPFE 1830. The displacements may be visualized by a first reference line 1840, a second reference line 1850 (not shown in FIG. 12A), and a reference plane 1860.

For OIS method 10 in OIS1, the OPFE 1830 may be rotated along an axis perpendicular to both OA1 and OA2. For OIS method 10 in OIS2, the OPFE 1830 may be rotated along an axis parallel to OA1.

Table 1 summarizes the methods "method 1" to "method 10". The symbols "∥OA1" and "∥OA2" may refer to a movement parallel to OA1 and parallel to OA2, respectively.

The symbol "⊥OA1, OA2" may refer to a movement perpendicular to both OA1 and OA2. The first lens group may be denoted in the table by "G1", and the second lens group may be denoted in the table by "G2".

TABLE 1

| OIS method | OIS name | OIS axis | Moved component | Movement type | Direction/axis of Movement |
|---|---|---|---|---|---|
| 1 | Lens-OIS | OIS1 | G1 | Linear | ∥ OA2 |
|  |  | OIS2 | G1 | Linear | ⊥ OA1, OA2 |
| 2 |  | OIS1 | G1 | Linear | ∥ OA2 |
|  |  | OIS2 | G1 + OPFE | Rotation | ∥ OA2 |
| 3 |  | OIS1 | G1 + OPFE | Rotation | ⊥ OA1, OA2 |
|  |  | OIS2 | G1 + OPFE | Rotation | ∥ OA1 |
| 4 |  | OIS1 | G1 + OPFE | Rotation | ⊥ OA1, OA2 |
|  |  | OIS2 | G1 + OPFE | Rotation | ∥ OA2 |
| 5 |  | OIS1 | G1 | Linear | ∥ OA2 |
|  |  | OIS2 | G1 + OPFE | Linear | ⊥ OA1, OA2 |
| 6 | Prism-OIS 1 | OIS1 | OPFE | Rotation | ⊥ OA1, OA2 |
|  |  | OIS2 | OPFE | Rotation | ∥ OA2 |
| 7 |  | OIS1 | OPFE, about a $1^{st}$ rotation axis, by a $1^{st}$ angle | Rotation | ⊥ OA1, OA2 |
|  |  |  | G1, about a $2^{nd}$ rotation axis, by a $2^{nd}$ angle | Rotation | ⊥ OA1, OA2 |
|  |  | OIS2 | G1 + OPFE | Rotation | ∥ OA2 |
| 8 |  | OIS1 | OPFE + G1, about a $1^{st}$ rotation axis, by a $1^{st}$ angle | Rotation | ⊥ OA1, OA2 |
|  |  |  | G1, about a $2^{nd}$ rotation axis, by a $2^{nd}$ angle | Rotation | ⊥ OA1, OA2 |
|  |  | OIS2 | G1 + OPFE | Rotation | ∥ OA2 |
| 9 |  | OIS1 | G1 + OPFE + G2 | Linear | ∥ OA1 |
|  |  | OIS2 | G1 + OPFE + G2 | Linear | ⊥ OA1, OA2 |
| 10 | Prism-OIS 2 | OIS1 | OPFE | Rotation | ⊥ OA1, OA2 |
|  |  | OIS2 | OPFE | Rotation | ∥ OA1 |

End of table 1

Figure 16A:
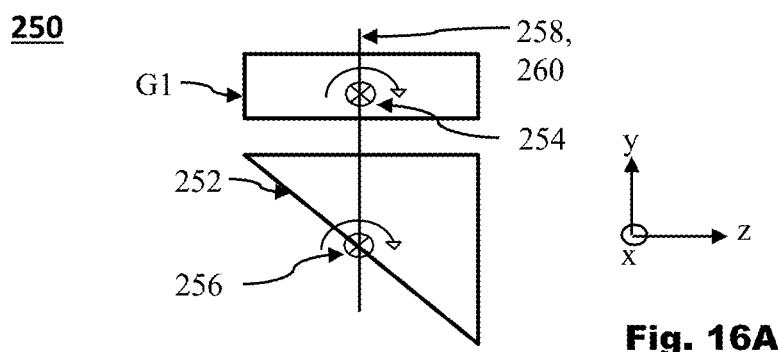
FIG. 16A-16C schematically illustrate OIS sub-systems configured for implementing a ninth and tenth OIS methods disclosed herein, in a zero state and in a non-zero state.
Figure 16B:
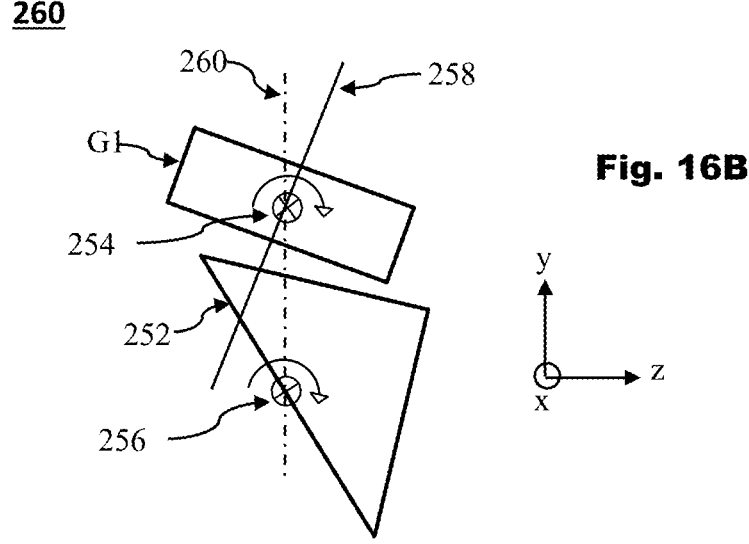
Figure 16C:
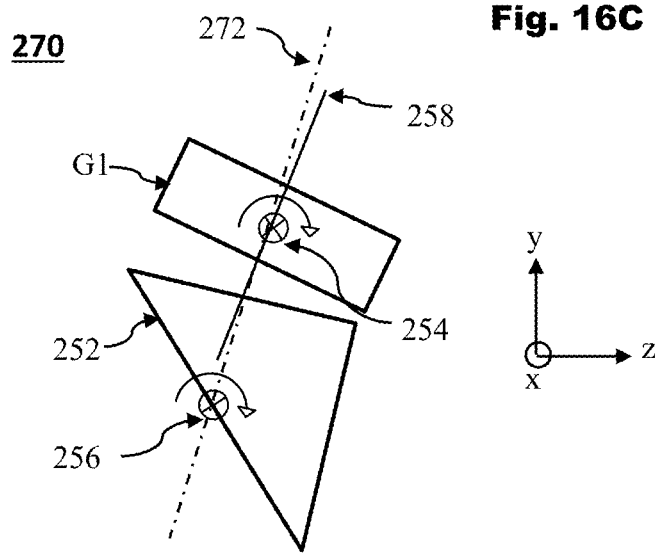

FIGS. 16A-16C further illustrate displacements of different elements of a camera module when implementing OIS methods 9 and 10

FIGS. 16A-16B schematically illustrate an exemplary optical lens sub-system 250, configured for performing OIS according to a ninth OIS method ("OIS method 9"). FIGS. 16A-16B show only the components that may be moved for performing OIS, and does not show components such as the second lens group (G2) or the image sensor, which may not moved for performing OIS. Optical lens sub-system 250 includes a first lens group G1 and an OPFE 252. The first lens group G1 has an optical axis 258.

FIG. 16A illustrates the first lens group G1 and OPFE 252 in a zero position. A rotation axis 254 of first lens group G1 and a rotation axis 256 of the OPFE 252 are shown. Rotation axis 254 may be parallel to rotation axis 256, and may be parallel to the x-axis. In addition, rotation axis 254 and rotation axis 256 may be located at a same y-coordinate. In other words, a linear connection 260 i.e., a straight line connecting, between rotation axis 254 and rotation axis 256, may be parallel to the y-axis. The first lens group G1 has an optical axis 258. In the zero position, optical axis 258 may be oriented parallel to the y-axis. The optical axis 258 may be perpendicular to an object-sided surface of the OPFE 252, and may be parallel to an image-side surface of the OPFE 252.

FIG. 16B illustrates the first lens group G1 and the OPFE 252 in a non-zero position. For performing OIS in the first OIS direction (OIS1), the first lens group G1 may be rotated around rotation axis 254 by a first angle. The OPFE 252 may be rotated around rotation axis 256 by a second angle. In general, the first angle may be different from the second angle. Both rotation axis 254 and rotation axis 256 may be stationary, i.e., they may not move when performing OIS according to OIS method 9. This means that rotation axis 254 and rotation axis 256 may remain located at a same y-coordinate when performing OIS. In the non-zero position, optical axis 258 may not be oriented parallel to the y-axis. In addition, optical axis 258 may not be perpendicular to an object-sided surface of the OPFE 252, and may not be parallel to an image-sided surface of the OPFE 252

FIG. 16C shows another exemplary optical lens sub-system 270 for performing OIS, according to OIS method 10. In a zero position, optical lens sub-system 270 may be identical to optical lens sub-system 250 shown in FIG. 16A. For performing OIS in OIS1, the first lens group G1 and the OPFE 252 may be rotated together as one unit around rotation axis 256 by a first angle. Afterwards, only the first lens group G1 may further be rotated around rotation axis 254, by a second angle. The first angle and the second angle may be or may not be identical. Rotation axis 256 may be stationary, and rotation axis 254 may not be stationary, i.e., rotation axis 254 may move when performing OIS method 10. A linear connection 272 (a straight line connecting) between rotation axis 254 and rotation axis 256 may not be parallel to the y-axis. In the non-zero position, optical axis 258 may not be oriented parallel to the y-axis, may not be oriented perpendicular to an object-sided surface of the OPFE 252, and may not be parallel to an image-sided surface of the OPFE 252.

It is noted that OIS method 9 and OIS method 10 may be beneficial in terms of optical performance. An optical performance may be given by e.g., a modulation transfer function ("MTF"). This means that an optical performance in a non-zero state (i.e., when OIS is performed) may decrease by a relatively small amount compared to a zero state (i.e., when no OIS is performed). From all OIS methods disclosed herein, OIS method 9 and OIS method 10 may be the most similar to a "Gimbal" OIS known in the art. In a Gimbal OIS, an entire camera is tilted for OIS. For any camera tilt, a chief ray angle of a zero (or on-axis) field passes through a center of each lens element included in the camera.

Figures 17A, 17B:
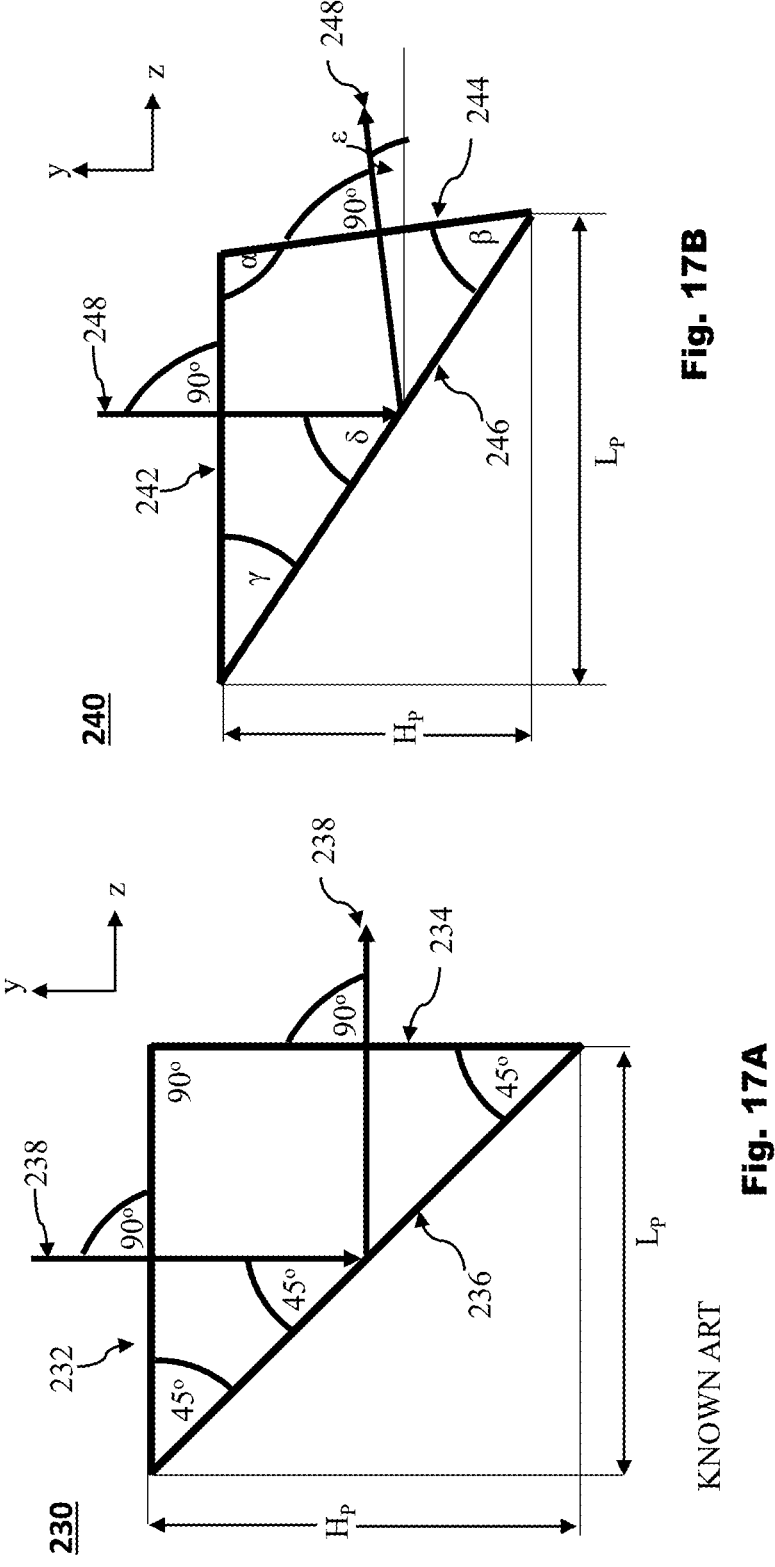
FIG. 17A schematically illustrates a known prism of a folded Tele camera.
FIG. 17B schematically illustrates a prism of a folded Tele camera disclosed herein.

FIGS. 17A-17B illustrate prisms that may be used in camera modules according to the present disclosure.

FIG. 17A shows a known prism 230. For example, prism 404 illustrated in FIGS. 19A-19D) represents a known prism 230. Prism 230 has a top surface 232 facing an object side, a first side surface 234 facing an image side and a second side surface 236, wherein second side surface 236 is reflective. Prism 230 has a prism height ("$H_P$") and a prism length ("$L_P$"), as shown. An angle formed between top surface 232 and first side surface 234 spans 90 degrees. An angle formed between top surface 232 and second side surface 236 spans 45 degrees. An angle formed between first side surface 234 and second side surface 236 spans 45 degrees, too. An on-axis ray 238 impinges on top surface 232 of prism 230 at an angle of 90 degrees. An on-axis ray 238 which is parallel to an OP1 (such as OP1 108 in FIG. 2) and parallel to the y-axis, impinges on the second side surface 236 of prism 230 at an angle of 45 degrees. On-axis ray 238 is folded to an OP2 (such as OP2 110 in FIG. 2), i.e., on-axis ray 238 is reflected so that it is parallel to the z-axis and impinges on first side surface 234 at an angle of 90 degrees.

FIG. 17B illustrates a prism 240 according to embodiments of the present disclosure. For example, prism 304 (illustrated in FIGS. 18A-18C), represents a prism such as prism 230. Prism 240 may be used instead of (i.e., it may replace) prism 230 in lens systems. For example, prism 404 in lens system 400, or prism 504 of in lens system 500. Prism 240 may have a top surface 242 facing an object side. Prism 240 may have a first side surface 244 facing an image side. Prism 240 may have a second side surface 246, wherein the second side surface 246 may be reflective. Prism 240 may have a prism height ("$H_P$") and may have a prism length ("$L_P$"). An angle $\alpha$ may form between top surface 242 and first side surface 244, and may span more than 90 degrees. In other words, an OPFE of a folded camera may be implemented by an obtuse-triangular prism. An angle $\gamma$ may form between top surface 242 and second side surface 246, and may span less than 45 degrees. An angle $\beta$ may form between first side surface 244 and second side surface 246, and may span more than 45 degrees. An on-axis ray 248, which is parallel to the y-axis, may impinge on the top surface 242 of prism 240 at an angle of 90 degrees. On-axis ray 248 may impinge on the second side surface 246 of prism 240 at an angle $\delta$ of more than 45 degrees, and may be folded to a second optical path (such as OP2), so that on-axis ray 248 may impinge on the first side surface 244 of prism 240 at an angle of 90 degrees. On-axis ray 248 may be reflected so that it forms a finite (i.e., non-zero) angle $\&$ with the z-axis. On-axis ray 248 may impinge on first side surface 248 at an angle of 90 degrees.

Use of a prism such as prism 240 in a lens system as disclosed herein may be beneficial as it may allow for realization of a relatively large DA (i.e., a relatively low f/#) and still relatively low shoulder height $H_S$. For relatively large DA, relatively large lens elements (i.e., lens elements having a large WL, such as illustrated in FIGS. 2A-2B) in a first lens group (such as 102-G1) may be required. Larger lens elements in a first lens group may require a larger prism top surface (i.e., larger $L_P$) such as top surface 232.

Use of a prism such as prism 240 in a lens system as disclosed herein may be beneficial as it may allow for a folding angle to be smaller than 90°. That is, an angle between a continuation of an on-axis ray, in a direction it would propagate if not folded, to an OA2, may be less than 90°.

In known prism 230, increasing $L_P$ increases $H_P$ by a same amount. For ensuring that an on-axis ray (such as on-axis ray 238) impinges on a center of an image sensor with respect to a height of an image sensor (i.e., with respect to a y-axis in FIGS. 2A-2B), such as image sensor 106, the image sensor may be required to be shifted towards a bottom of a camera module. This shift of the image sensor might increase the $H_S$. Prism 240 may ensure that an on-axis ray may impinge on a center of an image sensor with respect to a height of an image sensor, without a need to shift the image sensor towards a bottom of a camera module. This may be beneficial for achieving a low f/# together with a low shoulder height $H_S$.

Table 2 gives value ranges (in degrees) for the angles $\alpha$-$\varepsilon$ defined hereinabove and illustrated in FIG. 17B.

TABLE 2

| Angle | $\alpha$ | $\beta$ | $\gamma$ | $\delta$ | $\varepsilon$ |
|---|---|---|---|---|---|
| Value range | 90-100 | 45-55 | 35-45 | 45-55 | 0-10 |

Figure 18A:
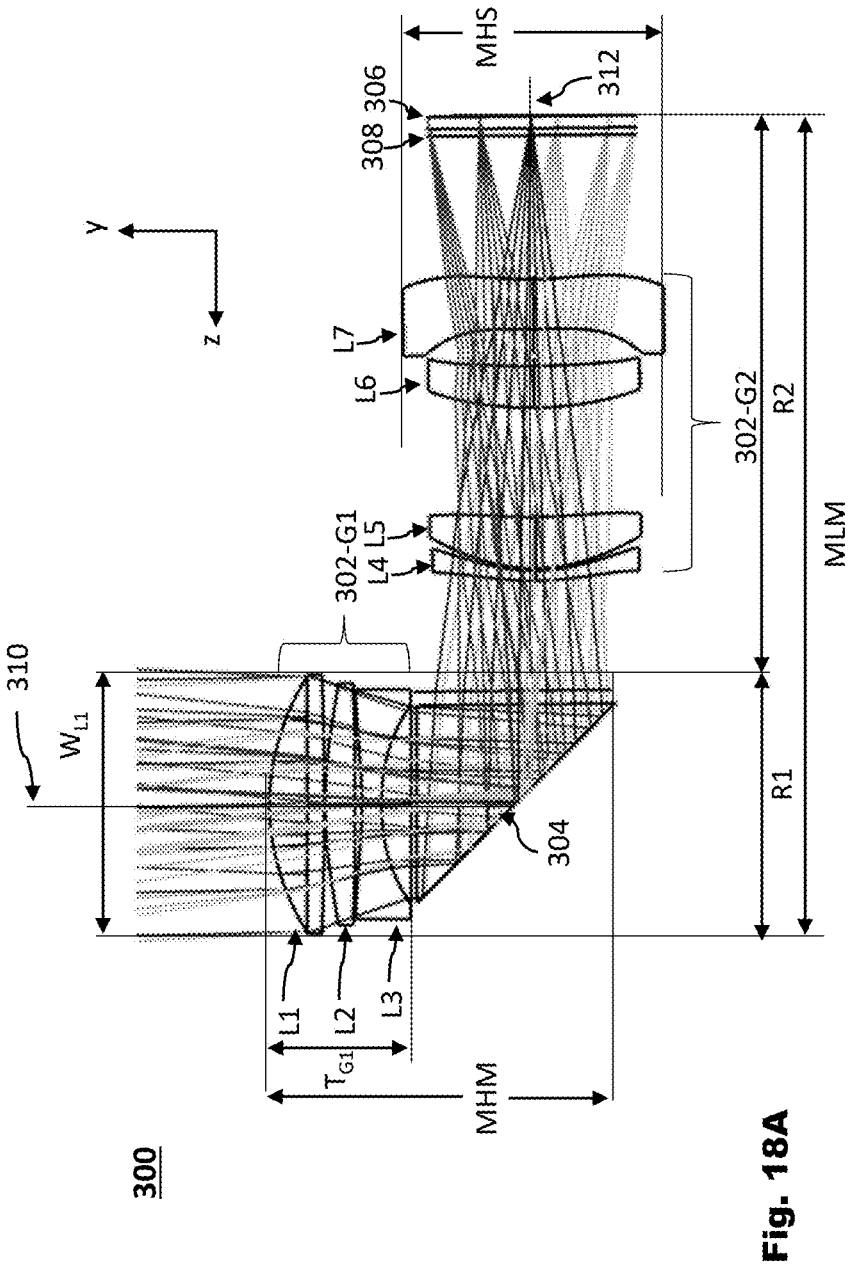
FIG. 18A-18C schematically illustrate embodiments of an optical lens system disclosed herein, focused to infinity, and focused to 50.5 cm.
Figure 18B:
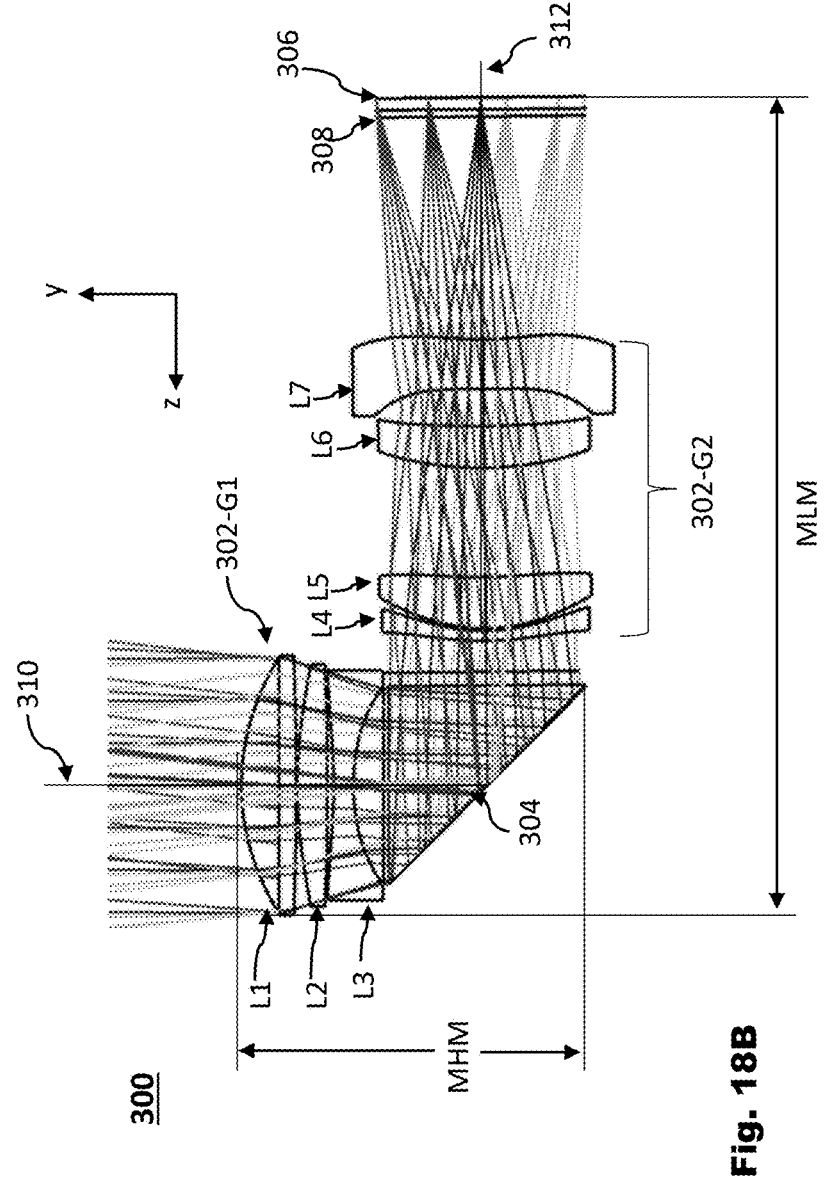
Figure 18C:
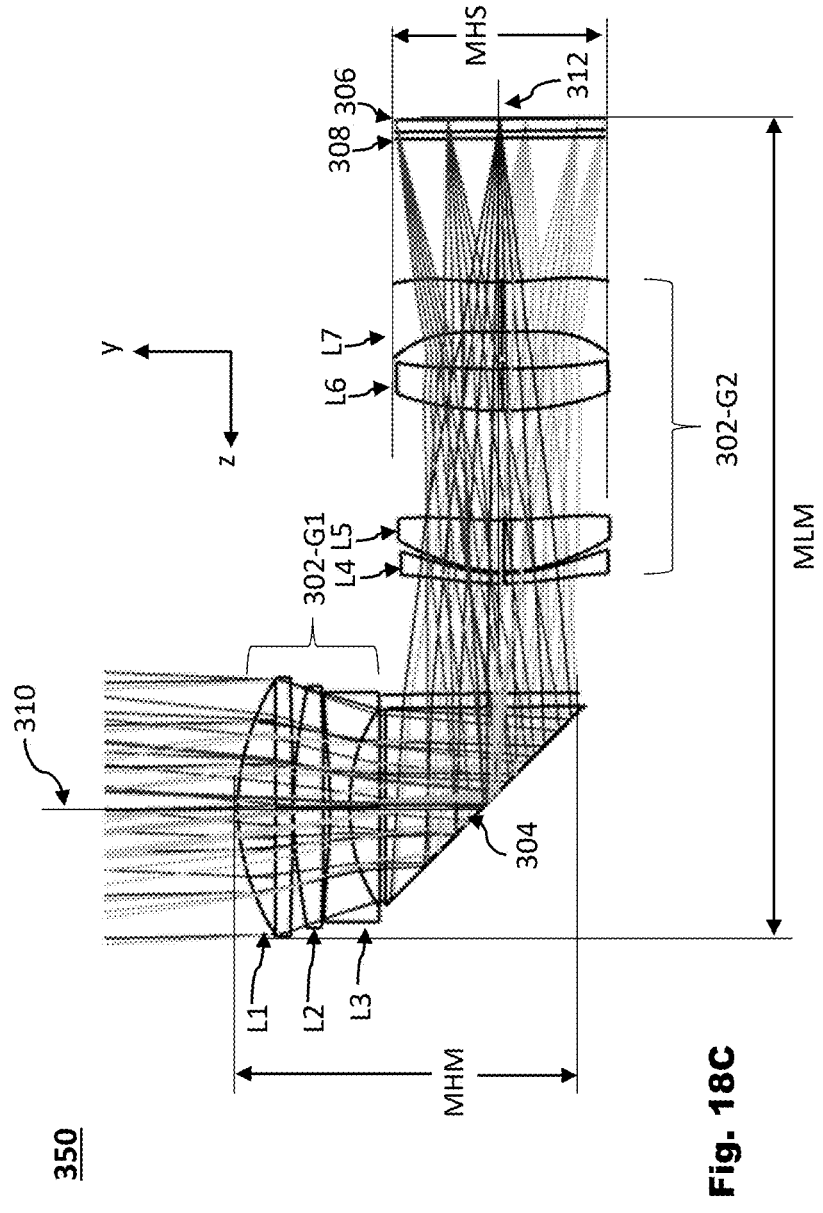

It is noted that achieving an optical lens design which can support the performing of OIS according to the first, second, third and fourth method and focusing as described above, may represent a technical challenge, as the optical lens design may need to support relatively large tolerances in terms of movements between lens groups. Examples for such lens designs are illustrated in FIGS. 18A-18C in system 300, FIGS. 19A-19D in system 400, FIGS. 20A-20D in system 500, FIGS. 21A-21C in system 600, FIGS. 22A-22C in system 700, and in FIGS. 23A-23C in system 800. Table 3 summarizes values and ratios thereof of various features that are included in the lens systems 300, 400, 500, 600, 700 and 800.

TABLE 3

|  | 300 | 400 | 500 | 600 | 700 | 800 |
|---|---|---|---|---|---|---|
| N | 7 | 6 | 6 | 6 | 6 | 6 |
| $N_{G1}$ | 3 | 3 | 3 | 3 | 2 | 2 |
| $N_{G2}$ | 4 | 3 | 3 | 3 | 4 | 4 |
| $DA_{L1}$ | 7.5 | 8.5 | 9.05 | 8.5 | 8.5 | 8.5 |
| DA | 7.5 | 8.5 | 9.05 | 8.5 | 8.5 | 8.5 |
| EFL | 23.50 | 25.50 | 23.7 | 23.5 | 23.57 | 22.7 |
| $EFL_{G1}$ | 32.6 | 20.0 | 18.3 | 32.4 | 35.9 | 41.91 |
| $EFL_{G2}$ | 133.4 | −72.2 | −37.4 | 33.5 | 38.5 | 34.73 |
| TTL | 27.40 | 26.90 | 24.6 | 28.31 | 31.54 | 30.72 |
| TTL1 | 7.20 | 8.50 | 8.2 | 7.5 | 7.03 | 6.82 |
| TTL2 | 20.19 | 18.50 | 16.4 | 20.81 | 24.51 | 23.90 |
| BFL | 4.70 | 10.62 | 9.29 | 6.65 | 8.53 | 7.89 |
| $BFL_{MIN}$ | 4.43 | 10.57 | 9.29 | 6.60 | 7.49 | 6.99 |
| f/# | 3.14 | 3.08 | 2.8 | 2.78 | 2.83 | 2.69 |
| HFOV | 11.90 | 11.70 | 12.6 | 12.202 | 12.16 | 13.9 |
| SD | 10.20 | 10.20 | 10.20 | 10.20 | 10.20 | 11.44 |
| $T_{G1}$ | 4.15 | 5.73 | 5.15 | 4.42 | 3.73 | 3.22 |
| MHM | 9.88 | 11.10 | 11.10 | 10.44 | 11.29 | 10.40 |
| MHS | 7.65 | 8.38 | 6.67 | 8.00 | 8.52 | 8.93 |
| MHS-CUT | 6.12 | 6.12 | 6.12 | 6.12 | 6.12 | 6.86 |
| MLM | 23.97 | 23.00 | 20.60 | 25.06 | 29.05 | 28.15 |
| MH | 11.38 | 12.60 | 12.60 | 11.94 | 12.79 | 11.90 |
| SH | 9.15 | 9.88 | 8.17 | 9.50 | 10.02 | 10.43 |
| SH-CUT | 7.62 | 7.62 | 7.62 | 7.62 | 7.62 | 8.36 |
| ML | 27.47 | 26.50 | 24.10 | 28.56 | 32.55 | 31.65 |
| $B_{MIN}$ | 1.88 | 3.10 | 3.10 | 2.44 | 3.29 | 2.40 |
| Cut ratio | 20% | 27% | 8% | 24% | 28% | 23% |
| DA/SH | 0.82 | 0.86 | 1.11 | 0.89 | 0.85 | 0.81 |
| DA/SH-CUT | 0.98 | 1.12 | 1.19 | 1.12 | 1.12 | 1.02 |
| SH-CUT/SH | 83% | 77% | 93% | 80% | 76% | 80% |
| TTL/EFL | 1.17 | 1.05 | 1.04 | 1.20 | 1.34 | 1.35 |
| MLM/TTL | 0.87 | 0.86 | 0.84 | 0.89 | 0.92 | 0.92 |

TABLE 3-continued

|  | 300 | 400 | 500 | 600 | 700 | 800 |
|---|---|---|---|---|---|---|
| MLM/EFL | 1.02 | 0.90 | 0.87 | 1.07 | 1.23 | 1.24 |
| $EFL_{G1}/EFL_{G2}$ | 0.24 | −0.28 | −0.49 | 0.97 | 0.93 | 1.21 |
| $EFL_{G1}/EFL$ | 1.39 | 0.78 | 0.77 | 1.38 | 1.52 | 1.85 |
| $EFL_{G2}/EFL$ | 5.68 | −2.83 | −1.58 | 1.43 | 1.63 | 1.53 |

End of table 3

The values for DALI, $T_{G1}$, $H_S$, SD, R1, R2, $TTL_1$, $TTL_2$, BFL, TTL, EFL, $EFL_{G1}$, $EFL_{G2}$, MHM, MHS, MHS-CUT, MLM, MH, SH, ML, $B_{MIN}$ are given in mm, the value for HFOV is given are in degrees. The f/# and cut ratio are unitless. For calculating $B_{Min}$ in Table 3, a device thickness of T=8 mm is assumed.

The following symbols are used in table 3:

N refers to the number of lens elements in a lens.

$N_{G1}$ and $N_{G2}$ refer to the number of lens elements in G1 and G2, respectively.

DALI refers to the aperture diameter of $L_1$ (measured along the z-axis). $L_1$ may be rotational symmetric, so that DALI may be identical with a width of $L_1$, i.e., $W_{L1}=DA_{L1}$.

$T_{G1}$ refers to the thickness of $G_1$.

$EFL_{G1}$ and $EFL_{G2}$ refers to an EFL of G1 and G2, respectively.

Figure 19A:
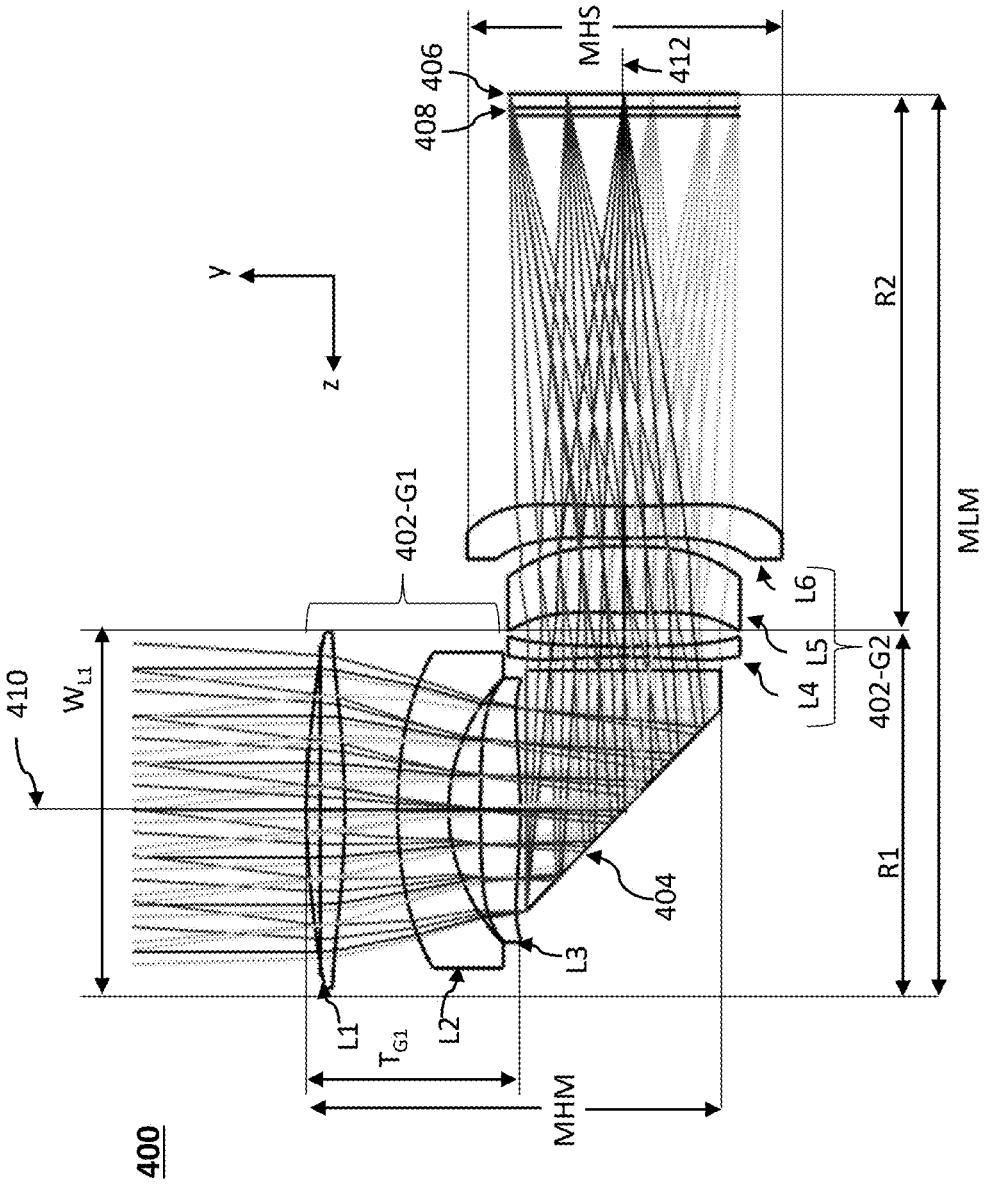
FIG. 19A-19B schematically illustrate an embodiment of another optical lens system disclosed herein, when focused to infinity, and when focused to 20.5 cm.
Figure 19B:
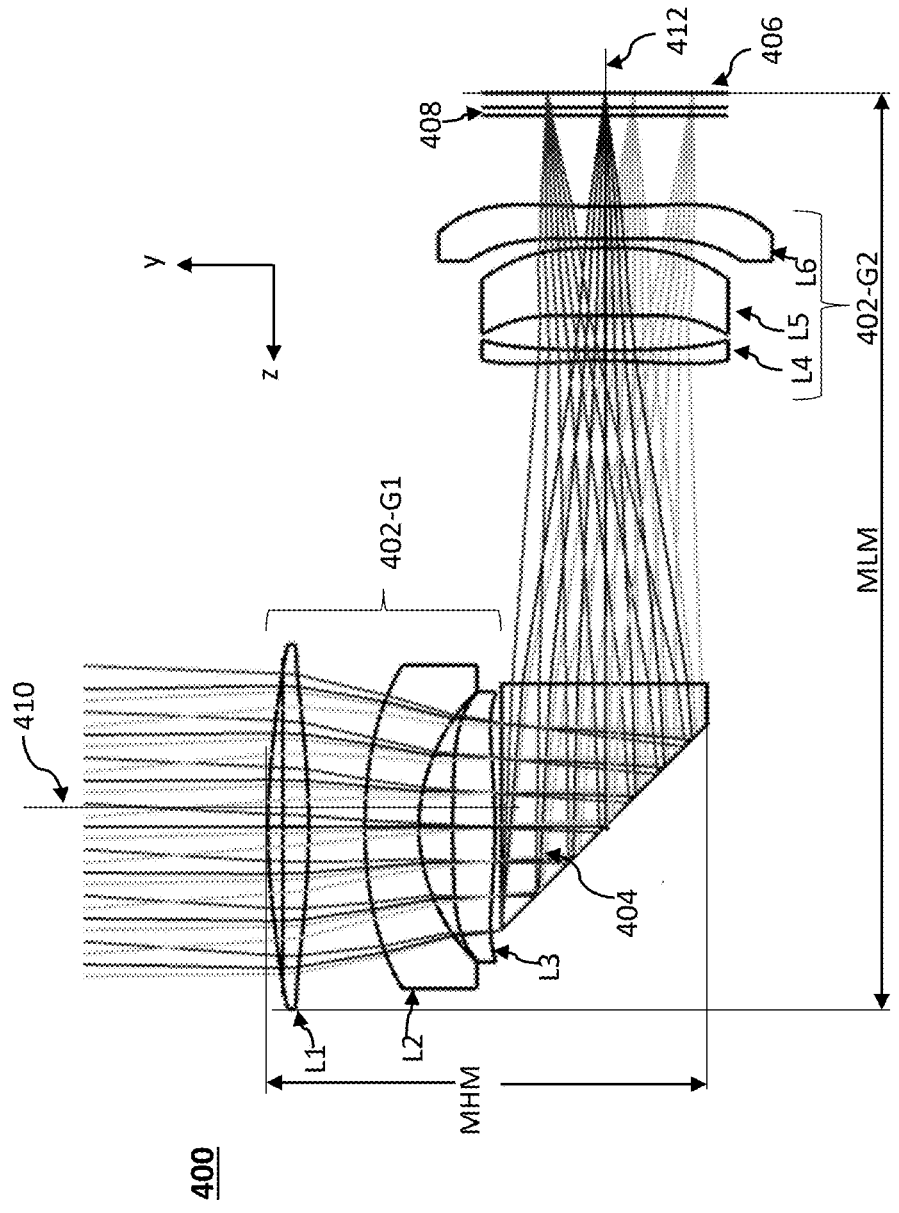
Figure 19C:
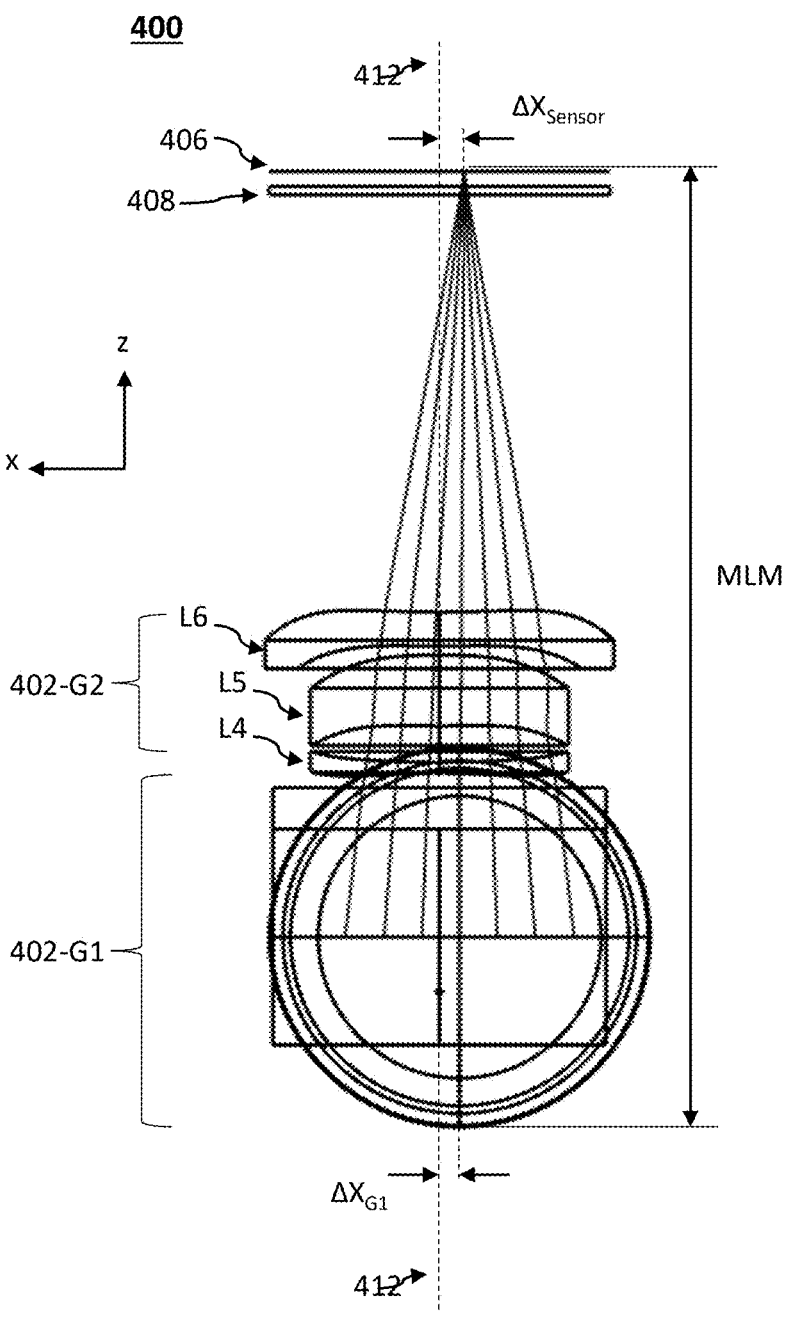
FIG. 19C shows the optical lens system of FIG. 19A when performing OIS in a second OIS direction.
Figure 19D:
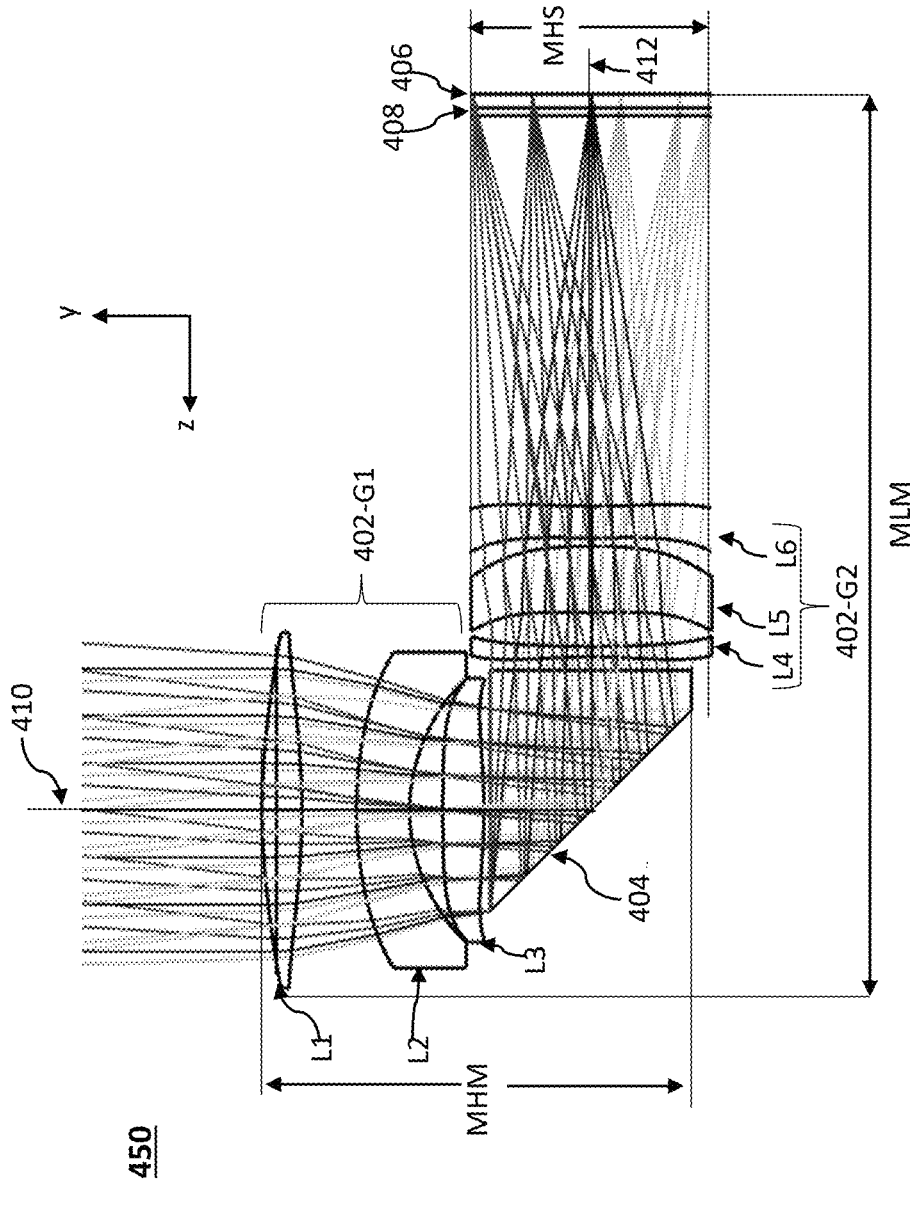
FIG. 19D shows a lens system similar to the lens system illustrated in FIG. 19A, including a cut lens.
Figure 20A:
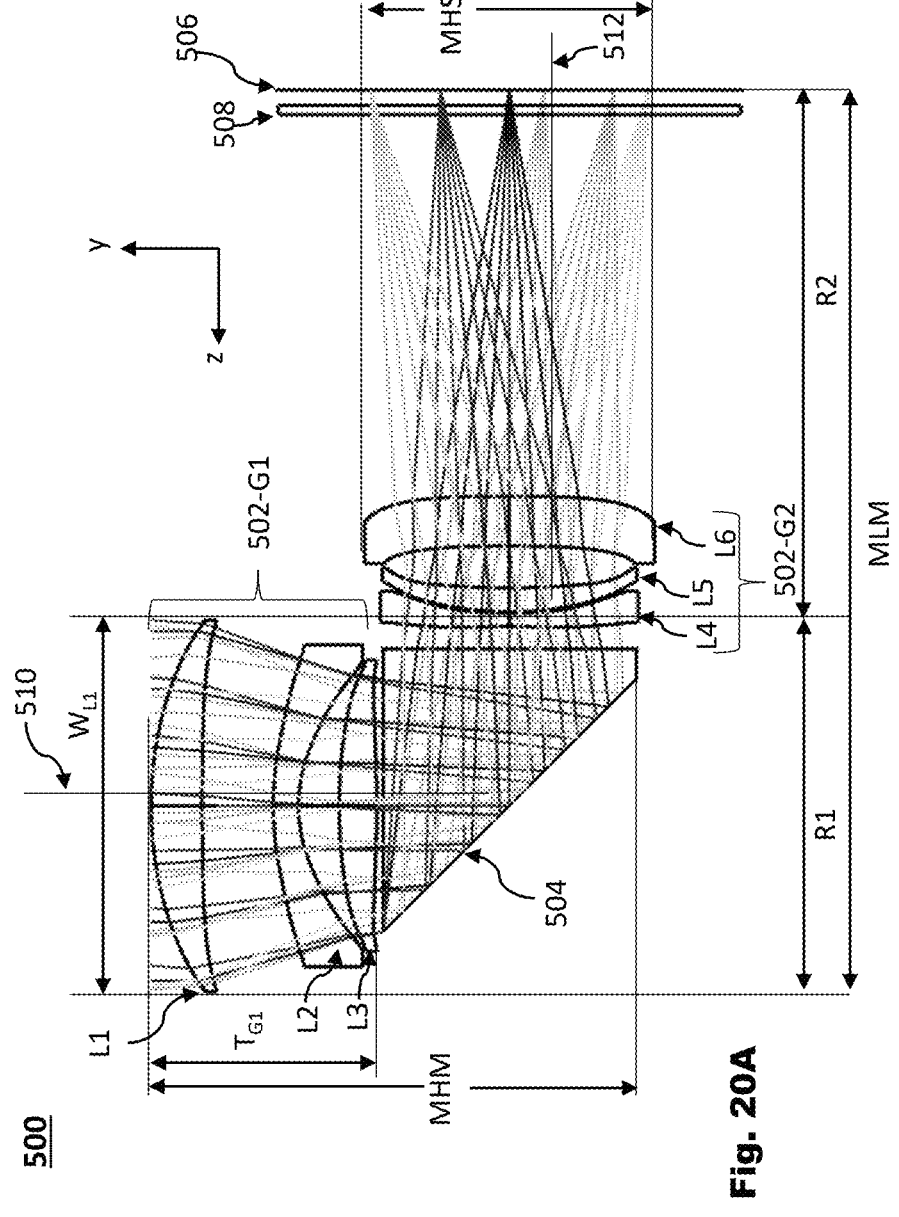
FIG. 20A-20B schematically illustrate an embodiment of another optical lens system disclosed herein, when focused to infinity, and when focused to 20 cm.
Figure 20B:
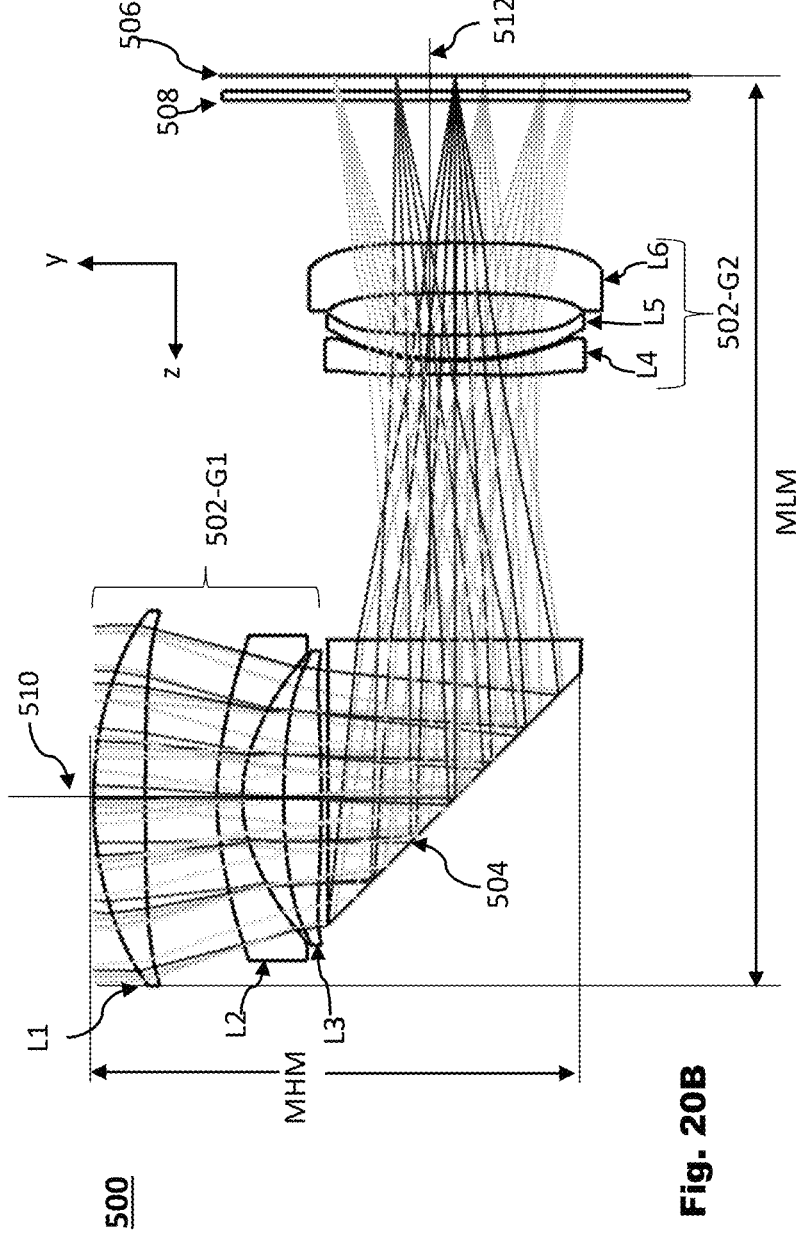
Figure 20C:
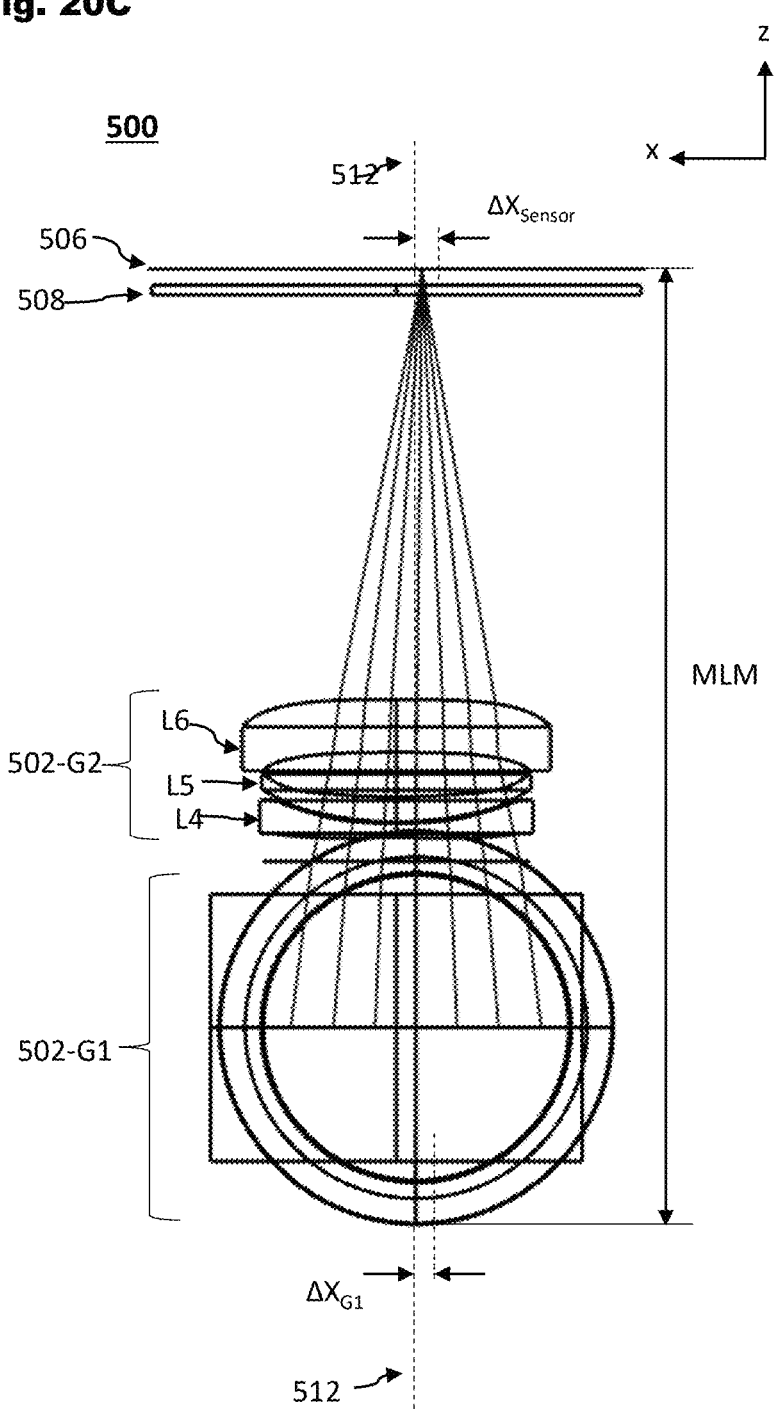
FIG. 20C shows the optical lens system of FIG. 20A when performing OIS in a second OIS direction.
Figure 20D:
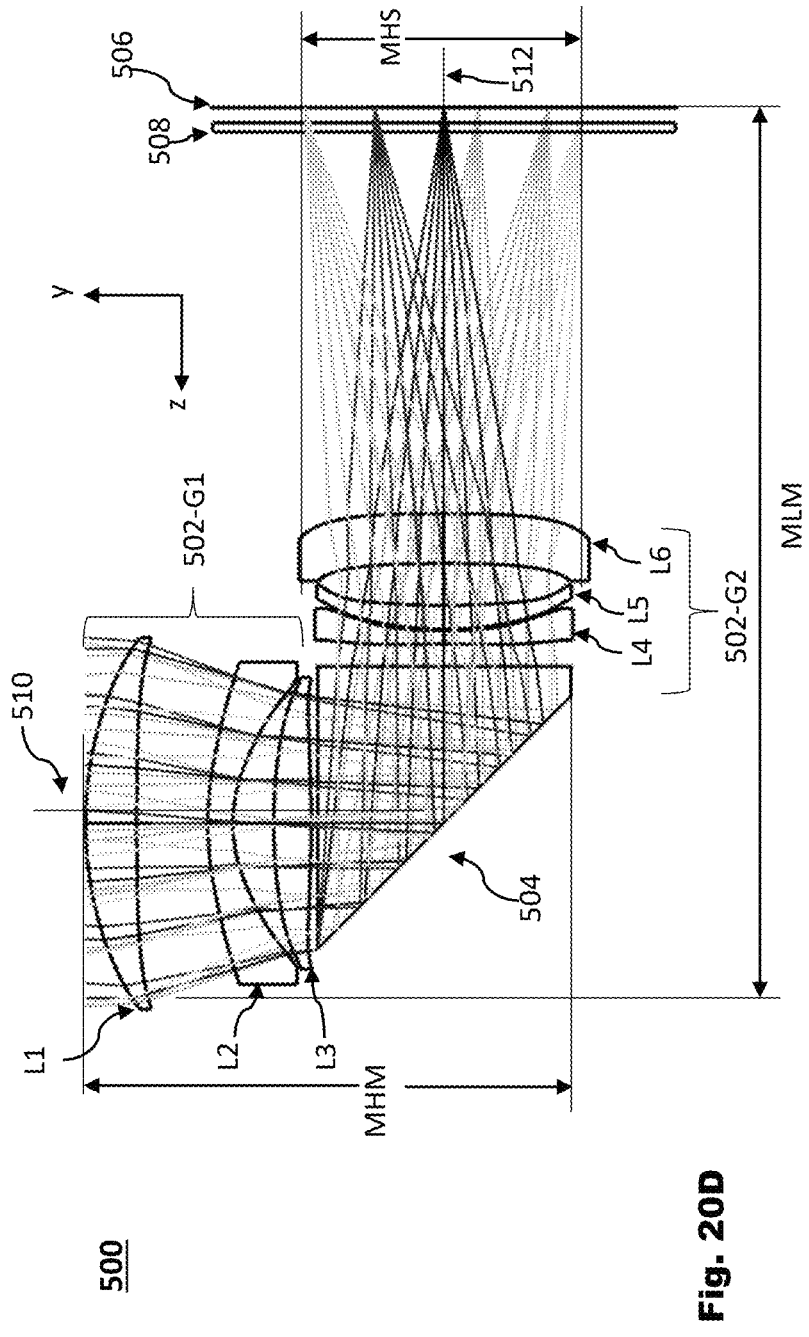
FIG. 20D shows system similar to the lens system illustrated in FIG. 20A, including a cut lens.

MHS-CUT refers to a height of an optical lens system including a cut lens (illustrated in FIGS. 18C, 19D, 20D).

"Cut ratio"=MHS-CUT/MHS, and is given in percentage. Cut ratio defines a percentage of height savings as of the cutting of G2.

BFL refers to an on-axis distance. $BFL_{MIN}$ refers to a minimum distance of any part of a last lens element to the image sensor.

DA refers to the aperture diameter. In all exemplary embodiments disclosed herein, $DA=DA_{L1}$.

FIG. 18A schematically illustrates an embodiment of an optical lens system disclosed herein and numbered 300. In FIG. 18A, lens system 300 is shown focused to infinity. Lens system 300 may comprise a lens 302, a prism 304, an optical element 308 and an image sensor 306. System 300 is shown with ray tracing. Optical element 308 is optional and may be, for example, an infra-red (IR) filter, and/or a glass image sensor dust cover. Lens 302 may be divided in two lens groups, 302-G1 that may include $L_1$-$L_3$ ("G1"), and 302-G2 that may include $L_4$-$L_7$ ("G2"). Optical rays that pass through 302-G1 may be reflected by prism 304, may pass through 302-G2, and may form an image on the image sensor 306. FIG. 18A shows 6 fields (image points) with 7 rays for each.

Lens 302 may include a plurality of N=7 lens elements. The 3 lens elements of 302-G1 may be axial-symmetric along a first optical (lens) axis (OP1) 310. The 4 lens elements of 302-G2 may be axial-symmetric along a second optical (lens) axis (OP2) 312.

Detailed optical data and surface data are given in Tables 4-5 for the example of the lens elements in FIG. 18A. The values provided for these examples are purely illustrative and according to other examples, other values can be used. Prism 304's light entrance surface may be tilted by about 0.3 degrees with respect to OP2 312. Prism 304's light exit surface may be tilted by about 0.6 degrees with respect to OP1 310. With reference to the angles defined in relation to FIG. 17B, the angles may have the values γ=44.7°, and α=45.6°.

TABLE 4

Embodiment 300
EFL = 23.5 mm, F number = 3.14, HFOV = 11.9°.

| Surf. # | Comment | Type | Curvature Radius | Thickness | Aperture Radius (D/2) | Material | Index | Abbe # | Focal Length |
|---|---|---|---|---|---|---|---|---|---|
| 1 | Stop | | Infinity | −1.096 | 3.750 | | | | |
| 2 | Lens 1 | QT1 | 6.615 | 1.603 | 3.750 | Glass | 1.584 | 60.726 | 10.976 |
| 3 | | | −207.476 | 0.032 | 3.799 | | | | |
| 4 | Lens 2 | QT1 | 14.033 | 0.879 | 3.557 | Plastic | 1.671 | 19.239 | 19.840 |
| 5 | | | −305.756 | 0.191 | 3.410 | | | | |
| 6 | Lens 3 | QT1 | −14.080 | 0.579 | 3.371 | Plastic | 1.614 | 25.587 | −7.338 |
| 7 | | | 6.803 | 0.873 | 2.922 | | | | |
| 8 | Prism Entrance | Plano | Infinity | 3.074 | 2.962 | Glass | 1.847 | 23.778 | |
| 9 | Reflection Surface | Plano | Infinity | 3.305 | 4.103 | Glass | 1.847 | 23.778 | |
| 10 | Prism Exitance | Plano | Infinity | Table 6 | 2.962 | | | | |
| 11 | Lens 4 | QT1 | 8.861 | 0.290 | 2.986 | Glass | 1.829 | 36.953 | −14.734 |
| 12 | | | 5.070 | 0.068 | 3.034 | | | | |
| 13 | Lens 5 | QT1 | 4.642 | 1.511 | 3.100 | Plastic | 1.535 | 55.686 | 12.015 |
| 14 | | | 14.693 | 3.208 | 3.100 | | | | |
| 15 | Lens 6 | QT1 | 10.182 | 1.222 | 3.100 | Plastic | 1.588 | 28.365 | 29.420 |
| 16 | | | 23.460 | 1.083 | 3.100 | | | | |
| 17 | Lens 7 | QT1 | 32.793 | 1.462 | 3.194 | Plastic | 1.567 | 37.400 | −21.176 |
| 18 | | | 8.679 | Table 6 | 3.825 | | | | |
| 19 | Filter | Plano | Infinity | 0.21 | — | Glass | 1.513 | 63.648 | |
| 20 | | | Infinity | 0.35 | — | | | | |
| 21 | Image | Plano | Infinity | — | — | | | | |

TABLE 5

| Surface # | Rnorm | A0 | A1 | A2 | A3 |
|---|---|---|---|---|---|
| | | Aspheric Coefficients | | | |
| 2 | 3.75E+00 | -6.99E-02 | 8.14E-04 | -1.02E-03 | -3.57E-05 |
| 3 | 3.92E+00 | -3.88E-02 | 1.38E-02 | -2.01E-03 | 1.37E-04 |
| 4 | 3.91E+00 | -8.08E-02 | -8.83E-03 | 1.05E-02 | -5.25E-04 |
| 5 | 3.49E+00 | -5.34E-02 | 5.34E-03 | 4.11E-03 | -4.32E-04 |
| 6 | 3.52E+00 | 2.79E-01 | -2.25E-02 | 5.65E-03 | -7.55E-04 |
| 7 | 3.22E+00 | 3.01E-01 | -3.17E-02 | 4.42E-03 | -1.51E-04 |
| 11 | 2.16E+00 | -6.55E-02 | -5.30E-04 | -2.00E-05 | 4.95E-08 |
| 12 | 2.18E+00 | -8.68E-02 | 5.67E-04 | -1.89E-04 | 4.90E-06 |
| 13 | 2.28E+00 | -7.57E-02 | 1.94E-03 | -3.19E-04 | 1.44E-05 |
| 14 | 2.87E+00 | -2.05E-01 | 3.95E-03 | 9.50E-04 | -1.14E-05 |
| 15 | 3.02E+00 | 2.64E-02 | 2.88E-03 | 9.42E-04 | 9.87E-05 |
| 16 | 2.85E+00 | -1.46E-02 | 1.45E-02 | 2.37E-04 | 3.11E-04 |
| 17 | 2.88E+00 | -6.48E-01 | 2.79E-02 | -2.21E-03 | -1.98E-04 |
| 18 | 3.26E+00 | -7.16E-01 | 5.52E-02 | -6.65E-03 | 4.93E-04 |

* All conic constants are zero

As shown for optical lens system 300 in FIG. 18C, optical lens system 300 may be operational to perform OIS as disclosed herein with reference to method 1 of Table 1. For performing OIS in a first OIS direction according to method 1, 302-G1 may be moved parallel to OP2 312 (i.e., along the z-axis shown). 302-G1 may be moved by an amount $\Delta X_{G1}$, that may be referred to as a "stroke" or "OIS stroke". Here, $\Delta X_{G1} \approx 0.55$ mm. In other examples, $\Delta X_{G1}$ may be $\Delta X_{G1} = 0.25$ mm-2.5 mm. The movement of 302-G1 may shift an image on image sensor 306 by $\Delta X_{Sensor}$. Here, $\Delta X_{Sensor} = 0.75 \cdot \Delta X_{G1} - 1.5 \cdot \Delta X_{G1}$. For performing OIS in a second OIS direction according to method 1, 302-G1 may be moved perpendicular to both OP1 310 and OP2 312. In an alternative method, for performing OIS in a second OIS direction, 302-G1 and 302-G2 may be moved together perpendicular to both OP1 310 and OP2 320.

Lens groups 302-G1 and 302-G2 might need to support relatively large tolerances with respect to "decentering" of one of 302-G1 or 302-G2. In other words, optical lens system 300 may be operational to capture a crisp image even under a condition where one of 302-G1 or 302-G2 is "decentered". "Decentering" may refer to the shifting of a lens group in a direction perpendicular to its lens optical axis, e.g., shifting 302-G1 perpendicular to OP1 310 or shifting 302-G2 perpendicular to OP1 312. A shifted lens group may be described as "decentered". To support such relatively large tolerances with respect to "decentering", 302-G1 by itself may need to be a relatively good imaging lens, i.e., an image quality (e.g., a minimum value of a modulation transfer function) of an image captured by using only 302-G1 (and, for an object at infinity, placing an image sensor at a distance $EFL_{G1}$) may need to be relatively high. The high quality image may also enable relatively large tolerances with respect to a tilt between 302-G1 and 302-G2. In other words, optical lens system 300 may be operational to capture a crisp image even under a condition where one of 302-G1 or 302-G2 is "tilted" with respect to the other. "Tilting" here may refer to the tilting (or rotating) of a first lens group such as 302-G1 around a rotation axis which may be substantially parallel to OP2 312 or tilting (rotating) a second lens group such as 302-G2 around a rotation axis which may be substantially parallel to OP1 310. Such a shifted lens group may be described as "tilted". The relatively large tolerances of 302-G1 and 302-G2 in terms of decenter and tilt can make active alignment ("AA") as known in the art redundant. That is, the relatively large tolerances may be beneficial for assembling an optical lens system including two lens groups such as the optical lens systems disclosed herein without need of optical feedback. In other words, a camera including an optical lens system disclosed herein may not need AA when assembling the camera from components such as 302-G1, an OPFE, 302-G2 and an image sensor. We note that having no need for AA may be beneficial in terms of manufacturing (or production) complexity and cost. This might pose a trade-off when designing a first lens group such as 302-G1: As known, a relatively large number of lens elements is beneficial for achieving a good imaging lens. However, incorporating a relatively large number of lens elements in a first lens group increase MHM, which is unbeneficial in terms of industrial design. In the optical lens systems 300, 400 and 500 disclosed herein, this trade-off may be resolved by including 3 lens elements into the respective first lens group 302-G1, 402-G1 and 502-G1. In other examples, 2-5 lens elements may be included in a first lens group.

Generally, and for an object at infinity in particular, a first lens group such as 302-G1 may form a high-quality image at a distance of about $EFL_{G1}$ from 302-G1, which may be "transferred" by $EFL_{G2}$ to the image plane at image sensor 306. This may imply that following conditions may be beneficial for supporting OIS according to at least the first method:

1. $|EFL_{G1}| < |EFL_{G2}|$ or $2 \cdot |EFL_{G1}| < |EFL_{G2}|$ or even $3 \cdot |EFL_{G1}| < |EFL_{G2}|$, i.e., a magnitude of $EFL_{G1}$ is smaller than a magnitude of $EFL_{G2}$ (or even smaller than half or third of a magnitude of $EFL_{G2}$).
2. $EFL_{G1} < 2 \cdot EFL$, or beneficially $EFL_{G1} < EFL$ or $EFL_{G1} < 0.9 \cdot EFL$ or even or $EFL_{G1} < 0.8$. EFL.

An EFL of all lens elements of 302-G1 together ("$EFL_{G1}$") may be positive. An EFL of all lens elements of 302-G2 together ("$EFL_{G2}$") may also be positive. A TTL of optical lens system 300 may be TTL=27.4 mm, a camera module height and length may be MHM=9.88 mm and MLM=23.97 mm. Dimension ratios may include TTL/EFL=1.17, MLM/EFL=1.02, MLM/TTL=0.87 and DA/SH=0.82. A sequence of a sign of a lens power of each lens elements $L_1$-$L_7$ may be positive-positive-negative-positive-positive-positive-positive. MHS may be defined by the aperture diameter of $L_7$.

FIG. 18B schematically illustrates lens system 300 focused to 50.5 cm. For focusing optical lens system 300, 302-2 is moved with respect to 302-G1, OPFE 304 and image sensor 306. Table 6 shows the movements which may be required for focusing to infinity and to 50.5 cm, respectively. For focusing optical lens system 300, 302-2 may be moved away from image sensor 306 and towards OPFE 304.

FIG. 18C schematically illustrates optical lens system 350 disclosed herein. Optical lens system 350 may be similar to optical lens system 300, except that 302-G2 may be "cut", as known in the art. 302-G2 may be cut by 20%, i.e., 302-G2's optical width $W_{Li}$ may be 20% larger than 302-G2's optical height Hui. The cutting may be parallel to OP 312 and so that 302-G2 may not exceed a height or a y-coordinate towards optical lens system 300's bottom or top (measured along OP 310) of prism 304 or image sensor 306. MHS may be defined by $H_S$, the height of image sensor 306.

In other examples, 302-G2 may be cut by 30%, i.e., its optical width $W_{Li}$ may be 30% larger than its optical height $H_{Li}$. In other examples, 302-G2 may be cut by 10%-50%. This means that 302-G2's aperture may also change accordingly, such that the aperture may not be axially symmetric. The cutting ma allow for a small $H_L$, which may be required for small MHS, and still relatively large effective aperture diameters (DAs) which satisfy $DA > H_{Li}$.

TABLE 6

| Object Distance [mm] | $S_{10}$ [mm] | $S_{18}$ [mm] |
|---|---|---|
| Infinity | 3.314 | 4.136 |
| 505 | 0.993 | 6.457 |

FIG. 19A schematically illustrates an embodiment of an optical lens system disclosed herein and numbered 400. In FIG. 19A, lens system 400 is shown focused to infinity. Lens system 400 may comprise a lens 402, may comprise a prism 404, may an (optional) optical element 408 and may comprise an image sensor 406. Lens 402 may be divided in two lens groups, 402-G1 that may include $L_1$-$L_3$ ("G1"), and 402-G2 that may include $L_4$-$L_6$ ("G2"). Prism 404 may be oriented at an angle of 45 degrees with respect to the y-axis and the z-axis. Optical rays may pass through 402-G1, may be reflected by prism 404, may pass through 402-G2, and may form an image on image sensor 406. FIG. 19A shows 6 fields with 7 rays for each.

Surface types and parameters are listed in Table 7. The coefficients for the surfaces are listed in Table 8.

Prism 404 may be a cut prism, as known in the art. A TTL of optical lens system 400 may be TTL=26.9 mm, wherein TTL$_1$=8.5 mm and TTL$_2$=18.5 mm. MHM=11.1 mm and MLM=23.0 mm. Dimension ratios may include TTL/ EFL=1.05, MLM/EFL=0.9 and MLM/TTL=0.86. EFL$_{G1}$ may be positive. EFL$_{G2}$ may be negative. A sequence of a sign of a lens power of each lens elements $L_1$-$L_6$ may be positive-negative-positive-negative-positive-negative. MHS may be defined by the aperture diameter of $L_6$.

TABLE 7

Embodiment 400
EFL = 25.5mm, F number = 3.08, HFOV = 11.71°.

| Surf. # | Comment | Type | Curvature Radius | Thickness | Aperture Radius (D/2) | Material | Index | Abbe # | Focal Length |
|---|---|---|---|---|---|---|---|---|---|
| 1 | Stop | | Infinity | -0.373 | 4.250 | | | | |
| 2 | Lens 1 | QT1 | 16.805 | 1.021 | 4.576 | Glass | 1.739 | 48.991 | 12.191 |
| 3 | | | -19.046 | 1.410 | 4.534 | | | | |
| 4 | Lens 2 | QT1 | 11.500 | 1.358 | 4.067 | Plastic | 1.614 | 25.587 | -12.085 |
| 5 | | | 4.326 | 0.855 | 3.400 | | | | |
| 6 | Lens 3 | QT1 | 57.693 | 1.052 | 3.400 | Plastic | 1.535 | 55.686 | 24.852 |
| 7 | | | -17.233 | 0.166 | 3.400 | | | | |
| 8 | Prism Entrance | Plano | Infinity | 2.602 | 3.518 | Glass | 1.847 | 23.778 | |
| 9 | Reflection Surface | Plano | Infinity | 3.602 | 3.689 | Glass | 1.847 | 23.778 | |
| 10 | Prism Exit | Plano | Infinity | Table 9 | 2.977 | | | | |
| 11 | Lens 4 | QT1 | -14.610 | 0.263 | 3.100 | Plastic | 1.535 | 55.686 | -18.94 |
| 12 | | | 33.593 | 0.873 | 3.100 | | | | |
| 13 | Lens 5 | QT1 | 31.730 | 1.706 | 3.100 | Plastic | 1.544 | 55.933 | 24.44 |
| 14 | | | -22.599 | 0.221 | 3.100 | | | | |
| 15 | Lens 6 | QT1 | 33.905 | 0.815 | 3.417 | Plastic | 1.544 | 55.933 | -201.97 |
| 16 | | | 25.713 | Table 9 | 4.192 | | | | |
| 17 | Filter | Plano | Infinity | 0.21 | — | Glass | 1.513 | 63.648 | |
| 18 | | | Infinity | 0.35 | — | | | | |
| 19 | Image | Plano | Infinity | — | — | | | | |

End of Table 7

TABLE 8

Aspheric Coefficients

| Surface # | Rnorm | A0 | A1 | A2 | A3 |
|---|---|---|---|---|---|
| 2 | 3.75E+00 | -9.05E-02 | 4.34E-03 | 3.92E-04 | 5.51E-05 |
| 3 | 3.92E+00 | 1.19E-01 | -8.28E-04 | 1.01E-03 | 5.07E-05 |

TABLE 8-continued

Aspheric Coefficients

| Surface # | Rnorm | A0 | A1 | A2 | A3 |
|---|---|---|---|---|---|
| 4 | 3.91E+00 | 1.65E-01 | 5.47E-03 | -1.16E-03 | 1.20E-03 |
| 5 | 3.49E+00 | -2.28E-01 | 1.84E-02 | -5.81E-03 | 8.40E-04 |
| 6 | 3.52E+00 | 5.57E-01 | 7.72E-02 | 2.37E-03 | 1.39E-03 |
| 7 | 3.22E+00 | 2.53E-01 | 2.48E-02 | 1.10E-03 | 4.84E-04 |
| 11 | 3.10E+00 | 3.64E-01 | -7.20E-02 | 2.05E-03 | -1.28E-03 |
| 12 | 3.10E+00 | 1.01E-01 | 1.61E-02 | 3.02E-03 | -7.40E-04 |
| 13 | 3.10E+00 | -6.71E-01 | 3.82E-02 | 8.14E-03 | 8.09E-04 |
| 14 | 3.10E+00 | -6.37E-01 | 6.05E-02 | -5.12E-03 | 9.99E-04 |
| 15 | 4.20E+00 | -1.67E+00 | 1.00E-02 | -2.69E-02 | 1.15E-02 |
| 16 | 4.20E+00 | -9.73E-01 | -7.10E-02 | 8.39E-03 | -3.15E-03 |

End of Table 8

Table 7 provides the clear aperture radius of prism 404. Prism 404's rectangular apertures half-widths may be 3.55× 2.6 mm, 3.25×3.68 mm, 3.1×2.6 mm for entrance, reflection and exit surfaces, respectively.

FIG. 19B schematically illustrates lens system 400 focused to 20.5 cm. For focusing optical lens system 400, 402-2 may be moved with respect to 402-G1, OPFE 404 and image sensor 406. When optical lens system 400 may be focused to 20.5 cm, and compared to optical lens system 400 focused to infinity, 80% of the FOV may be used for imaging. Table 9 lists the movements that may be required for focusing to infinity and to 20.5 cm, respectively. For focusing optical lens system 400, 402-2 may be moved towards image sensor 406 and away from OPFE 404.

TABLE 9

| Object Distance [mm] | $S_{10}$ [mm] | $S_{16}$ [mm] |
|---|---|---|
| Infinity | 0.35 | 10.056 |
| 205 | 8.117 | 2.289 |

FIG. 19C schematically illustrates optical lens system 400 when performing OIS in a second OIS direction according to method 1, as disclosed herein. Optical lens system 400 is shown focused to infinity. For OIS, 402-G1 may be moved parallel to the x-axis, i.e. perpendicular to both OP1 410 and OP2 412. 402-G1 is moved by $\Delta X_{G1}$. Here, $\Delta X_{G1} \approx 0.5$ mm. The movement of 402-G1 shifts an image on image sensor 406 by $\Delta X_{Sensor}$. Here, $\Delta X_{Sensor} \approx 0.6$ mm, so that $\Delta X_{Sensor}/\Delta X_{G1} \approx 1.2$. For performing OIS in a first OIS direction, 402-G1 may be moved parallel to OP2 412 (i.e., along the z-axis shown). For performing OIS in a second OIS direction according to an alternative method, 402-G1 and 402-G2 may be moved together perpendicular to both OP1 410 and OP2 412. In some examples, $\Delta X_{G1}$ may be $\Delta X_{G1} = 0.25$ mm-2.5 mm. The movement of 402-G1 may shift an image on image sensor 406 by $\Delta X_{Sensor}$. Here, $\Delta X_{Sensor} = 0.75 \cdot \Delta X_{G1} - 1.5 \cdot \Delta X_{G1}$.

FIG. 19D illustrates optical lens system 450 disclosed herein. Optical lens system 450 may be similar to optical lens system 400, except that 402-G2 may be "cut", as known in the art. In comparison to optical lens system 400, 402-G2 may be cut by 27%. The cutting may be performed as described for optical lens system 350. MHS may be defined by $H_S$.

FIG. 20A schematically illustrates an embodiment of an optical lens system disclosed herein and numbered 500. In FIG. 20A, lens system 500 is shown focused to infinity. Lens system 500 may comprise a lens 502, may comprise a prism 504, may comprise an (optional) optical element 508 and may comprise an image sensor 506. Lens 502 may be divided into two lens groups, 502-G1 that may include $L_1$-$L_3$ ("G1"), and 502-G2 that may include $L_4$-$L_6$ ("G2"). Prism 504 may be oriented at an angle of 45 degrees with respect to the y-axis and the z-axis. Optical rays may pass through 502-G1, may be reflected by prism 504, may pass through 502-G2, and may form an image on image sensor 506. FIG. 20A shows 6 fields with 7 rays for each.

Surface types are listed in Table 10. The coefficients for the surfaces are listed in Table 11.

Prism 504 may be a cut prism, as known in the art.

The TTL of optical lens system 500 may be TTL=24.6 mm, wherein $TTL_1$=8.2 mm and $TTL_2$=16.4 mm. MHM=11.1 mm and MLM=20.6 mm. $EFL_{G1}$ may be positive. $EFL_{G2}$ may be negative. A sequence of a sign of a lens power of each lens elements $L_1$-$L_6$ may be positive-negative-positive-negative-positive-negative. MHS may be defined by the aperture diameter of $L_6$.

TABLE 10

Embodiment 500
EFL = 23.67 mm, F number = 2.81, HFOV =12.57°.

| Surf. # | Comment | Type | Curvature Radius | Thickness | Aperture Radius (D/2) | Material | Index | Abbe # | Focal Length |
|---|---|---|---|---|---|---|---|---|---|
| 1 | Lens 1 | QT1 | 8.714 | 1.169 | 4.526 | Plastic | 1.739 | 44.537 | 11.68 |
| 2 | | | −1337.436 | 1.624 | 4.250 | | | | |
| 3 | Lens 2 | QT1 | 8.899 | 0.576 | 4.221 | Plastic | 1.614 | 25.587 | −10.99 |
| 4 | | | 3.759 | 0.933 | 3.687 | | | | |
| 5 | Lens 3 | QT1 | 19.327 | 0.851 | 3.346 | Plastic | 1.535 | 55.686 | 19.68 |
| 6 | | | −22.932 | 0.149 | 3.331 | | | | |
| 7 | Prism Entrance | Plano | Infinity | 2.882 | 3.501 | Glass | 1.847 | 23.778 | |
| 8 | Reflection Surface | Plano | Infinity | −2.169 | 4.110 | Glass | 1.847 | 23.778 | |
| 9 | Prism Exitance | Plano | Infinity | Table 12 | 2.891 | | | | |
| 10 | Lens 4 | QT1 | −19.249 | 0.307 | 2.650 | Plastic | 1.614 | 25.587 | −14.57 |
| 11 | | | 17.058 | 0.032 | 2.944 | | | | |
| 12 | Lens 5 | QT1 | 8.694 | 0.544 | 2.908 | Plastic | 1.671 | 19.239 | 21.56 |
| 13 | | | 20.964 | 0.955 | 2.870 | | | | |
| 14 | Lens 6 | QT1 | −49.790 | 1.137 | 2.884 | Plastic | 1.544 | 55.933 | −239.94 |
| 15 | | | −80.954 | Table 12 | 3.318 | | | | |
| 16 | Filter | Plano | Infinity | 0.21 | — | Glass | 1.513 | 63.648 | |
| 17 | | | Infinity | 0.35 | — | | | | |
| 18 | Image | Plano | Infinity | — | — | | | | |

End of Table 10

TABLE 11

Aspheric Coefficients

| Surf. # | Rnorm | A0 | A1 | A2 | A3 | A4 | A5 |
|---|---|---|---|---|---|---|---|
| 1 | 4.25E+00 | 1.17E−01 | 1.37E−02 | 8.48E−03 | −5.95E−04 | −2.06E−04 | −5.38E−04 |
| 2 | 4.41E+00 | 3.96E−01 | −9.96E−03 | 1.01E−02 | −8.28E−03 | −5.77E−04 | −1.06E−03 |
| 3 | 3.71E+00 | −5.49E−02 | −3.83E−02 | 2.37E−02 | −2.30E−02 | 1.11E−02 | −3.68E−03 |
| 4 | 3.34E+00 | −4.19E−01 | −1.20E−01 | 2.64E−04 | −4.07E−02 | 5.72E−03 | −3.57E−03 |
| 5 | 3.35E+00 | 3.63E−01 | −2.91E−02 | 4.28E−03 | −2.32E−02 | −2.45E−03 | −2.40E−03 |
| 6 | 3.26E+00 | 2.05E−01 | 8.85E−03 | 1.18E−02 | −1.39E−03 | 1.38E−03 | −1.95E−04 |
| 10 | 2.70E+00 | −3.19E−01 | 4.80E−02 | −8.99E−03 | 5.62E−04 | 1.12E−04 | 1.48E−03 |
| 11 | 2.70E+00 | −3.65E−01 | 8.36E−02 | −1.10E−02 | 5.36E−03 | 1.28E−03 | 2.38E−03 |
| 12 | 2.74E+00 | −1.61E−01 | −1.07E−02 | −1.02E−02 | 1.03E−02 | 1.64E−03 | −1.87E−03 |

TABLE 11-continued

| | | | Aspheric Coefficients | | | | |
|---|---|---|---|---|---|---|---|
| Surf. # | Rnorm | A0 | A1 | A2 | A3 | A4 | A5 |
| 13 | 2.75E+00 | −1.56E−01 | −5.49E−02 | −9.89E−03 | 7.04E−03 | 2.76E−04 | −3.65E−03 |
| 14 | 2.78E+00 | 2.09E−01 | 1.65E−02 | 6.64E−03 | 5.20E−03 | 1.36E−03 | −7.02E−04 |
| 15 | 3.59E+00 | 7.21E−01 | 1.35E−01 | 5.00E−02 | 1.03E−02 | −4.69E−03 | −6.53E−03 |

End of Table 11

Table 10 provides the clear aperture radius of prism 504. Prism 504's rectangular apertures half-widths may be 3.501×2.882 mm. 3.13×4.11 mm. 2.9×2.75 mm for entrance, reflection and exitance surface, respectively.

FIG. 20B schematically illustrates lens system 500 focused to 20 cm. For focusing optical lens system 500, 502-2 may be moved with respect to 502-G1, OPFE 504 and image sensor 506. When optical lens system 500 may be focused to 20 cm, 80% of the FOV may be used for imaging, in comparison to when optical lens system 500 may be focused to infinity. Table 12 lists the movements which may be required for focusing to infinity and to 20 cm, respectively. For focusing optical lens system 500, 502-2 may be moved towards image sensor 506 and away from OPFE 504.

TABLE 12

| Object Distance [mm] | $S_{10}$ [mm] | $S_{16}$ [mm] |
|---|---|---|
| Infinity | 0.507 | 8.727 |
| 200 | 6.010 | 3.225 |

FIG. 20C schematically illustrates optical lens system 500 when performing OIS in a second OIS direction according to method 1, as disclosed herein. Optical lens system 500 is shown focused to infinity. For OIS, 502-G1 may be moved parallel to the x-axis, i.e., perpendicular to both OP1 510 and OP2 512. 502-G1 is moved by $\Delta X_{G1}$. Here, $\Delta X_{G1} \approx 0.5$ mm. The movement of 502-G1 shifts an image on image sensor 506 by $\Delta X_{Sensor}$. Here, $\Delta X_{Sensor} \approx 0.6$ mm, so that $\Delta X_{Sensor} / \Delta X_{G1} \approx 1.2$. For performing OIS in a first OIS direction, 502-G1 may be moved parallel to OP2 412 (i.e., along the z-axis shown). In an alternative method, for performing OIS in a second OIS direction, 502-G1 and 502-G2 may be moved together perpendicular to both OP1 510 and OP2 512.

FIG. 20D schematically illustrates optical lens system 550 disclosed herein. Optical lens system 550 is identical with optical lens system 500, except that 502-G2 is "cut" as known in the art. With reference to optical lens system 500, 502-G2 is cut by 8%. The cutting is performed as described for optical lens system 350. MHS is defined by $H_S$.

Figure 21A:
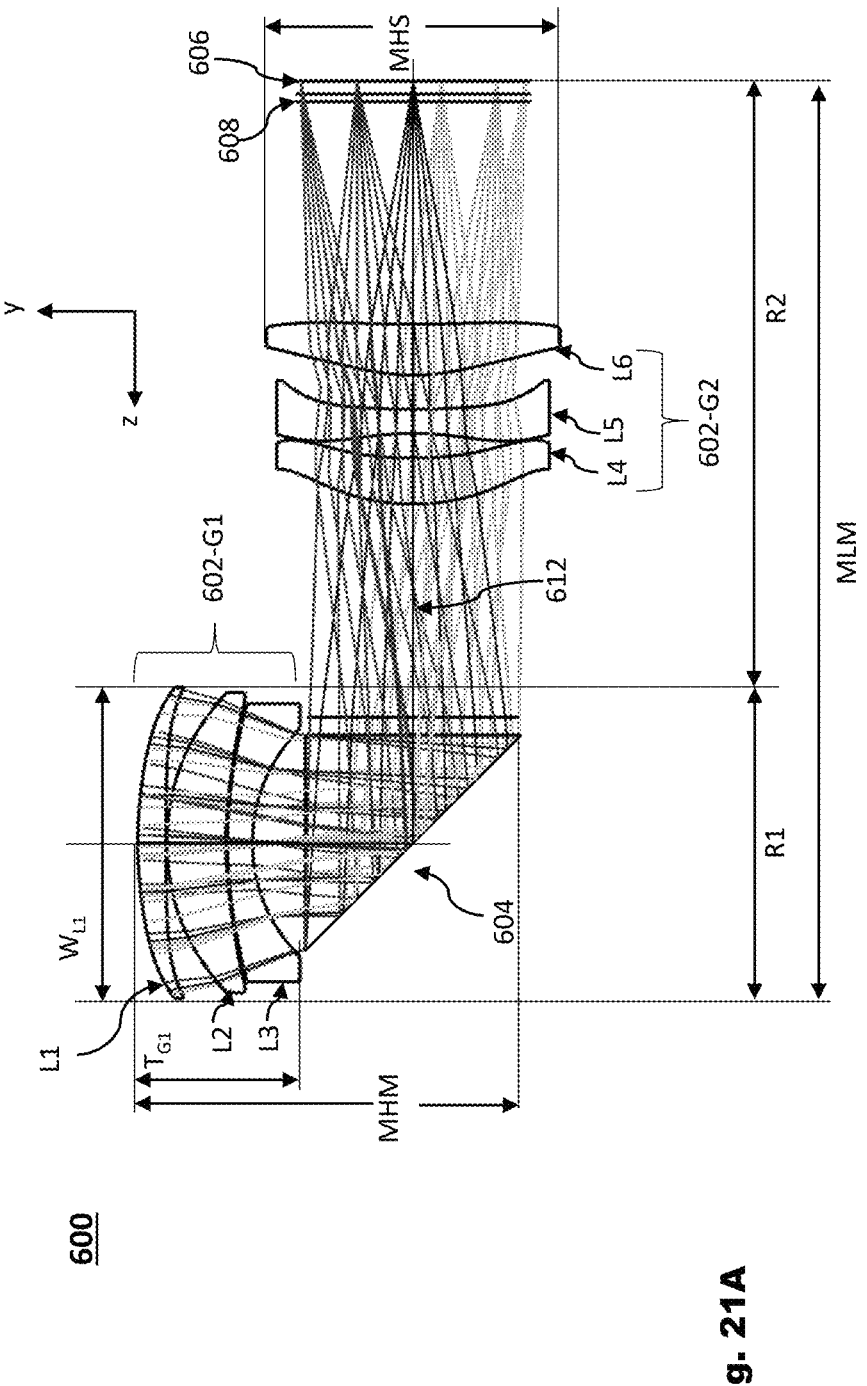
FIG. 21A-21B schematically illustrate an embodiment of yet another optical lens system disclosed herein, when focused to infinity, and when focused to 20 cm.

FIG. 21A schematically illustrates an embodiment of another optical lens system disclosed herein and numbered 600. In FIG. 21A, lens system 600 is shown focused to infinity. Lens system 600 may comprise a lens 602, may comprise a prism 604, may comprise an (optional) optical element 608 and may comprise an image sensor 606. Lens 602 may be divided into two lens groups, 602-G1 that may include $L_1$-$L_3$ ("G1"), and 602-G2 that may include $L_4$-$L_6$ ("G2"). Prism 604 may be oriented at an angle of 45 degrees with respect to the y-axis and the z-axis. Optical rays may pass through 602-G1, may be reflected by prism 604, may pass through 602-G2 and may form an image on image sensor 606. FIG. 21A shows 6 fields with 7 rays for each.

Surface types are listed in Table 13. The coefficients for the surfaces are listed in Table 14. Prism 604 may be a cut prism, as known in the art.

The TTL of optical lens system 600 may be TTL=28.3 mm, wherein $TTL_1$=7.5 mm and $TTL_2$=20.8 mm. MHM=10.4 mm and MLM=25.6 mm. Both $EFL_{G1}$ and $EFL_{G2}$ may be positive. A sequence of a sign of a lens power of each lens elements $L_1$-$L_6$ may be positive-positive-negative-positive-negative-positive. MHS may be defined by the aperture diameter of $L_6$. Table 13 also provides a clear aperture radius of prism 604.

In other embodiments, 602-G2 may be cut as known in the art. G2 may be cut by 24%. The cutting may be performed as described above. When cutting 602-G2 by 24%, MHS may be defined by $H_S$.

TABLE 13

| | | | | | | | | | |
|---|---|---|---|---|---|---|---|---|---|
| | | | Embodiment 600 | | | | | | |
| | | | EFL = 23.50mm, F number = 2.78, HFOV = 12.2°. | | | | | | |
| Surf. # | Comment | Type | Curvature Radius | Thickness | Aperture Radius (D/2) | Material | Index | Abbe # | Focal Length |
| 1 | Lens 1 | QT1 | 11.731 | 0.767 | 4.250 | Plastic | 1.728 | 51.102 | 17.688 |
| 2 | | | 122.838 | 0.029 | 4.250 | | | | |
| 3 | Lens 2 | QT1 | 6.492 | 1.599 | 4.108 | Plastic | 1.567 | 37.400 | 25.104 |
| 4 | | | 10.823 | 0.053 | 3.843 | | | | |
| 5 | Lens 3 | QT1 | 13.978 | 0.674 | 3.792 | Plastic | 1.614 | 25.587 | −11.265 |
| 6 | | | 4.564 | 1.441 | 3.127 | | | | |
| 7 | Prism Entrance | Plano | Infinity | 2.939 | 3.750 | Glass | 1.847 | 23.778 | |
| 8 | Reflection Surface | Plano | Infinity | 3.432 | 4.250 | Glass | 1.847 | 23.778 | |
| 9 | Prism Exitance | Plano | Infinity | Table 15 | 3.414 | | | | |
| 10 | Lens 4 | QT1 | 5.768 | 1.260 | 3.618 | Plastic | 1.544 | 55.933 | 22.474 |
| 11 | | | 10.045 | 0.676 | 3.711 | | | | |

TABLE 13-continued

| | Embodiment 600 EFL = 23.50mm, F number = 2.78, HFOV = 12.2°. | | | | | | | | |

| Surf. # | Comment | Type | Curvature Radius | Thickness | Aperture Radius (D/2) | Material | Index | Abbe # | Focal Length |
|---|---|---|---|---|---|---|---|---|---|
| 12 | Lens 5 | QT1 | −7.709 | 0.654 | 3.711 | Plastic | 1.614 | 25.587 | −8.252 |
| 13 | | | 15.596 | 0.933 | 3.579 | | | | |
| 14 | Lens 6 | QT1 | 5.175 | 1.392 | 4.000 | Plastic | 1.588 | |28.365 | 10.256 |
| 15 | | | 31.781 | Table 15 | 3.318 | | | | |
| 16 | Filter | Plano | Infinity | 0.21 | — | Glass | 1.513 | 63.648 | |
| 17 | | | Infinity | 0.35 | — | | | | |
| 18 | Image | Plano | Infinity | — | — | | | | |

End of Table 13

TABLE 14

| | | | Aspheric Coefficients | | | | |
|---|---|---|---|---|---|---|---|
| Surface # | Rnorm | A0 | A1 | A2 | A3 | A4 | |
| 1 | 4.25E+00 | 1.44E−01 | 7.22E−02 | −2.00E−03 | 3.71E−04 | 6.90E−05 | |
| 2 | 4.25E+00 | 3.83E−01 | 3.96E−02 | −5.08E−03 | −3.89E−04 | −6.60E−05 | |
| 3 | 4.14E+00 | 1.95E−01 | −2.80E−02 | −1.37E−03 | −2.63E−04 | 1.23E−04 | |
| 4 | 3.87E+00 | −2.34E−01 | 2.96E−02 | 8.00E−03 | −1.33E−03 | 2.04E−04 | |
| 5 | 3.85E+00 | 1.31E−02 | −1.55E−02 | 8.08E−03 | −1.83E−03 | −6.93E−05 | |
| 6 | 3.65E+00 | 6.30E−02 | −5.79E−02 | −8.95E−03 | −2.23E−03 | −1.63E−04 | |
| 10 | 3.13E+00 | −5.47E−02 | −3.00E−02 | −4.09E−03 | 2.07E−04 | −1.52E−05 | |
| 11 | 3.13E+00 | 2.41E−02 | −4.47E−02 | −3.38E−03 | 9.01E−04 | −9.16E−05 | |
| 12 | 3.38E+00 | 6.72E−01 | −3.46E−03 | −9.04E−03 | 1.23E−03 | −1.33E−04 | |
| 13 | 3.37E+00 | 1.81E−01 | 9.66E−02 | −2.05E−02 | 1.68E−03 | −1.39E−04 | |
| 14 | 3.61E+00 | −8.45E−01 | 6.68E−02 | −1.10E−02 | −8.13E−04 | 3.92E−04 | |
| 15 | 3.83E+00 | −2.77E−01 | 1.34E−03 | 1.88E−03 | −3.37E−03 | 7.43E−04 | |

End of Table 14

Figure 21B:
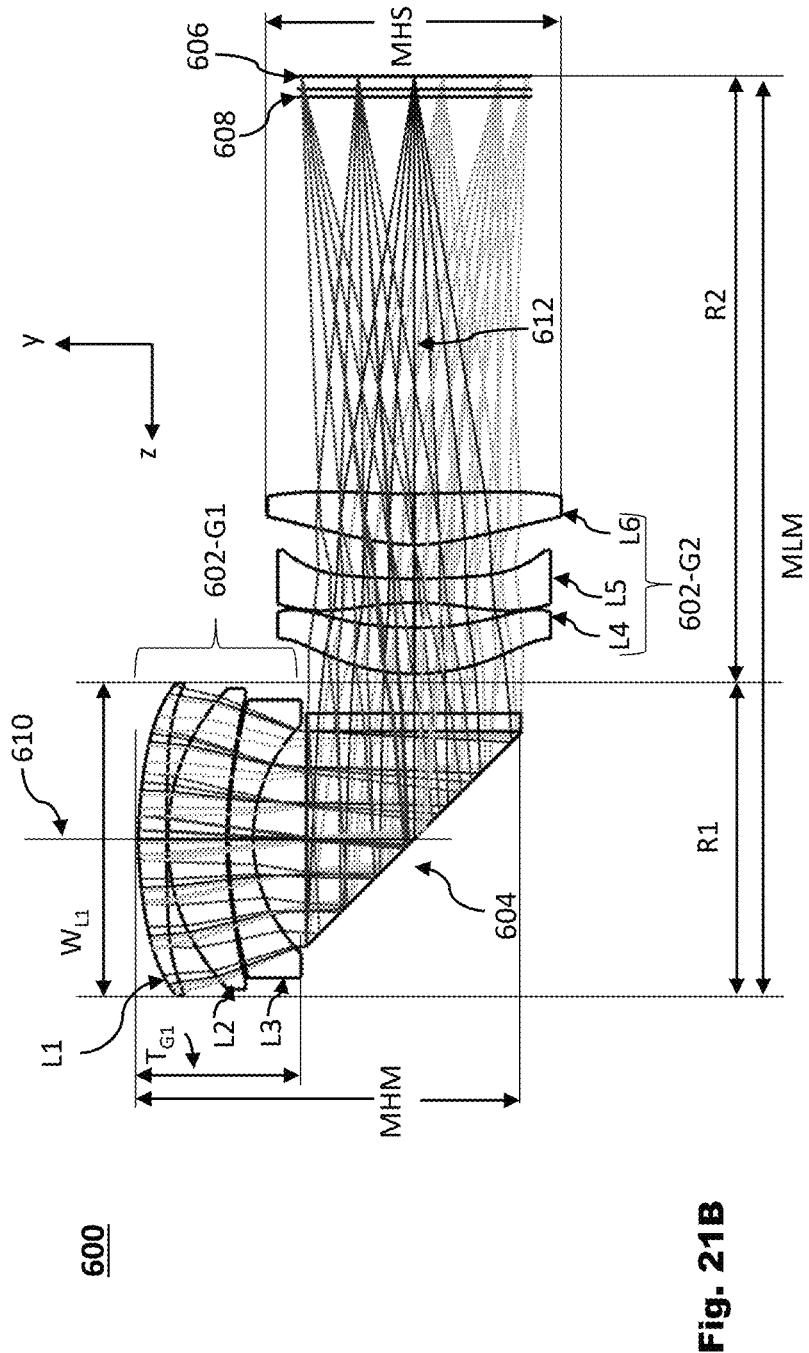

FIG. 21B schematically illustrates lens system 600 focused to 20 cm. For focusing optical lens system 600, 602-2 may be moved with respect to 602-G1, OPPE 604 and image sensor 606. Table 15 shows the movements which may be required for focusing to infinity and to 20 cm, respectively. For focusing optical lens system 600, 602-2 may be moved away from image sensor 606 and towards OPFE 604.

TABLE 15

| Object Distance [mm] | S$_{10}$ [mm] | S$_{16}$ [mm] |
|---|---|---|
| Infinity | 5.818 | 6.086 |
| 200 | 1.075 | 10.828 |

Figure 21C:
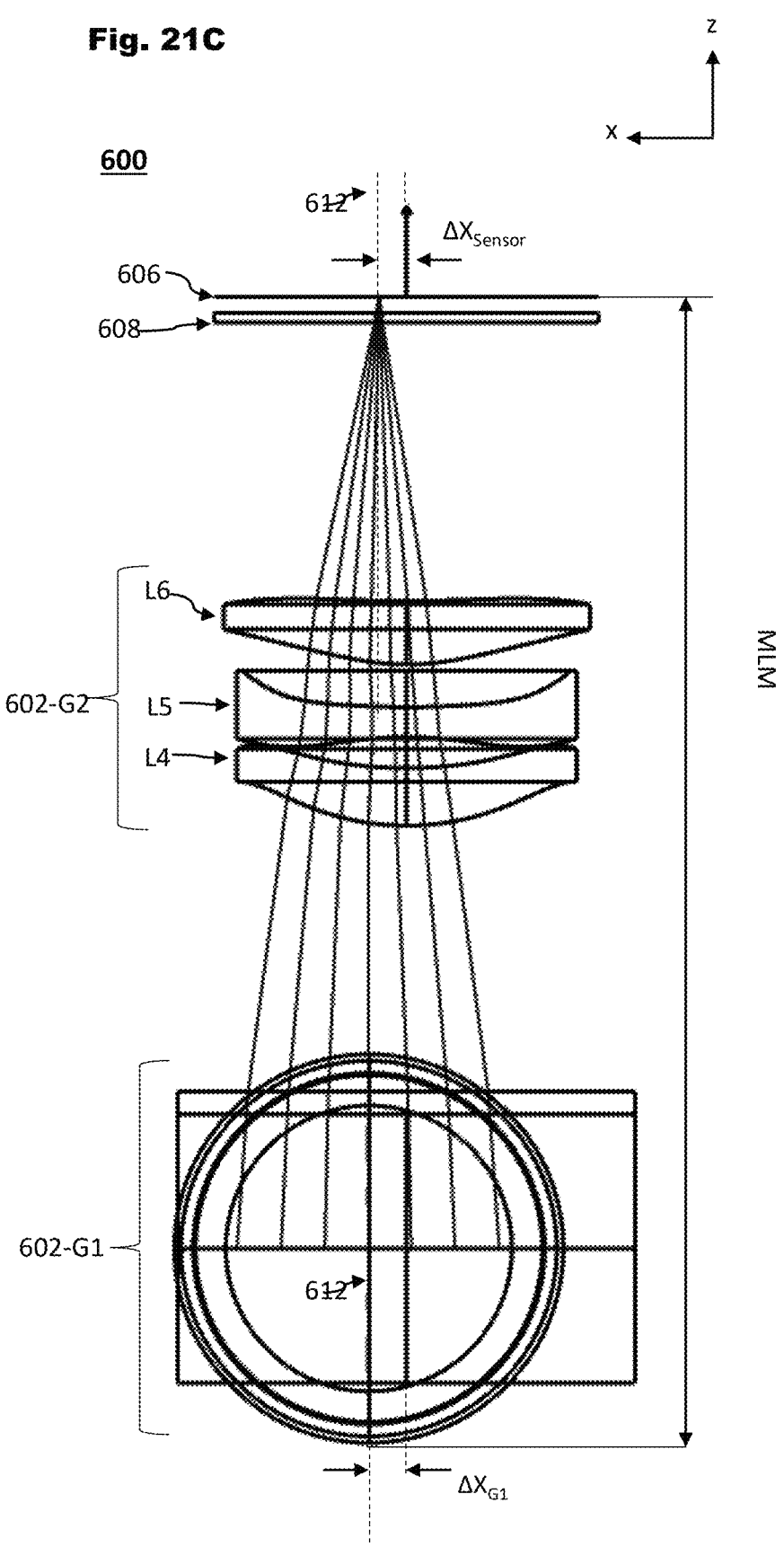
FIG. 21C shows the optical lens system of FIG. 21A when performing OIS in a second OIS direction.

FIG. 21C schematically illustrates optical lens system 600 when performing OIS in a second OIS direction according to method 1, as disclosed herein. Optical lens system 600 is shown focused to infinity. For OIS, 602-G1 is moved parallel to the x-axis, i.e. perpendicular to both OP1 610 and OP2 612. 602-G1 is moved by $\Delta X_{G1}$. Here, $\Delta X_{G1} \approx 0.8$ mm. The movement of 602-G1 shifts an image on image sensor 606 by $\Delta X_{Sensor}$. Here, $\Delta X_{Sensor} \approx 0.6$ mm, so that $\Delta X_{Sensor}/\Delta X_{G1} \approx 0.75$. For performing OIS in a first OIS direction, 602-G1 may be moved parallel to OP2 612 (i.e., along the z-axis shown). For performing OIS in a second OIS direction according to an alternative method, 602-G1 and 602-G2 may be moved together perpendicular to both OP1 610 and OP2 612.

Figure 22A:
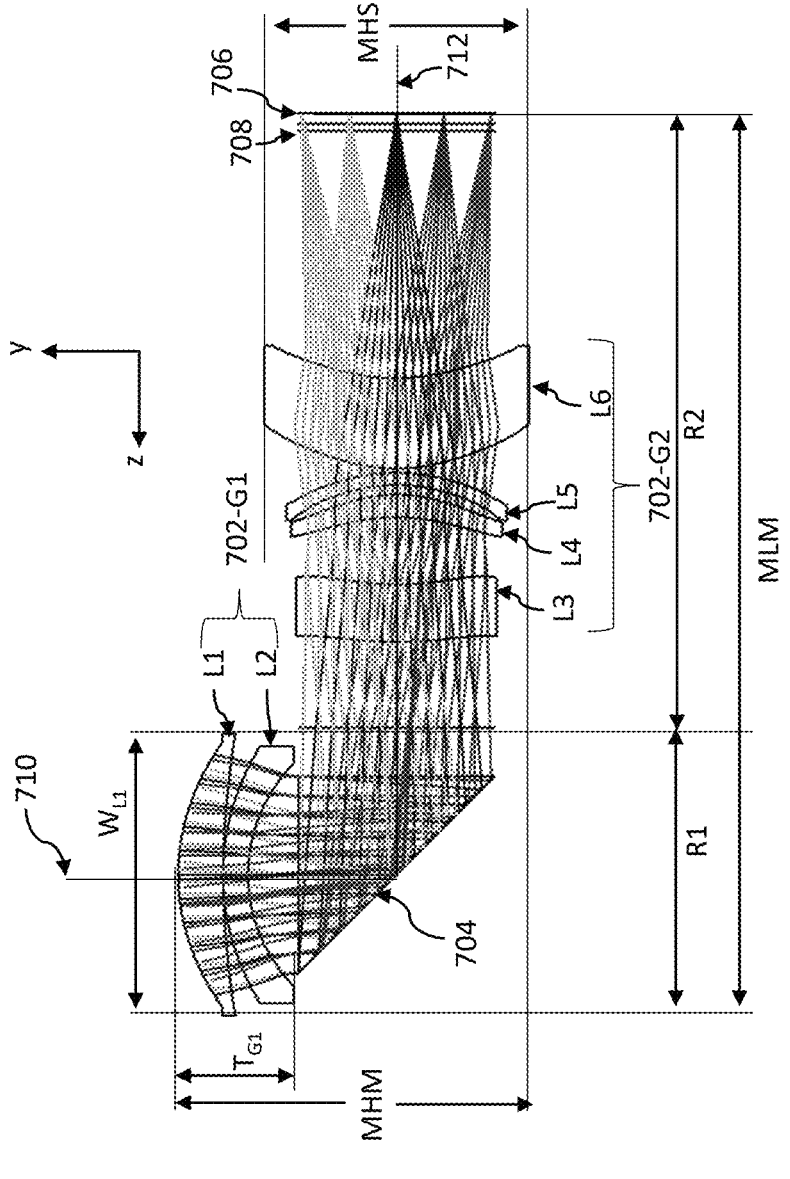
FIG. 22A-22B schematically illustrate an embodiment of yet another optical lens system disclosed herein, when focused to infinity, and when focused to 40 cm.

FIG. 22A schematically illustrates an embodiment of another optical lens system disclosed herein and numbered 700. In FIG. 22A, lens system 700 is shown focused to infinity. Lens system 700 may comprise a lens 702, may comprise a prism 704, may comprise an (optional) optical element 708 and may comprise an image sensor 706. Lens 702 may be divided in two lens groups, 702-G1 that may include $L_1$-$L_2$ ("G1"), and 702-G2 that may include $L_3$-$L_6$ ("G2"). Prism 704 may be oriented at an angle of 45 degrees with respect to the y-axis and the z-axis. Optical rays may pass through 702-G1, may be reflected by prism 704, may pass through 702-G2 and may form an image on image sensor 706. Surface types are listed in Table 16. The coefficients for the surfaces are listed in Table 17.

TABLE 16

| | Embodiment 700 EFL = 23.57mm, F number = 2.83, HFOV = 12.16°. | | | | | | | | |

| Surf. # | Comment | Type | Curvature Radius | Thickness | Aperture Radius (D/2) | Material | Index | Abbe # | Focal Length |
|---|---|---|---|---|---|---|---|---|---|
| 1 | Lens 1 | QT1 | 6.661 | 1.445 | 4.250 | Plastic | 1.535 | 55.686 | 17.23 |
| 2 | | | 22.028 | 0.005 | 4.534 | | | | |

TABLE 16-continued

Embodiment 700
EFL = 23.57mm, F number = 2.83, HFOV = 12.16°.

| Surf. # | Comment | Type | Curvature Radius | Thickness | Aperture Radius (D/2) | Material | Index | Abbe # | Focal Length |
|---|---|---|---|---|---|---|---|---|---|
| 3 | Lens 2 | QT1 | 8.306 | 0.803 | 4.130 | Plastic | 1.614 | 25.587 | −27.56 |
| 4 | | | 5.379 | 1.610 | 3.599 | | | | |
| 5 | Prism Entrance | Plano | Infinity | 3.168 | — | Glass | 1.513 | 63.648 | |
| 6 | Reflection Surface | Plano | Infinity | 4.740 | — | Glass | 1.513 | 63.648 | |
| 7 | Prism Exitance | Plano | Infinity | Table 18 | — | | | | |
| 8 | Lens 3 | QT1 | 12.420 | 1.843 | 3.019 | Plastic | 1.614 | 25.587 | −51.65 |
| 9 | | | 8.436 | 2.173 | 3.229 | | | | |
| 10 | Lens 4 | QT1 | −5.589 | 0.720 | 3.352 | Plastic | 1.544 | 55.933 | 49.24 |
| 11 | | | −4.838 | 0.315 | 3.403 | | | | |
| 12 | Lens 5 | QT1 | −4.797 | 0.396 | 3.401 | Plastic | 1.671 | 19.239 | −79.27 |
| 13 | | | −5.443 | 0.127 | 3.549 | | | | |
| 14 | Lens 6 | QT1 | 4.947 | 2.910 | 4.259 | Plastic | 1.535 | 55.686 | 27.24 |
| 15 | | | 5.942 | Table 18 | 3.965 | | | | |
| 16 | Filter | Plano | Infinity | 0.21 | — | Glass | 1.513 | 63.648 | |
| 17 | | | Infinity | 0.35 | — | | | | |
| 18 | Image | Plano | Infinity | — | — | | | | |

End of Table 16

TABLE 17

Aspheric Coefficients

| Surface # | Rnorm | A0 | A1 | A2 | A3 | A4 |
|---|---|---|---|---|---|---|
| 1 | 4.25E+00 | −1.12E−01 | 1.32E−03 | 8.71E−04 | 4.14E−04 | 2.11E−05 |
| 2 | 4.25E+00 | −7.63E−02 | 1.00E−02 | 1.07E−03 | −5.55E−04 | 6.29E−05 |
| 3 | 3.85E+00 | 9.00E−02 | −1.88E−02 | 2.97E−03 | −1.13E−03 | 3.02E−05 |
| 4 | 3.65E+00 | 1.14E−01 | −2.15E−02 | 1.34E−03 | −9.51E−04 | −1.21E−05 |
| 8 | 3.131 | −2.03E−01 | −1.26E−02 | −1.31E−03 | 1.12E−04 | 1.75E−05 |
| 9 | 3.130 | −3.34E−01 | −2.62E−02 | −9.41E−04 | 7.94E−04 | 3.44E−05 |
| 10 | 3.375 | 5.06E−01 | −1.53E−02 | 5.09E−03 | 2.05E−03 | 6.88E−04 |
| 11 | 3.372 | 4.55E−01 | 3.39E−02 | −6.01E−03 | −8.76E−05 | −1.89E−03 |
| 12 | 3.375 | 3.12E−01 | −7.06E−02 | 1.23E−02 | 1.62E−03 | 8.44E−05 |
| 13 | 3.372 | 2.39E−01 | −3.68E−02 | 1.21E−02 | 2.19E−03 | 1.02E−03 |
| 14 | 3.613 | −6.02E−01 | 4.74E−02 | −1.03E−02 | 2.11E−03 | −3.26E−04 |
| 15 | 3.828 | −4.78E−01 | 4.40E−02 | −1.48E−03 | 1.82E−03 | 2.40E−04 |

End of Table 17

The TTL of optical lens system 700 may be TTL=31.5 mm, wherein $TTL_1$=7.0 mm and $TTL_2$=24.5 mm. MHM=11.3 mm and MLM=29.1 mm. Both $EFL_{G1}$ and $EFL_{G2}$ may be positive. A sequence of a sign of a lens power of each lens elements $L_1$-$L_6$ may be positive-negative-negative-positive-negative-positive. MHS may be defined by the aperture diameter of $L_6$. Table 16 also provides a clear aperture radius of prism 704.

In other embodiments, 702-G2 may be cut as known in the art. 702-G2 may be cut by 28%. The cutting may be performed as described above. When cutting 702-G2 by 28%, MHS may be defined by $H_S$.

Figure 22B:
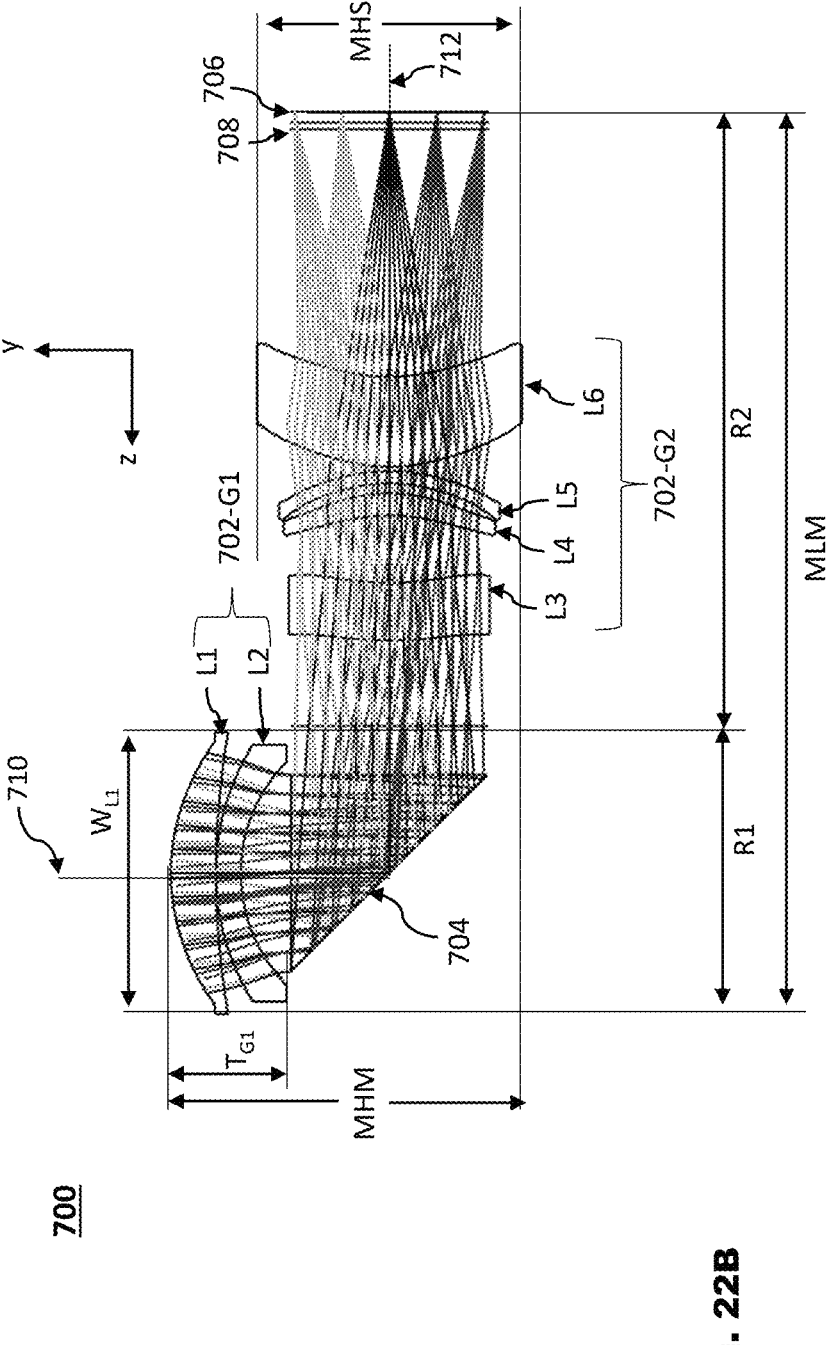

FIG. 22B schematically illustrates lens system 700 focused to 40 cm. For focusing optical lens system 700, 702-2 may be moved with respect to 702-G1, OPFE 704 and image sensor 706. Table 18 shows the movements which may be required for focusing to infinity and to 40 cm respectively. For focusing optical lens system 700, 702-2 may be moved away from image sensor 706 and towards OPFE 704.

TABLE 18

| Object Distance [mm] | $S_7$ [mm] | $S_{15}$ [mm] |
|---|---|---|
| Infinity | 2.763 | 7.972 |
| 400 | 0.483 | 10.252 |

Figure 22C:
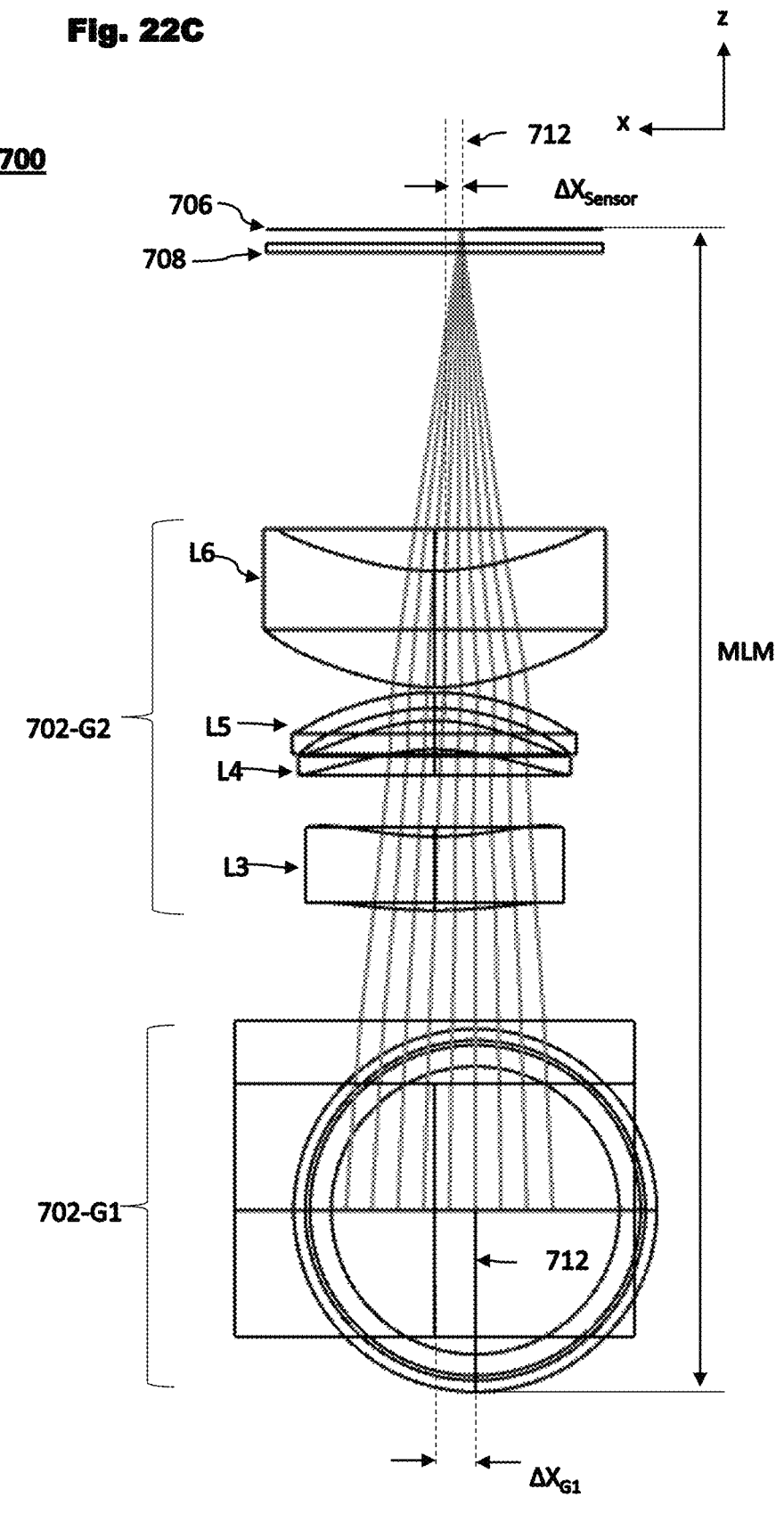
FIG. 22C illustrates the optical lens system of FIG. 22A when performing OIS in a second OIS direction.
Figure 23A:
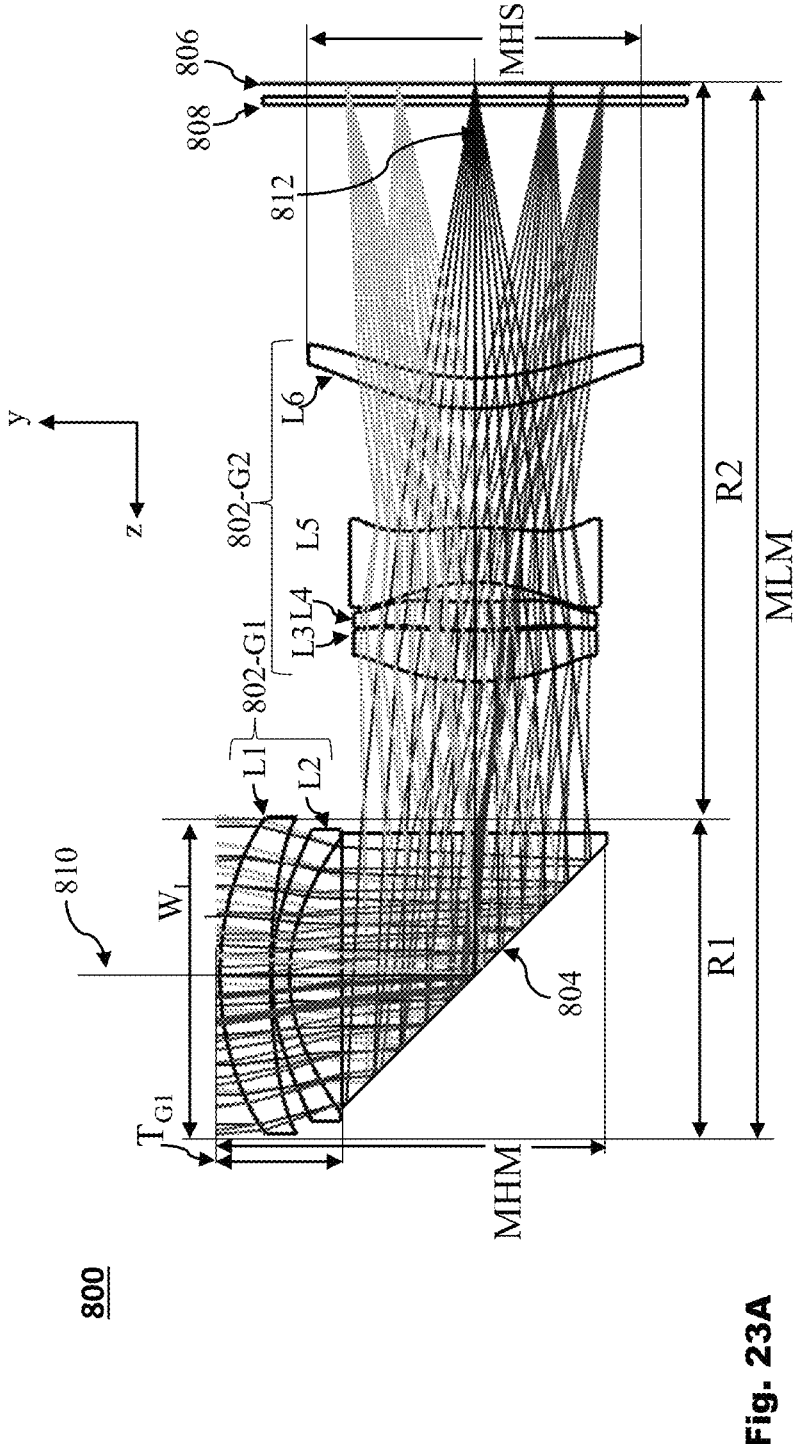
FIG. 23A-23B schematically illustrate an embodiment of yet another optical lens system disclosed herein, when focused to infinity, and when focused to 20 cm.

FIG. 22C schematically illustrates optical lens system 700 when performing OIS in a second OIS direction according to method 1, as disclosed herein. Optical lens system 700 is shown focused to infinity. For OIS, 702-G1 is moved parallel to the x-axis, i.e. perpendicular to both OP1 710 and OP2 712. 702-G1 is moved by $\Delta X_{G1}$. Here, $\Delta X_{G1} \approx 1.0$ mm. The movement of 702-G1 shifts an image on image sensor 706 by $\Delta X_{Sensor}$. Here, $\Delta X_{Sensor} \approx 0.7$ mm, so that $\Delta X_{Sensor}/\Delta X_{G1} \approx 0.7$. For performing OIS in a first OIS direction, 702-G1 may be moved parallel to OP2 712 (i.e., along the z-axis shown). For performing OIS in a second OIS direction according to an alternative method, 702-G1 and 702-G2 may be moved together perpendicular to both OP1 710 and OP2 712. FIG. 23A schematically illustrates an embodiment of another optical lens system disclosed herein and numbered 800. In FIG. 23A, lens system 800 is shown focused to infinity. Lens system 800 may comprise a lens 802, may comprise a prism 804, may comprise an (optional) optical element 808 and may comprise an image sensor 806. Lens 802 may be divided in two lens groups, 802-G1 that may include L$_1$-L$_2$ ("G1"), and 802-G2 that may include L$_3$-L$_6$ ("G2"). Prism 804 may be oriented at an angle of 45 degrees with respect to the y-axis and the z-axis. Optical rays may pass through 802-G1, my be reflected by prism 804, may pass through 802-G2 and may form an image on image sensor 806. Surface types are listed in Table 19. The coefficients for the surfaces are listed in Table 20.

In other embodiments, 802-G2 may be cut as known in the art. 802-G2 may be cut by 23%. The cutting may be performed as described above. When cutting 802-G2 by 28%, MHS may be defined by H$_S$.

Figure 23B:
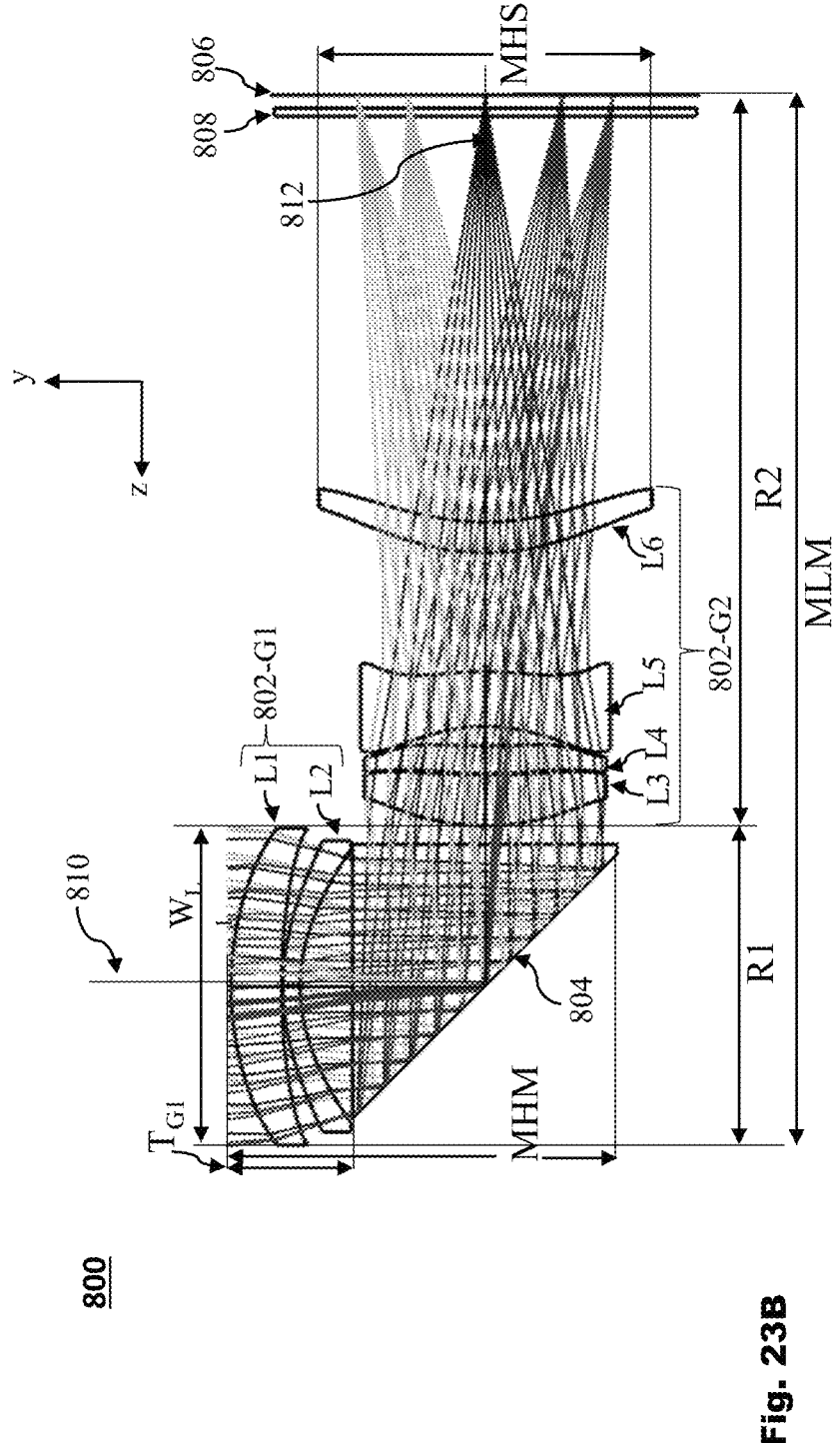

FIG. 23B schematically illustrates lens system 800 focused to 20 cm. For focusing optical lens system 800, 802-2 may be moved with respect to 802-G1, OPFE 804 and image sensor 806. Table 21 lists the movements which may be required for focusing to infinity and to 20 cm respectively. For focusing optical lens system 800, 802-2 may be moved away from image sensor 806 and towards OPFE 804.

TABLE 19

Embodiment 800
EFL = 22.68mm, F number = 2.69, HFOV = 13.92°.

| Surf. # | Comment | Type | Curvature Radius | Thickness | Aperture Radius (D/2) | Material | Index | Abbe # | Focal Length |
|---|---|---|---|---|---|---|---|---|---|
| 1 | Lens 1 | QT1 | 8.272 | 1.355 | 4.250 | Glass | 1.774 | 49.590 | 18.94 |
| 2 | | | 17.541 | 0.040 | 4.250 | | | | |
| 3 | Lens 2 | QT1 | 6.791 | 0.467 | 3.910 | Plastic | 1.636 | 23.972 | −29.97 |
| 4 | | | 4.882 | 1.398 | 3.670 | | | | |
| 5 | Prism Entrance | Plano | Infinity | 3.558 | — | Glass | 1.847 | 23.778 | |
| 6 | Reflection Surface | Plano | Infinity | 3.808 | — | Glass | 1.847 | 23.778 | |
| 7 | Prism Exitance | Plano | Infinity | Table 21 | — | | | | |
| 8 | Lens 3 | QT1 | 6.464 | 1.361 | 3.200 | Plastic | 1.545 | 55.987 | 16.10 |
| 9 | | | 22.566 | 0.035 | 3.250 | | | | |
| 10 | Lens 4 | QT1 | 10.688 | 0.744 | 3.250 | Plastic | 1.681 | 18.154 | 47.05 |
| 11 | | | 15.506 | 0.534 | 3.250 | | | | |
| 12 | Lens 5 | QT1 | −3.947 | 1.463 | 3.350 | Plastic | 1.636 | 23.972 | −13.80 |
| 13 | | | −8.166 | 3.185 | 3.128 | | | | |
| 14 | Lens 6 | QT1 | 6.079 | 0.821 | 4.424 | Plastic | 1.513 | 63.648 | 75.87 |
| 15 | | | 6.783 | Table 21 | 4.465 | | | | |
| 16 | Filter | Plano | Infinity | 0.21 | — | Glass | 1.513 | 63.648 | |
| 17 | | | Infinity | 0.35 | — | | | | |
| 18 | Image | Plano | Infinity | — | — | | | | |

End of Table 19

TABLE 20

Aspheric Coefficients

| Surf. # | Rnorm | A0 | A1 | A2 | A3 | A4 | A5 | A6 | A7 |
|---|---|---|---|---|---|---|---|---|---|
| 1 | 4.25E+00 | 2.72E−02 | 3.05E−02 | 2.69E−03 | 1.27E−03 | 1.07E−04 | 3.90E−04 | 1.04E−04 | 1.48E−05 |
| 2 | 4.25E+00 | 1.27E−01 | 3.11E−02 | 1.10E−02 | 4.19E−03 | 4.45E−03 | 1.37E−03 | 2.04E−04 | −5.93E−06 |
| 3 | 4.10E+00 | −1.91E−01 | −4.74E−02 | 1.45E−02 | −2.27E−03 | 5.31E−03 | −4.89E−04 | −4.20E−04 | −3.67E−04 |
| 4 | 3.79E+00 | −3.19E−01 | −4.94E−02 | 6.20E−03 | −2.46E−03 | 2.16E−03 | −3.94E−04 | −1.22E−04 | −2.21E−04 |
| 8 | 3.43E+00 | −1.65E−01 | −8.65E−02 | −1.51E−02 | 9.50E−04 | 1.68E−03 | 2.99E−04 | 4.19E−05 | −1.28E−04 |
| 9 | 3.45E+00 | −2.66E−01 | −3.91E−02 | 9.53E−03 | 3.43E−03 | −2.70E−03 | 2.78E−03 | −9.60E−04 | −4.83E−05 |
| 10 | 3.39E+00 | −5.69E−01 | 6.01E−02 | 2.40E−02 | 9.35E−04 | −2.20E−03 | 2.87E−03 | −1.30E−03 | 1.33E−04 |
| 11 | 3.35E+00 | −8.13E−01 | 1.39E−01 | 4.49E−02 | −8.20E−03 | −1.36E−03 | 1.84E−03 | −1.26E−03 | 2.26E−04 |
| 12 | 3.24E+00 | 9.48E−01 | 3.92E−02 | 4.28E−02 | −3.74E−03 | −1.69E−03 | 6.35E−04 | −5.57E−04 | 1.64E−04 |
| 13 | 3.00E+00 | 7.43E−01 | −1.72E−02 | −2.24E−03 | 1.69E−04 | 3.76E−04 | 3.93E−05 | −1.16E−04 | 2.49E−05 |
| 14 | 4.24E+00 | −5.69E−01 | −2.41E−02 | 9.20E−04 | −1.92E−03 | 4.55E−04 | −1.55E−04 | −2.42E−05 | 5.29E−05 |
| 15 | 4.36E+00 | −6.92E−01 | −1.14E−02 | −1.55E−03 | −1.53E−03 | 4.08E−04 | −1.48E−04 | 7.09E−06 | 9.14E−05 |

End of Table 20

The TTL of optical lens system 800 may be TTL=30.7 mm, wherein TTL$_1$=6.8 mm and TTL$_2$=23.9 mm. MHM=10.4 mm and MLM=28.2 mm. Both EFL$_{G1}$ and EFL$_{G2}$ may be positive. A sequence of a sign of a lens power of each lens elements L$_1$-L$_6$ may be positive-negative-positive-positive-negative-positive. MHS may be defined by the aperture diameter of L$_6$. Table 19 also provides a clear aperture radius of prism 804.

TABLE 21

| Object Distance [mm] | S$_7$ [mm] | S$_{15}$ [mm] |
|---|---|---|
| Infinity | 4.063 | 7.327 |
| 200 | 0.500 | 10.890 |

Figure 23C:
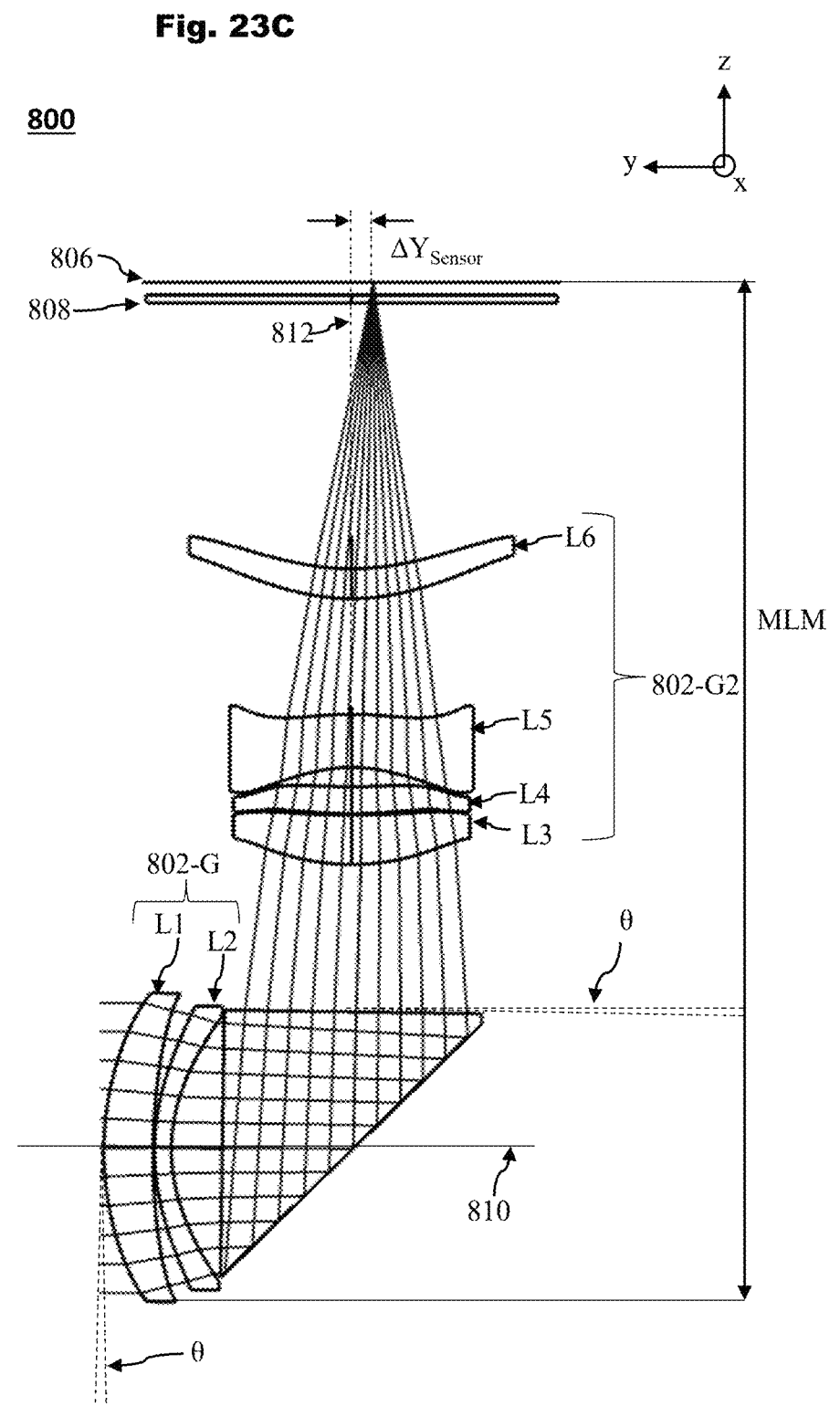

FIG. 23C schematically illustrates optical lens system 800 when performing OIS in a first OIS direction (OIS1) according to method 4 as disclosed herein. Optical lens system 800 is shown focused to infinity. For OIS, 802-G1 and OPFE 804 may be rotated together as one unit and around an axis parallel to the x-axis, i.e., perpendicular to OP1 and OP2. 802-G1 and OPFE 804 may be rotated by an angle θ. Here, θ≈0.8 degree. The movement of 802-G1 may shift an image on image sensor 806 by $\Delta Y_{Sensor}$. Here, $\Delta Y_{Sensor}$≈0.6 mm, so that $\Delta Y_{Sensor}$/θ≈0.75 mm/degree. For performing OIS in a second OIS direction, 802-G1 and OPFE 804 may be rotated together as one unit around a rotation axis parallel to OP2, i.e., around a rotation axis parallel to the z-axis.

Figure 24A:
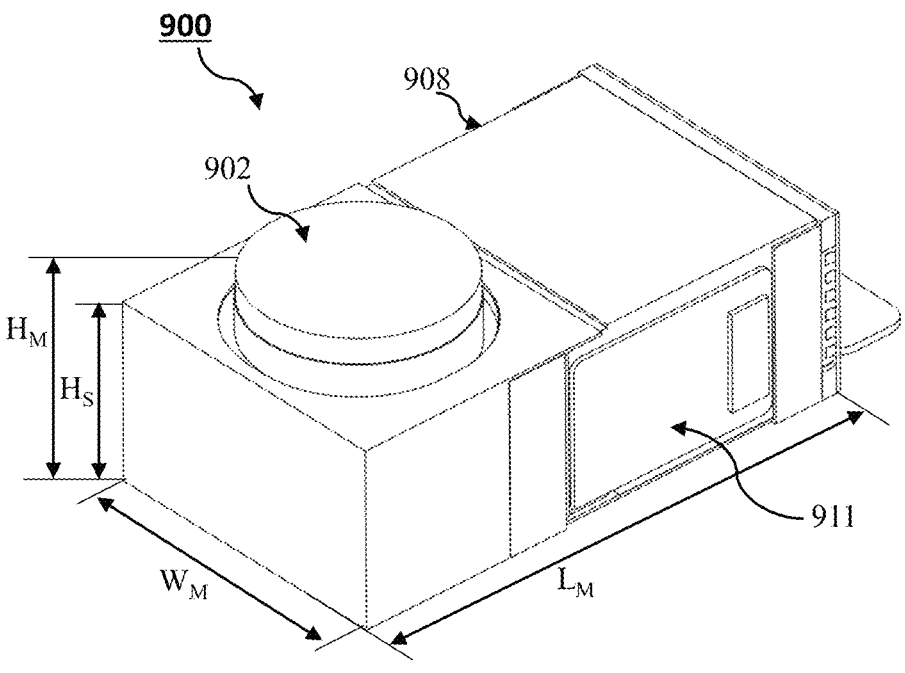
Figure 24B:
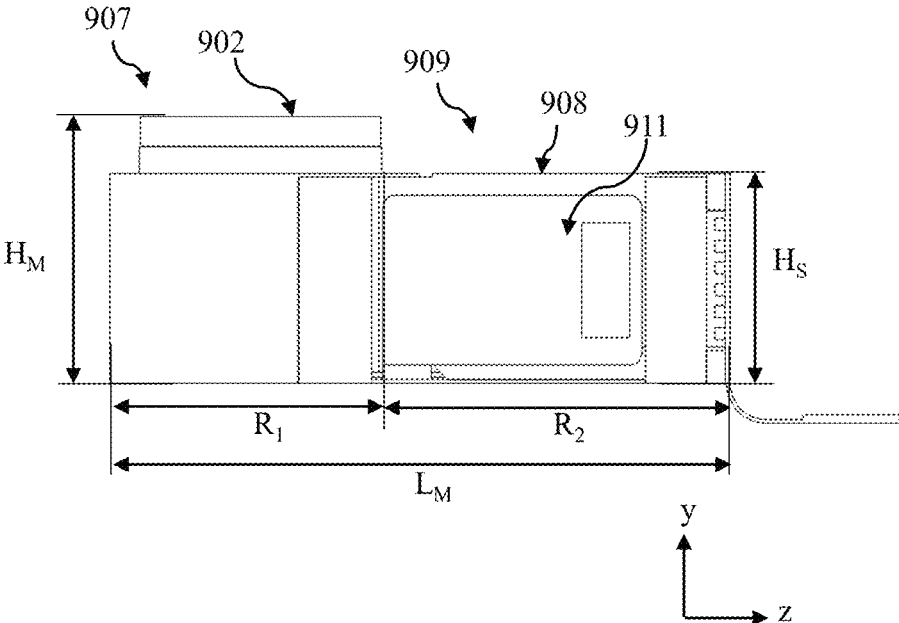

FIG. 24A illustrates an embodiment of a folded Tele camera module disclosed herein and numbered 900 in a perspective view. FIG. 24B illustrates a folded Tele camera module (or short "FTCM") 900 in a side view. FTCM 900 may be operational to perform Lens-OIS according to OIS method 1 (Table 1) and focusing as disclosed herein. In other words, FTCM 900 may be operational to perform OIS by linearly moving G1 along a first axis and a second axis. FTCM 900 may be operational to perform focusing by linearly moving G2 along the second axis. FTCM 900 may include optical lens systems disclosed herein. FTCM 900 may have an aperture 902, may includes an OPFE 903, may include a lens 904, may include an image sensor 906, and may be surrounded by a camera module chassis 908 (or simply "chassis") and a housing 911. Chassis 908 may be fixedly coupled to image sensor 906. Lens 904 may be divided into a first lens group ("G1") and a second lens group ("G2"). G1 may have an optical axis parallel to y-axis and may be closer to an object side than G2. G2 may have an optical axis parallel to z-axis and may be closer to an image side than G1. Each lens group may be included in a respective lens barrel 905-G1 and 905-G2. G1 may be operational to move with respect to image sensor 906 for performing OIS. FTCM 900 may have a FTCM width $W_M$ that may be measured along an axis perpendicular to both OP1 and OP2. FTCM 900 may have a FTCM length $L_M$ that may be measured along an axis parallel to OP2. FTCM 900 may have two different FTCM heights. In a first FTCM region 907 that may be of length "R1", FTCM 900 may have a FTCM module height HM. In a second FTCM region 909 that may be of length "R2", FTCM 900 may have a FTCM shoulder height $H_S$, wherein $H_S$<$H_M$. As shown, $L_M$=R1+ R2. Table 19 shows values ranges that may be realized in FTCM 900.

TABLE 22

| | Range | Preferred range |
|---|---|---|
| $L_M$ | 10-50 | 15-35 |
| $H_M$ | 4-20 | 5-15 |
| $H_S$ | 3-18 | 4-12.5 |
| $W_M$ | 2.5-20 | 5-15 |
| R1 | 3-25 | 3-20 |

End of Table 22

Figure 24C:
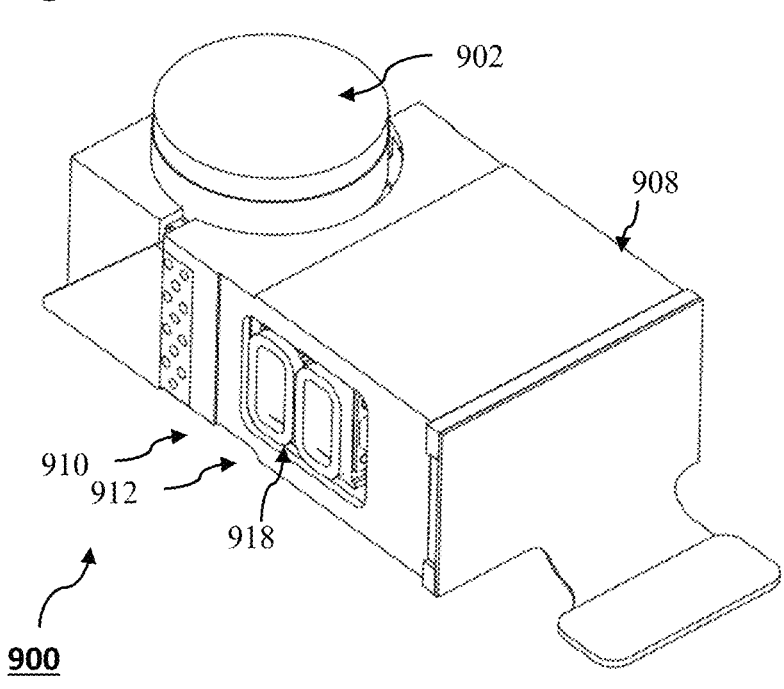
Figure 24D:
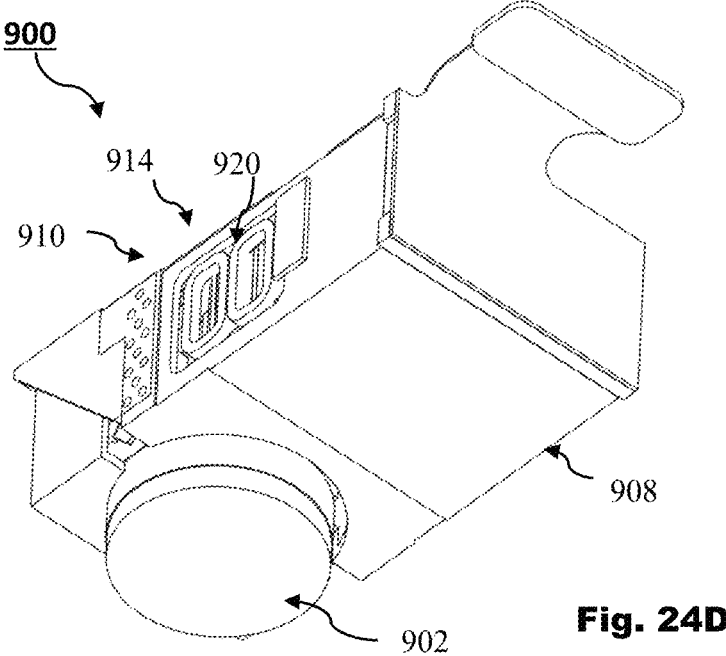
Figure 24G:
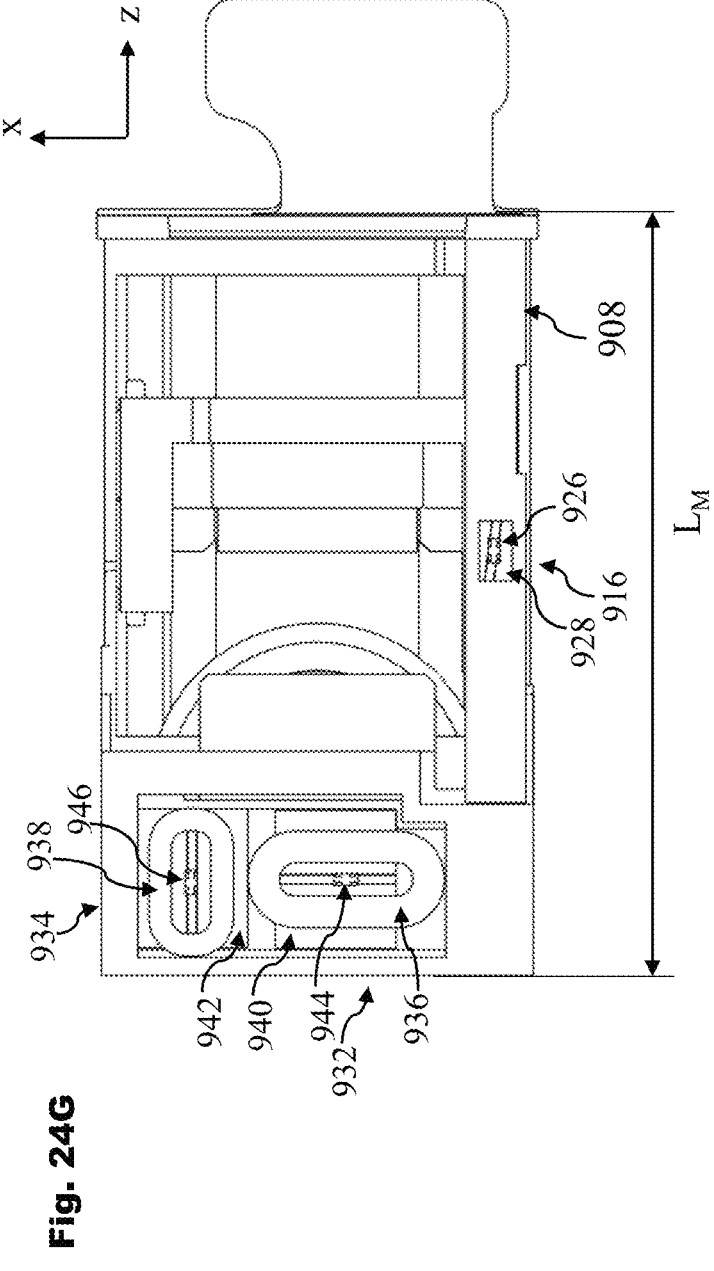
FIG. 24G illustrates parts of the camera module of FIG. 24C in a bottom view.

FIG. 24C illustrates FTCM 900 without housing 911 in a first perspective top view. FIG. 24D illustrates FTCM 900 without housing 911 in a second perspective top view. FIG. 24D illustrates FTCM 900 without housing 911 in a third perspective top view. FIG. 24E illustrates FTCM 900 without housing 911 in a first perspective bottom view. FIG. 24F illustrates FTCM 900 without housing 911 in a second perspective bottom view. FIG. 24G illustrates FTCM 900 without housing 911 in a bottom view. FTCM 900 may include a focusing actuator 910 operational to actuate a focusing movement. Focusing actuator 910 may comprise a first focusing actuation unit 912 which may be located on a first side of FTCM 900. Focusing actuator 910 may comprise a second focusing actuation unit 914 which may be located on a second side of FTCM 900 and may be opposite to the first side. Focusing actuator 910 may comprise a focusing position sensing unit 916. The first focusing actuation unit 912 may be located on a first side of G2, and second focusing actuation unit 914 may be located on a second side of G2. First and second focusing actuation unit 912 and 914, respectively, may include a first coil pair 918 and may include a second coil pair 920. First and second focusing actuation unit 912 and 914, respectively, may include a first actuation magnet 922 (FIGS. 24H-K) and a second actuation magnet (not shown). Focusing actuation unit 912 and 914 may have a similar size and may include similar components. Focusing position sensing unit 916 may include a magnetic flux sensor 926 (e.g., a Hall sensor) and may include a slanted magnet 928 (FIGS. 24G, 24I, 24K). Using a "slanted" magnet such as slanted magnet 928 may be beneficial for achieving a position sensing over a relatively large sensing distance (or stroke), as described in the co-owned US provisional patent application (CP-0952C)-63, 491,554.

FTCM 900 may include a lens-shift OIS actuator 930 that may be operational to actuate a linear OIS movement of G1 along two directions. OIS actuator 930 may include a first (or "z-") OIS actuator 932 for moving G1 along a first OIS direction parallel to OP2 (z-axis), and may include a second (or "x-") OIS actuator 934 for moving G1 along a second OIS direction perpendicular to both OP1 and OP2 (parallel to x-axis). Z-OIS actuator 932 and x-OIS actuator 934 may include, respectively, a z-actuation coil 936 and a x-actuation coil 938, may include a z-actuation magnet 940 and a x-actuation magnet 942, and may include a z-actuation magnetic flux sensor 944 and a x-actuation magnetic flux sensor 946.

Figure 24H:
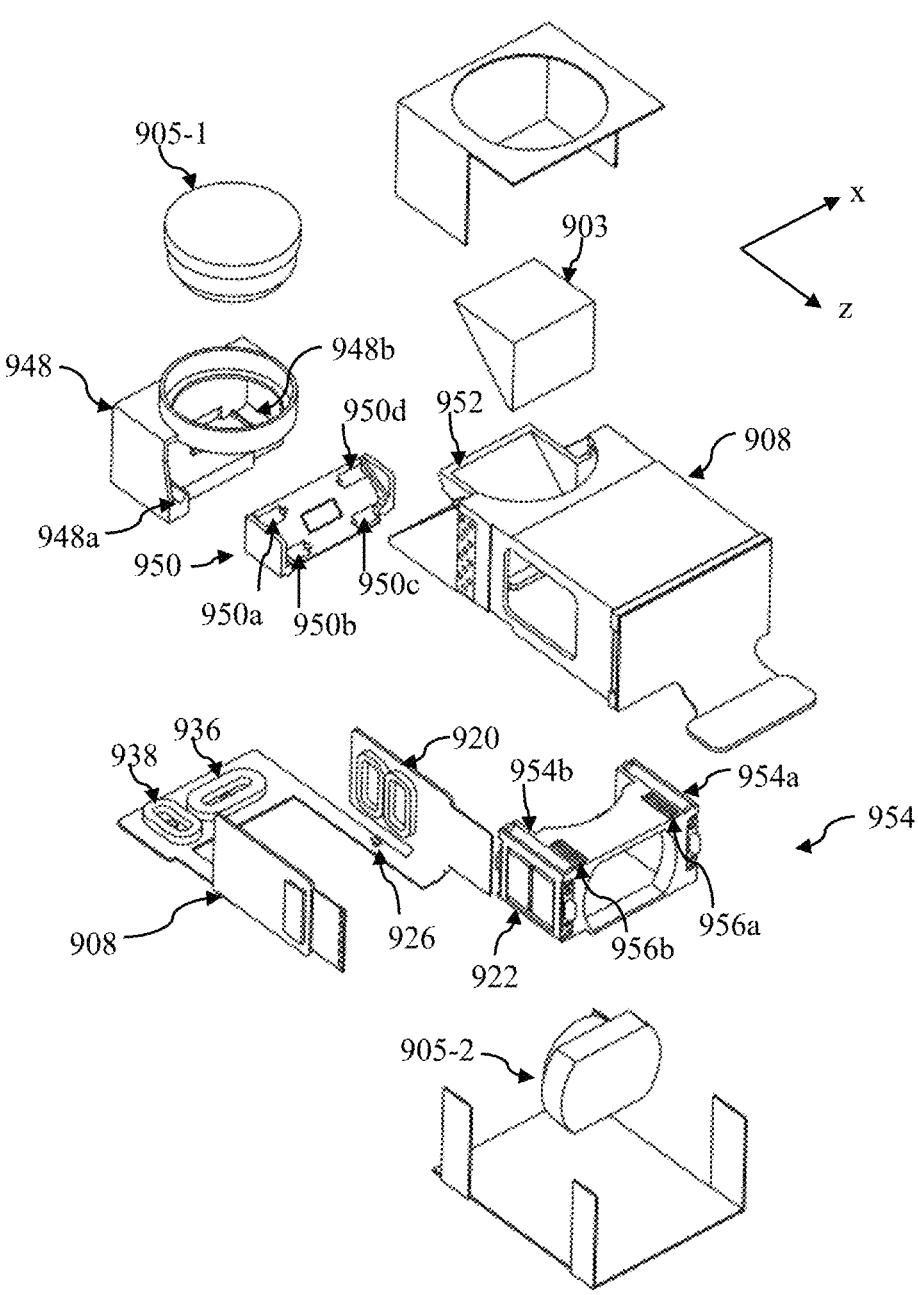
FIG. 24H-24I illustrate s parts of the camera module of FIG. 24C in different exploded views.
Figure 24I:
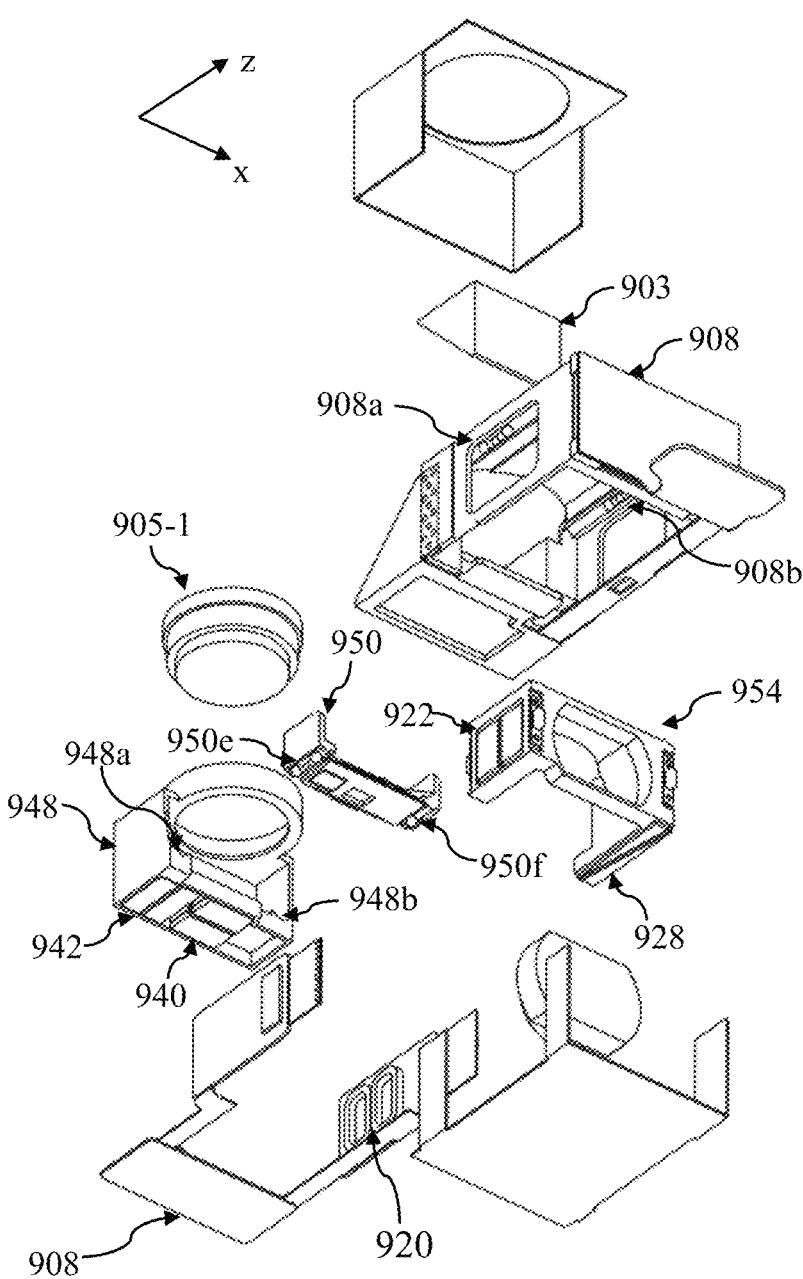
Figures 24J, 24K:
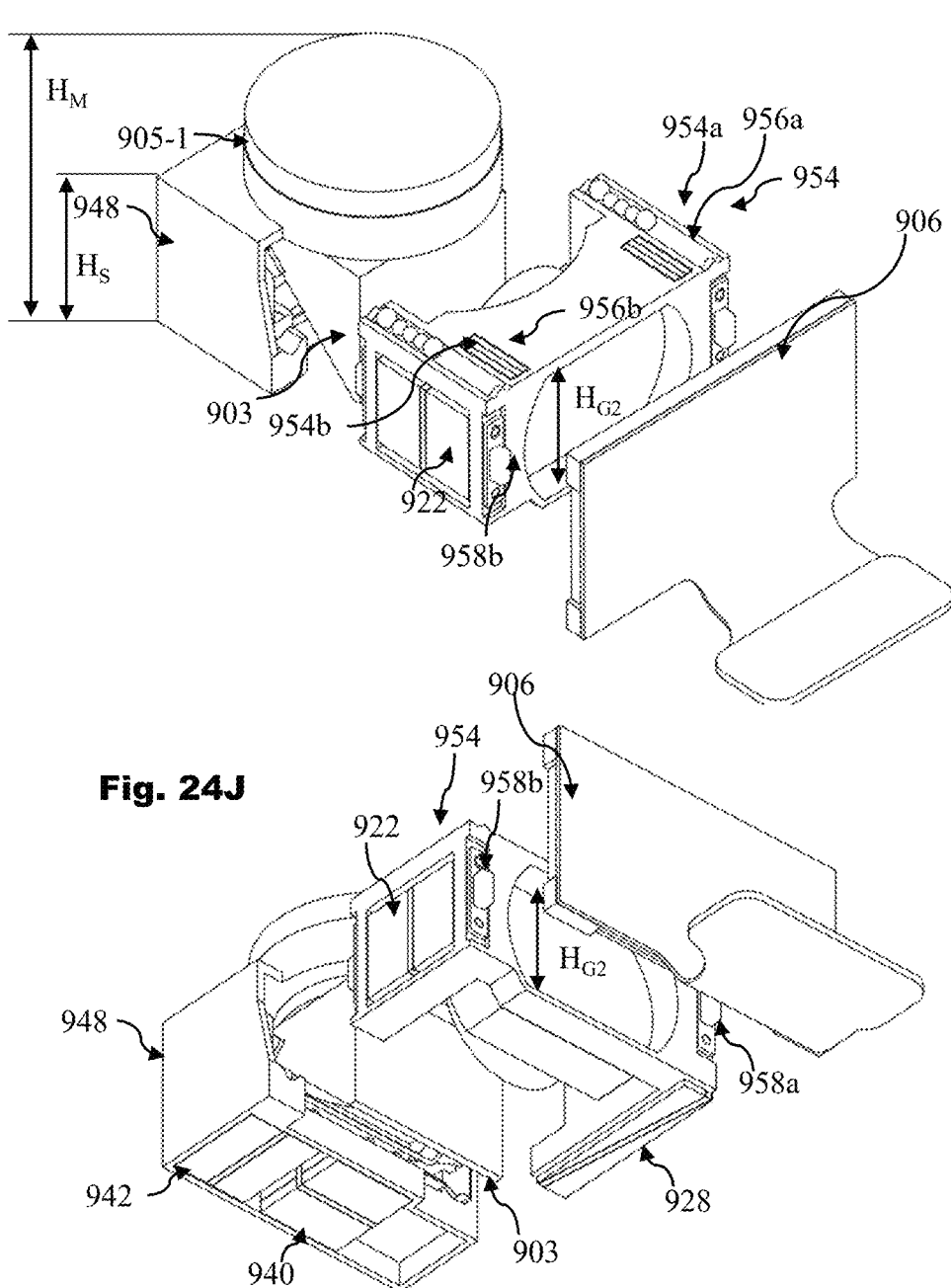
FIG. 24J-24K illustrate other parts of the camera module of FIG. 24A in different perspective views.

FIG. 24H illustrates FTCM 900 in a first exploded view. FIG. 24I illustrates FTCM 900 in a second exploded view. FIG. 24J illustrates parts of FTCM 900 in a perspective top view. FIG. 24K illustrates the parts of FTCM 900 in a perspective bottom view. In FIGS. 24J-K, a lens height of lens group G2 is indicated by $H_{G2}$.

FTCM 900 may include a G1 carrier 948 and may include an OIS base 950, wherein G1 carrier 948 may be fixedly coupled to G1 and may be operational to move relative to OIS base 950. OIS base 950 may be moveable along the x-axis with respect to image sensor 906 and chassis 908. For transmitting a movement for lens-shift OIS in x-direction, OIS base 950 may include four grooves 950a 950b 950c 950d that may engage with two longer grooves (not shown) or with four shorter grooves (not shown) on an OPFE side 952 of chassis 908. For transmitting a movement for lens-shift OIS in z-direction, G1 carrier 948 may include two grooves 948a 948b which may engage with two grooves 950e 950f that may be included in OIS base 950. FTCM 900 may include a G2 carrier 954 which may carry (i.e., may be fixedly coupled to) G2 and may be operational to move relative to chassis 908. For transmitting a movement for focusing, G2 carrier 954 may include two grooves 954a 954b, and chassis 908 may include two grooves 908a 908b that may engage with grooves 954a 954b. G2 carrier 954 may include a first focusing preload magnet 956a and a second focusing preload magnet 956a. The first focusing preload magnet 956a and the second focusing preload magnet 956a may interact with at least one focusing preload yoke (not shown) which may be fixedly coupled to chassis 208. Interaction between the preload magnets and the at least one preload yoke may attach G2 carrier 954 to chassis 208, i.e., it may prevent G2 carrier 954 from falling out from chassis 208. G2 carrier 954 may include a first stopper 958*a* and a second stopper 958*b*, which may be operational to limit (or to define) a movement stroke (or distance) along the z-axis and towards image sensor 906.

In the following, actuation elements that may be included in FTCM 900, and actuations that may be performed by FTCM 900, are provided in a list form.

Focusing Actuation by Focusing Actuator 910

First focusing actuation unit 912 may include a first coil pair 918 and a first actuation magnet 922

Second focusing actuation unit 914 may include a second coil pair 920 and a second actuation magnet.

Focusing position sensing unit 916 may include magnetic flux sensor 926 and a slanted magnet 928.

Two grooves 954*a* 954*b* may be in G2 carrier 954, two grooves 908*a* 908*b* may be in chassis 908.

Two bearing balls may be in groove 948*a*, two bearing balls may be in groove 948*b*. Two additional support/spacer balls may be included in each of the 2 grooves. The four bearing balls may be confined in two volumes formed by the four grooves 908*a* 908*b* 948*a* 948*b*.

A movement of G2 for focusing lens 904 may be along a stroke (or distance) of about. 0.5 mm-5 mm.

OIS Actuation by x-Actuator 934 x-actuation coil 938 x-actuation magnet 942 x-actuation magnetic flux sensor 946

Four ball bearings may be formed. The ball bearings may be formed by four grooves 950*a*-950*d* in OIS base 950, that may interact with two grooves (or four grooves) on OPFE side 952 of chassis 908. Four bearing balls may be included. The four bearing balls may be confined in four volumes formed by the six or eight grooves.

A movement of G1 for OIS movement along the x-direction may be along a stroke of about 0.5 mm-2.5 mm, typically around 1 mm.

OIS Actuation by z-Actuator 932 z-actuation coil 936 z-actuation magnet 940 z-actuation magnetic flux sensor 944.

Two ball bearings may be formed. The ball bearings may be formed by two grooves 948*a* 948*b* that may be included in a G1 carrier 948, and two grooves 950*e* 950*f* in OIS base 950. Three bearing balls (2 in groove 950*e*, 1 in groove 950*f*) and 2 support/spacer balls may be included in the ball bearings. Two of the bearing balls may be confined in a first of two volumes formed by the four grooves, and one of the bearing balls may be confined in a second of two volumes formed by the four grooves.

A movement of G1 for OIS movement along the z-direction may be along a stroke of about 0.5 mm-2.5 mm, typically around 1 mm.

OIS Actuation Hierarchies

Chassis 208 at rest with respect to image sensor 906.

OIS base 950 may be moveable with respect to chassis 208 (or in other words, OIS base 950 may "ride on" chassis 208) along the x-direction for OIS along a first OIS direction. In a first step for performing OIS along two directions, a position of G1 along the x-axis and with respect to image sensor 206 may be defined.

G1 carrier 948 may ride on OIS base 950 along the z-direction for OIS along a second OIS direction. In a second step for performing OIS along two directions, a position of G1 along the z-axis and with respect to image sensor 206 may be defined.

Figure 25A:
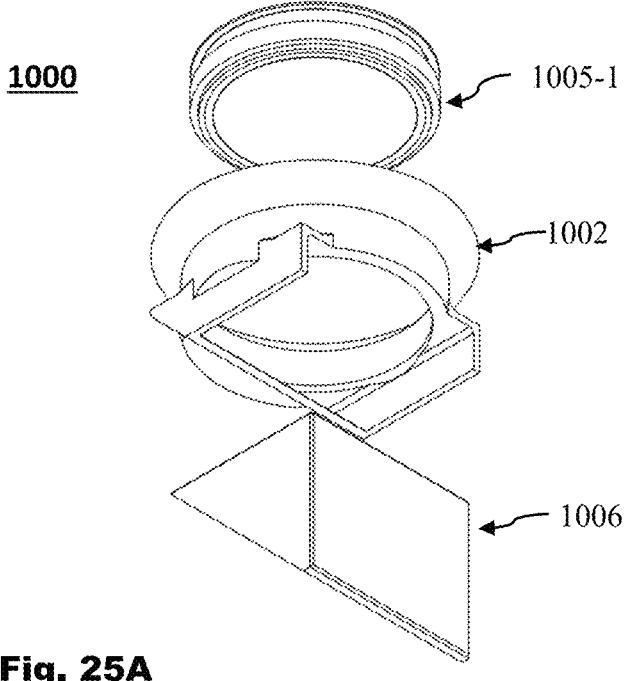
FIG. 25A shows parts of another camera module disclosed herein for performing OIS as disclosed herein in an exploded view.
Figure 25B:
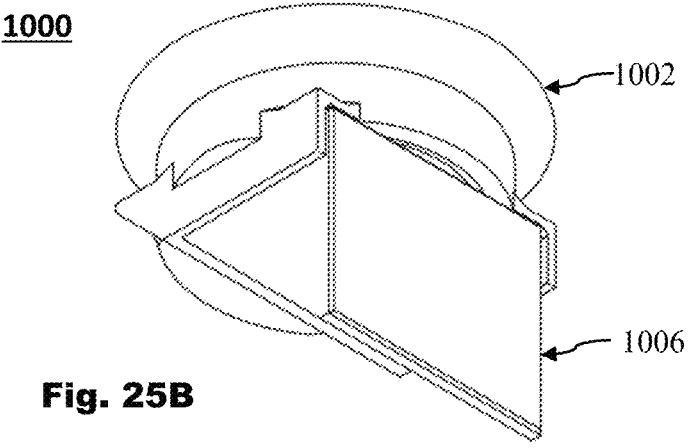
FIG. 25B shows parts of another camera module of FIG. 25A in a perspective view.

FIG. 25A illustrates an embodiment of parts of a folded Tele camera module ("FTCM") disclosed herein and numbered 1000 in an exploded view. FIG. 25B illustrates the parts of FTCM 1000 of FIG. 25A in a perspective view. FTCM 1000 may be operational to OIS methods disclosed herein that may require a collective movement of a first lens group G1 and of an OPFE such as for example OIS method 3 and OIS method 4 (Table 1). FTCM 1000 may include an OIS frame 1002, abd may include a G1 barrel 1005-1 including a first lens group G1 and an OPFE 1006. Both G1 barrel 1005-1 and OPFE 1006 may be fixedly coupled to OIS frame 1002. This may mean that when actuating OIS frame 1002 is actuated, G1 and OPFE 1006 may move according to actuating OIS frame 1002 and as one unit. FTCM 1000 may be used in a FTCM such as FTCM 1000.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A folded-camera module for a mobile device comprising: a lens having an effective focal length (EFL) in the range of 8 mm<EFL<50 mm and having a f/# lesser than 3.5, the lens comprising a first lens group (G1) defining a first optical axis (OA1), a second lens group (G2) defining a second optical axis (OA2), and an optical path folding element (OPFE) configured to fold said first optical axis to second optical axis, wherein said first lens group is positioned at an object side of the OPFE, and the second lens group is positioned at an image side of the OPFE, wherein the folded-camera module further comprises an image sensor positioned at the image side of the second lens group and is configured for: obtaining data indicative of a rotational movement of the folded camera module, and spatially adjusting the first lens group for compensating an optical path shift of light entering into the folded camera module due to said movement by:

a) linearly moving said first lens group along a first axis parallel to the second optical axis, so as to provide optical image stabilization (OIS) in a first OIS direction, and b) linearly moving said first lens group along a second axis perpendicular to the first optical axis and perpendicular to the second optical axis, so as to provide OIS in a second OIS direction.

2. The folded-camera module according to claim 1, configured for performing auto focus (AF) by moving said second lens group along an axis parallel to said second optical axis.

3. The folded-camera module according to claim 1, comprising 6 lens elements or 7 lens elements.

4. The folded-camera module according to claim 1, wherein the f/# is less than 3.25.

5. The folded-camera module according to claim 1, wherein a movement of said first lens group ($\Delta_{G1}$) is greater than a shift of an image formed at the image sensor ($\Delta_{Sensor}$) along the first OIS direction.

6. The folded-camera module according to claim 1, wherein a movement of said first lens group ($\Delta_{G1}$) is greater than a shift of an image formed at the image sensor ($\Delta_{Sensor}$) along the second OIS direction.

7. The folded-camera module according to claim 1, wherein said first lens group includes 2 or 3 lens elements and the second lens group includes 3 or 4 elements.

8. The folded-camera module according to claim 1, wherein a folding angle is smaller than 90°.

9. The folded-camera module according to claim 8 wherein said optical path folding element is an obtuse-triangular prism.

10. The folded-camera module according to claim 9 wherein said prism comprises a top surface and two side surfaces, and wherein:

(a) an angle α formed between the top surface and a first of the two side surfaces being greater than 90°;

(b) an angle β formed between the two side surfaces being greater than 45°;

(c) an angle γ formed between the top surface and a second of the two side surfaces being smaller than 45°.

11. The folded-camera module according to claim 10, wherein α is in the range of 90°-100°, β is in the range of 45°-55°, and γ is in the range of 35°-45°.

12. The folded-camera module according to claim 10, wherein α is in the range of 90°-95°, β is in the range of 45°-50°, and γ is in the range of 40°-45°.

13. The folded-camera module according to claim 1, wherein said image sensor is perpendicular to said second optical path.

14. The folded-camera module according to claim 1, wherein a minimum object-lens distance ($u_{min}$) the camera can focus to is less than 25 cm.

15. The folded-camera module according to claim 1, wherein a magnitude of an effective focal length of said second lens group is at least three-fold greater than a magnitude of an effective focal length of said first lens group.

16. The folded-camera module according to claim 1, wherein an effective focal length of said first lens group is less than 0.8 times the effective focal length.

17. The folded-camera module according to claim 1, wherein a total track length (TTL) is less than 1.1 times the effective focal length.

18. The folded-camera module according to claim 1, wherein a minimum module length (MLM) is less than the effective focal length.

19. The folded-camera module according to claim 1, wherein a minimum module length (MLM) is less than 0.9 times a total track length (TTL).

20. A portable device embedding the folded-camera module according to claim 1.

21. The portable device according to claim 20, wherein the folded-camera module is configured as a zoom camera.

22. The portable device according to claim 20, wherein the folded-camera module is configured as a telephoto camera.

23. The portable device according to claim 22, wherein the folded-camera module is included in a camera assembly comprising at least two cameras.

24. The folded-camera module according to claim 1, wherein the f/# is less than 3.

25. The folded-camera module according to claim 1, wherein the f/# is less than 2.9.

26. The folded-camera module according to claim 1, wherein the f/# is less than 2.8.

27. A folded-camera module for a mobile device comprising: a lens having an effective focal length (EFL) in the range of 8 mm<EFL<50 mm and having a f/# less than 3.5, the lens comprising a first lens group (G1) defining a first optical axis (OA1), a second lens group (G2) defining a second optical axis (OA2), and an optical path folding element (OPFE) configured to fold said first optical axis to second optical axis, wherein said first lens group is positioned at an object side of the OPFE, and the second lens group is positioned at an image side of the OPFE, wherein the folded-camera module further comprises an image sensor positioned at the image side of the second lens group and is configured for: obtaining data indicative of a rotational movement of the folded camera module, and spatially adjusting the first lens group and the OPFE for compensating an optical path shift of light entering into the folded camera module due to said movement by:

a) linearly moving said first lens group along a first axis parallel to the second optical axis, so as to provide optical image stabilization (OIS) in a first OIS direction, and b) rotating together said first lens group and said OPFE about a second axis being parallel to the second optical axis, so as to provide OIS in a second OIS direction.

28. The folded-camera module according to claim 27, configured for performing auto focus (AF) by moving said second lens group along an axis parallel to said second optical axis.

29. The folded-camera module according to claim 27, comprising 6 lens elements or 7 lens elements.

30. The folded-camera module according to claim 27, wherein the f/# is less than 3.25.

31. The folded-camera module according to claim 27, wherein a movement of said first lens group ($\Delta_{G1}$) is greater than a shift of an image formed at the image sensor ($\Delta_{Sensor}$) along the first OIS direction.

32. The folded-camera module according to claim 27, wherein said first lens group includes 2 or 3 lens elements and the second lens group includes 3 or 4 elements.

33. The folded-camera module according to claim 27, wherein a folding angle is smaller than 90°.

34. The folded-camera module according to claim 33, wherein said OPFE is an obtuse-triangular prism.

35. The folded-camera module according to claim 34, wherein said prism comprises a top surface and two side surfaces, and wherein:

(a) an angle α formed between the top surface and a first of the two side surfaces being greater than 90°;

(b) an angle β formed between the two side surfaces being greater than 45°;

(c) an angle $\gamma$ formed between the top surface and a second of the two side surfaces being smaller than 45°.

36. The folded-camera module according to claim 35, wherein $\alpha$ is in the range of 90°-100°, $\beta$ is in the range of 45°-55°, and $\gamma$ is in the range of 35°-45°.

37. The folded-camera module according to claim 35, wherein $\alpha$ is in the range of 90°-95°, $\beta$ is in the range of 45°-50°, and $\gamma$ is in the range of 40°-45°.

38. The folded-camera module according to claim 27, wherein said image sensor is perpendicular to said second optical path.

39. The folded-camera module according to claim 27, wherein a minimum object-lens distance ($u_{min}$) the camera can focus to is less than 25 cm.

40. The folded-camera module according to claim 27, wherein a magnitude of an effective focal length of said second lens group is at least three-fold greater than a magnitude of an effective focal length of said first lens group.

41. The folded-camera module according to claim 27, wherein an effective focal length of said first lens group is less than 0.8 times the effective focal length.

42. The folded-camera module according to claim 27, wherein a total track length (TTL) is less than 1.1 times the effective focal length.

43. The folded-camera module according to claim 27, wherein a minimum module length (MLM) is less than the effective focal length.

44. The folded-camera module according to claim 27, wherein a minimum module length (MLM) is less than 0.9 times a total track length (TTL).

45. A portable device embedding the folded-camera module according to claim 27.

46. The portable device according to claim 45, wherein the folded-camera module is configured as a zoom camera.

47. The portable device according to claim 45, wherein the folded-camera module is configured as a telephoto camera.

48. The portable device according to claim 47, wherein the folded-camera module is included in a camera assembly comprising at least two cameras.

49. The folded-camera module according to claim 27, wherein the f/# is less than 3.

50. The folded-camera module according to claim 27, wherein the f/# is less than 2.9.

51. The folded-camera module according to claim 27, wherein the f/# is less than 2.8.

* * * * *